US012558931B2

(12) United States Patent
Chapin et al.

(10) Patent No.: US 12,558,931 B2
(45) Date of Patent: Feb. 24, 2026

(54) HYDRAULIC GOOSENECK BALL LIFT SYSTEM AND METHOD

(71) Applicants: William K Chapin, Cumby, TX (US); Ronald L Perdue, Kennedale, TX (US)

(72) Inventors: William K Chapin, Cumby, TX (US); Ronald L Perdue, Kennedale, TX (US)

(73) Assignee: New Wave Couplers Gooseneck Trailer Couplers, LLC, Fort Worth, TX (US)

( * ) Notice: Subject to any disclaimer, the term of this patent is extended or adjusted under 35 U.S.C. 154(b) by 870 days.

(21) Appl. No.: 16/592,016

(22) Filed: Oct. 3, 2019

(65) Prior Publication Data

US 2025/0229582 A1    Jul. 17, 2025

Related U.S. Application Data

(63) Continuation of application No. 16/191,302, filed on Nov. 14, 2018, now abandoned, which is a continuation of application No. 15/826,716, filed on Nov. 30, 2017, now Pat. No. 11,628,697.

(51) Int. Cl.
| | |
|---|---|
| *B60D 1/24* | (2006.01) |
| *B60D 1/06* | (2006.01) |
| *B60D 1/36* | (2006.01) |
| *B60D 1/46* | (2006.01) |
| *B60D 1/62* | (2006.01) |

(52) U.S. Cl.
CPC ............. *B60D 1/246* (2013.01); *B60D 1/065* (2013.01); *B60D 1/36* (2013.01); *B60D 1/46* (2013.01); *B60D 1/62* (2013.01)

(58) Field of Classification Search
CPC .......... B60D 1/246; B60D 1/065; B60D 1/36; B60D 1/46; B60D 1/62
See application file for complete search history.

(56) References Cited

U.S. PATENT DOCUMENTS

| | | | | | |
|---|---|---|---|---|---|
| 3,856,330 | A | * | 12/1974 | Baxter ............... | B62D 53/0828 280/433 |
| 4,570,966 | A | * | 2/1986 | Giboney ............ | B62D 53/0842 280/433 |
| 4,657,274 | A | * | 4/1987 | Mann .................. | B62D 53/0828 280/433 |
| 5,016,898 | A | * | 5/1991 | Works ................ | B62D 53/0828 280/901 |
| 5,344,172 | A | * | 9/1994 | Jaun ................... | B62D 53/0828 280/491.1 |
| 5,409,251 | A | * | 4/1995 | Thorndyke ............... | B60S 9/12 280/475 |

(Continued)

*Primary Examiner* — Valentin Neacsu
*Assistant Examiner* — Michael R Stabley
(74) *Attorney, Agent, or Firm* — Fogarty LLP

(57) ABSTRACT

A system and method of raising and lowering a ball hitch for coupling to a gooseneck trailer coupler are provided. A combination of hydraulic pump and hydraulic piston are employed to raise and lower the ball hitch. Both custom and off the shelf parts combine to create a user friendly system to couple and uncouple a gooseneck trailer to the truck. The system described herein replaces the need to raise and lower a gooseneck trailer by hand crank and gear box. A non-rotating free end hydraulic piston device extends and retracts to raise and lower the ball hitch in both coupling and uncoupling of the trailer.

41 Claims, 52 Drawing Sheets

(56)                References Cited

U.S. PATENT DOCUMENTS

| | | | | |
|---|---|---|---|---|
| 5,868,415 A * | 2/1999 | Van Vleet | B60D 1/583 | 280/483 |
| 6,409,202 B1 * | 6/2002 | Putnam | B60D 1/06 | 280/495 |
| 6,447,000 B1 * | 9/2002 | Dick | B60D 1/246 | 280/491.5 |
| 6,533,308 B1 * | 3/2003 | Tambornino | B60D 1/54 | 280/901 |
| 6,695,338 B1 * | 2/2004 | Roberts | B60D 1/06 | 280/514 |
| 6,808,195 B2 * | 10/2004 | Smith | B62D 53/0828 | 280/417.1 |
| 6,824,157 B1 * | 11/2004 | Putnam | B60D 1/06 | 280/901 |
| 7,425,015 B1 * | 9/2008 | Schipman | B60D 1/46 | 280/490.1 |
| 7,775,545 B2 * | 8/2010 | Dick | B60D 1/06 | 280/491.1 |
| 8,286,986 B2 * | 10/2012 | Drake | B60D 1/46 | 280/490.1 |
| 8,500,167 B2 * | 8/2013 | Diaz | B60S 9/215 | 254/419 |
| 8,678,471 B2 * | 3/2014 | McCarthy | B60P 3/32 | 296/156 |
| 8,783,706 B2 * | 7/2014 | Drake | B60D 1/06 | 280/441.2 |
| 9,050,868 B2 * | 6/2015 | Schott | B60D 1/065 | |
| 9,579,939 B2 * | 2/2017 | Rabska | B60D 1/488 | |
| 9,759,018 B2 * | 9/2017 | Stibich | E21B 17/0853 | |
| 9,969,313 B2 * | 5/2018 | Engelken | B62D 53/062 | |
| 2004/0113390 A1 * | 6/2004 | Broussard, III | B60D 1/06 | 280/415.1 |
| 2011/0311338 A1 * | 12/2011 | Patrick | A01D 90/083 | 414/24.5 |

* cited by examiner

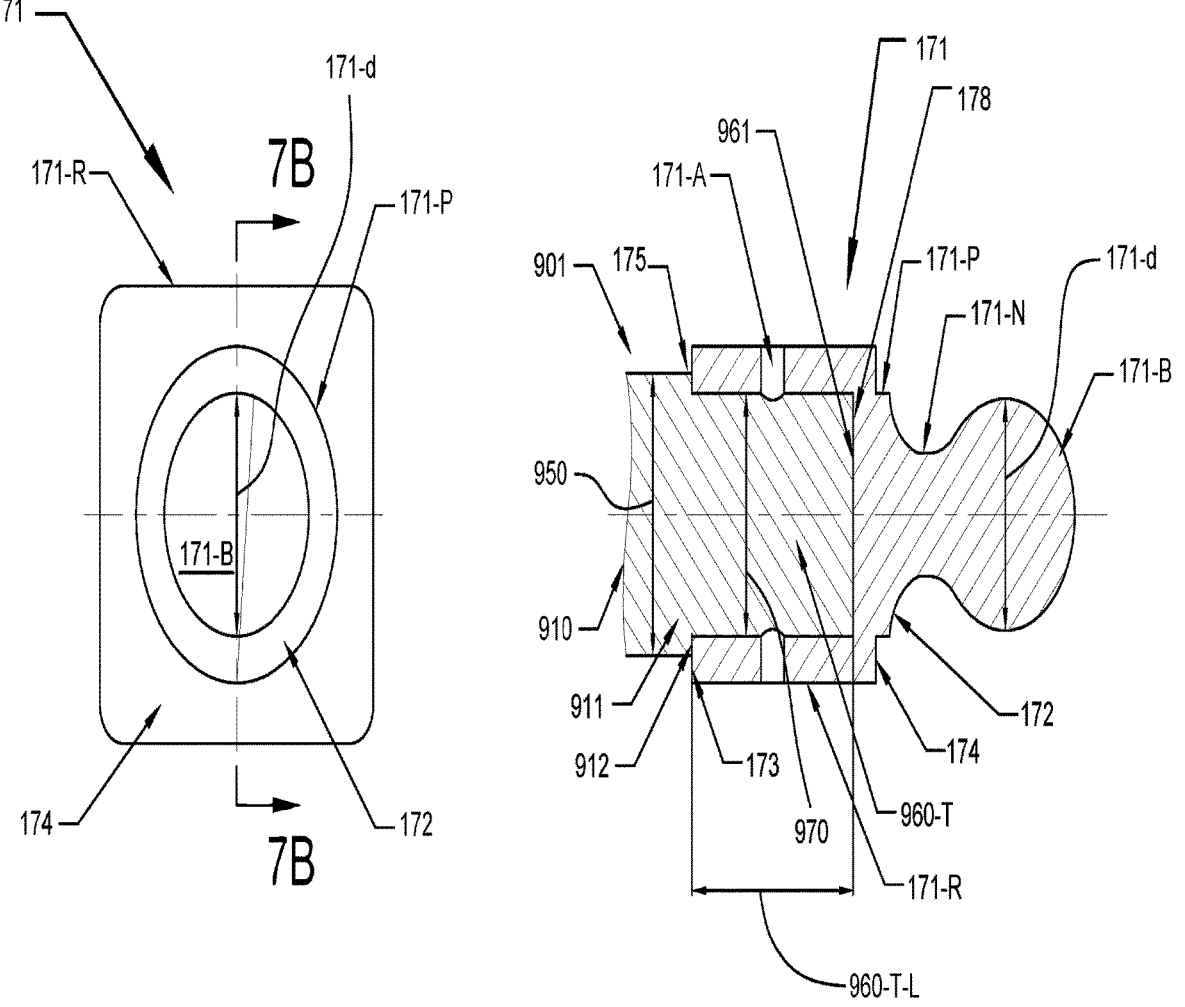
FIG.7A                    FIG.7B

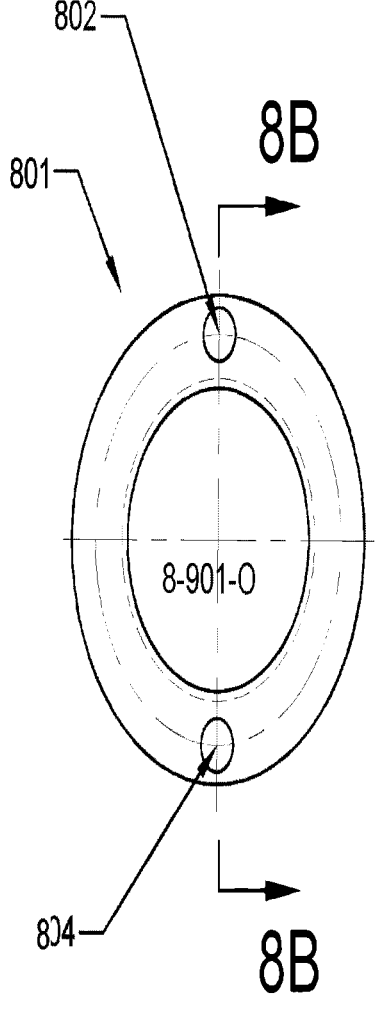
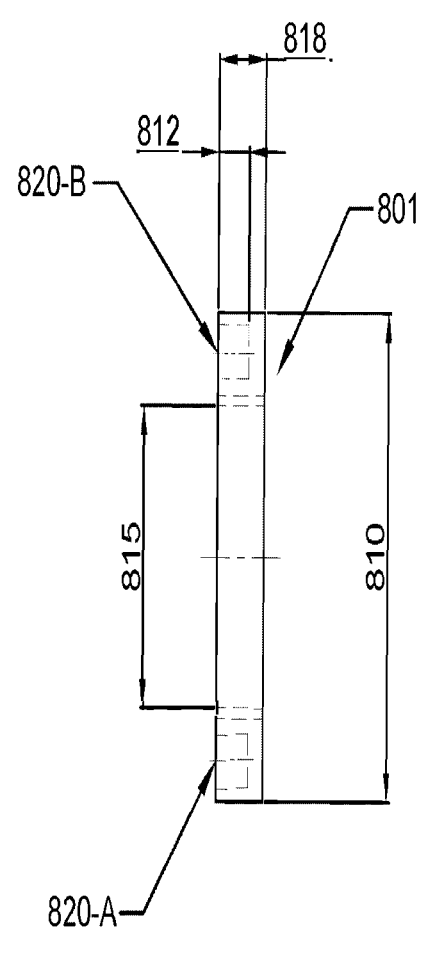
FIG.8A                    FIG.8B

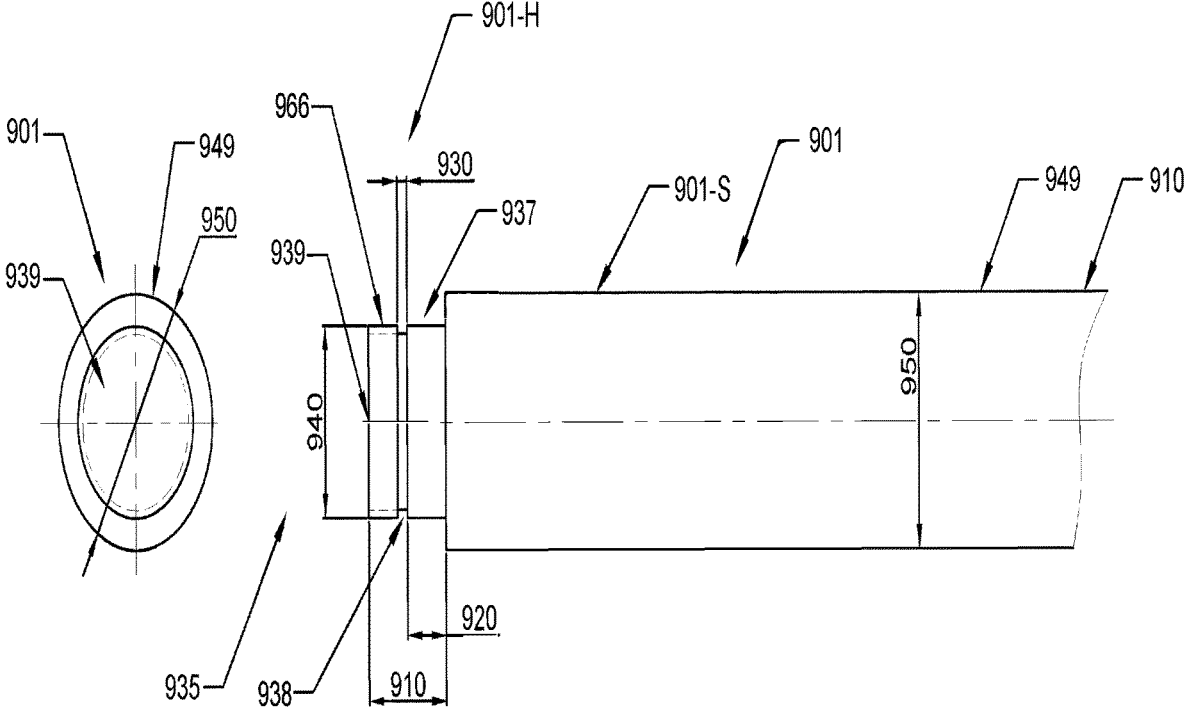
FIG.9A                             FIG.9B 10-171-B₂

10-171-N₂

10-177-2

10-171-2

10-171-P₂

Z 10-175-2

Y

X 10-171-h_d 10-171-h_c 10-171-R₂

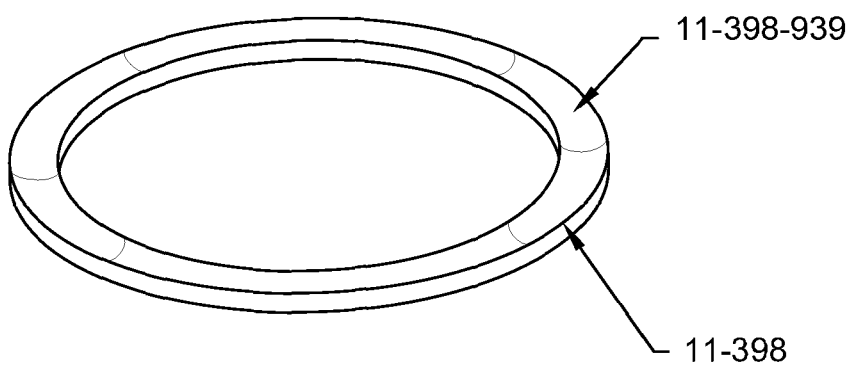
11-398-939
11-398
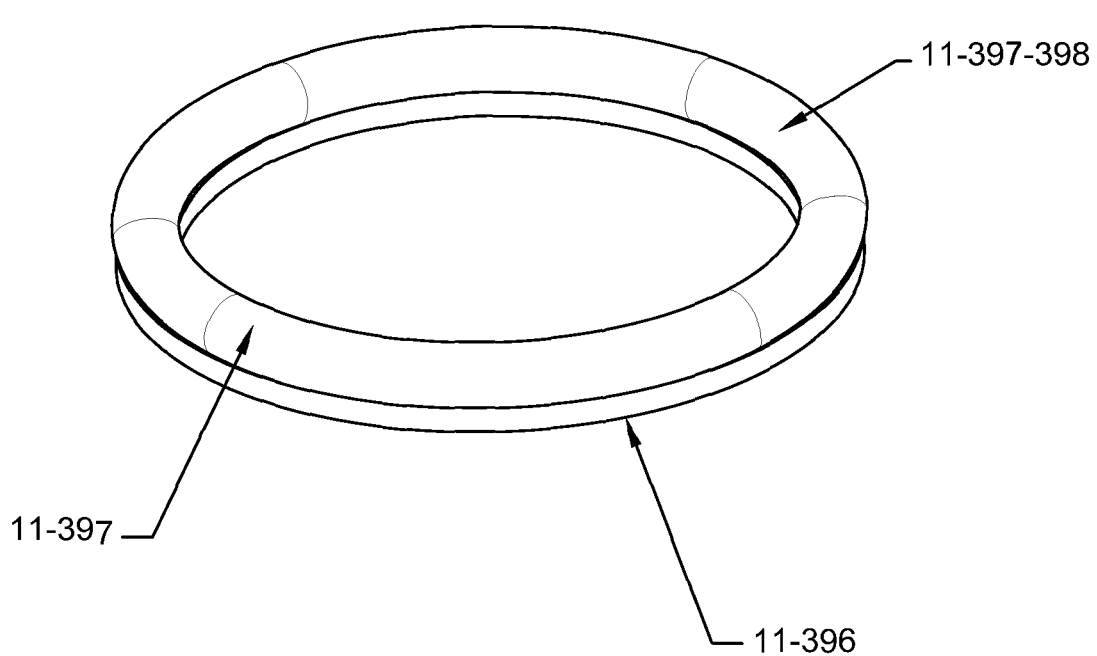
11-397-398
11-397
11-396
FIG.11

12-182-N 12-182

12-182-P 12-182-C 12-165-A

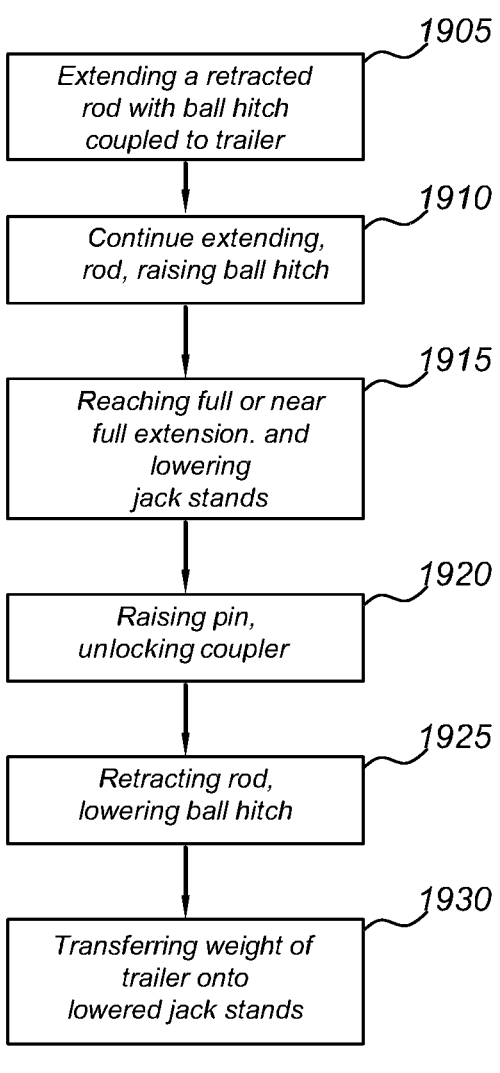

1905
Extending a retracted
rod with ball hitch
coupled to trailer

1910
Continue extending,
rod, raising ball hitch

1915
Reaching full or near
full extension. and
lowering
jack stands

1920
Raising pin,
unlocking coupler

1925
Retracting rod,
lowering ball hitch

1930
Transferring weight of
trailer onto
lowered jack stands

FIG.19A

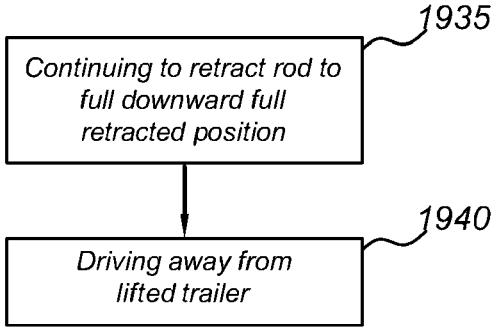

1935
Continuing to retract rod to
full downward full
retracted position

1940
Driving away from
lifted trailer

FIG.19B rod exit for flatbed ball, sitting in cylinder
for illustrative purposes Rod end threaded, for flatbed mount - for ball hitch Flat weld, at interface of rod end and flatbed ball lip,
ball external threads mated with internal threads of rod end.

Rod length may be near 11 $\frac{1}{2}$ inches, flatbed ball hitch is custom.
Rod is extending through top mounting ring

725-B

171-B-F

723-B

2300-P

171-F-W

722-B

980

799

726-B

751

721-B

705-F

Embodiment mounted into flat bed,top
mounting ring secured via 6 bolts to
mounting ring, shown for example in FIG.23C,
ball hitch is mounted/welded to rod end
cylinder assembly extends beneath truck bed Flatbed ball hitch top view,in accordance with
an embodiment of the present invention,
part of cylinder nut can be seen through
opening in top mounting ring 21-108

21-143

21-145

21-142

21-140

21-111

21-110

21-117

21-99

Z

Y

X

Coupling Initial Position
Coupler above ball
Coupler locked position
Rod Retracted Coupler above ball
Coupler unlocked
    pin raised position
Rod extending 900
Ball rising, 21-171-R,
    is more visible, rising up from
Truck bed 21-1000

21-182

21-165-A 21-151-A 21-155-B 21-151-B 21-151-C 21-165-B 21-131-C 21-157-B 21-171

21-174

21-131-L 21-171-N 21-171-P 21-900

21-1000

21-171-H1

21-171-R

Ball rises to seat in
Coupler
Coupler unlocked
    pin raised position
Rod extending 900
Ball rising

Z
Y
X 21-182

21-165-A 21-175

21-151-A 21-157-B 21-151-B 21-155-B 21-151-C 21-165-B 21-131-C 21-171

21-174

21-121

21-131-L 21-171-N 21-171-P 21-1000

21-171-H2

21-900

21-171-R

Z

Y

X

Coupler on ball
Coupler locked
     pin lowered position
Rod extended
Ball raised,
21-171-R rectangular
base further
above bed,
Load transferred to ball
in E and Further raised
in 21 F, and load
comes off stands 21-182

21-165-A 21-165-N 21-151-A 21-157-B 21-151-B 21-131-L 21-171-V 21-171-P 21-900

21-155-B 21-151-C 21-165-B 21-131-C 21-171

21-174

21-121

21-1000

21-171-H3

21-171-R

Z

Y

X

Coupling sequence
Coupler locked on ball
    pin lowered position
Rod retracting
21-171-Ball lowering 21-182

21-165-A 21-165-N 21-151-A 21-157-B 21-151-B 21-131-L 21-171-N 21-171-P 21-171-R 21-900

21-155-B 21-151-C 21-165-B 21-131-C 21-171

21-174

21-121

21-1000

Z

Y

X

Coupling sequence
Coupler locked on ball
   pin lowered position
Rod retracting
21-171-Ball raised
21-171-R rectangular
base lowering towards truck bed 21-182

21-165-A 21-175

21-151-A 21-157-B 21-151-B 21-131-L 21-171-N 21-171-P 21-155-B 21-151-C 21-165-B 21-131-C 21-171

21-174

21-121

21-171

21-171-R 21-1000

Z

Y

X 21-900
Coupling sequence
Jack stands up, pin lowered
position, coupler locked
Rod retracted near fully position
load on ball.

21-182

21-165-A 21-151-A 21-151-B 21-151-C 21-165-B 21-131-C 21-171

21-174

21-121

21-131-L 21-171-N 21-171-P 21-171-R 21-900

21-1000

Z

Y

X

Coupling sequence
Coupling final position
Jack stands up/pin lowered
position, coupler locked
Rod fully retracted
load on ball.

Uncoupling process
Coupler locked, pin inserted, Rod retracted
Jack Stands Raised, weight on ball - coupler
Extension of Rod begins, ball begins to rise,
ball will rise as rod extends
outer pipe/inner pipe/post rising Uncoupling sequence
Uncoupling initial position
            pin lowered
coupler locked
Jack stands raised
extending
Ball rising 22-182

22-165-A 22-151-A 22-157-B
22-151-B 22-151-C 22-131-C 22-171

22-171-P 22-131-L 22-174
22-121

22-171-N 22-1000

22-900

22-171-R

Uncoupling sequence,
pin lowered,
coupler locked, piston
extending, ball rising
jack stands up

Z

Y

X

Uncoupling sequence
        pin lowered,
coupler locked, rod
extending, ball rising
        jack stands up,
load on piston/cylinder Uncoupling top position
Coupler locked
      pin lowered position
Rod extended
21-171-ball risen
21-171-R rectangular
base risen further
above bed compared to 22D,
lower Jack stands 22-182

22-165-A 22-151-A 22-151-B 22-157-B 22-131-L 22-171-N 22-171-P 22-900

22-131-C 22-171

22-174

22-171-R 22-1000

22-171-H2

Z

Y

X

Uncoupling top position
Coupler unlocked,
pin Raised position
Rod fully extended
21-171-Ball risen, ball
same position as 22E
unlock coupler and begin
transfer load to stands Uncoupling sequence
Coupler on ball coupler
Coupler unlocked, pin raised position
Rod slightly retracted
22-171-Ball lowering
22-171-R rectangular
Load fully transfers to jack stands 22-182

22-165-A 22-151-A 22-155-B 22-151-B 22-151-C 22-131-C 22-171

22-174

22-157-B 22-131-L 22-171-N 22-171-P 22-171-R 22-1000

22-171-H3

22-900

Z

104

Y

X

Uncoupling sequence
Coupler above ball coupler
Unlocked pin raised position
Rod retracting
22-171-Ball lowering, not
quite visible from this
perspective.
Jack stands lowered,
supporting load 22-182

22-165-A 22-151-A
22-155-B
22-151-B 22-157-B 22-131-L 22-131-C 22-900

22-151-C
22-171-B
22-171-N
22-900
22-171
22-121

22-1000

22-174

Z 103

Y
102

X
101

Uncoupling Sequence, final
position,
Coupler above ball coupler
Unlocked pin raised position
Rod fully retracted,
Jack stands down,
top surface 22-174 flush
with truck plate 22-900.
drive away 23-131-L-A 23-131-C-B 10-131-C 23-131-L

HYDRAULIC GOOSENECK BALL LIFT SYSTEM AND METHOD

CROSS REFERENCE TO RELATED APPLICATIONS

This Application is a Continuation Application of U.S. patent application Ser. No. 16/191,302, filed 14 Nov. 2018, which is a Continuation In Part of U.S. patent application Ser. No. 15/826,716 filed 30 Nov. 2017 and claims priority to U.S. patent application Ser. No. 15/826,716 filed 30 Nov. 2017, which is published as US Published application No. 20180126809, the contents of which are incorporated herein by reference.

FIELD OF THE INVENTION

The present invention relates generally to securing a trailer to a hitch, and more particularly to alleviating manual raising and lowering of gooseneck trailers during hitching and removal.

BACKGROUND OF THE INVENTION

Conventional trailers require manual raising and lowering of the trailer at the time of connecting to respective hitches. FIG. 1A shows a conventional trailer. Turning to FIG. 1A, the front 140 of the trailer 100 rests on two trailer jack stands 110. The goose neck 121 extends from a front 140 of the trailer 100 to a top +Z of coupling frame 161. At the bottom-Z of the coupling frame is a ball coupler 131. The ball coupler 131 attaches to a ball hitch 171. Moving up +Z from the ball coupler 131 is a locking pin 151, which locks the coupler about the ball hitch 171. A coupling pipe 165 is affixed to the ball coupler 131 and extends from the coupling frame 161 and is secured to the coupling frame 161 at least by a rod and pin. To lower the ball coupler 131 onto a truck mounted, not shown, ball hitch 171 a manual crank 101 is turned by hand to raise +Z and lower-Z the trailer 100 by increasing or decreasing a height +Z of the jack stands 110. In conventional practice, after the ball coupler 131 is secured to the ball hitch 171, the stands 110 are lowered further taking the trailer 100 load off the stands 131 and putting the trailer load on the goose neck 121 and coupling system, 161, 165, 131.

It may be desirable to raise and lower a ball hitch to enable coupling of the trailer to the truck without manual cranking of a gear box. In the conventional system, the whole front of the trailer raises and lowers with coupling and uncoupling of the ball coupler to the ball hitch by manually raising and lowering of the jack stands. Low gearing is required to move heavy loads, which in turn increases the time and number of revolutions required to complete the process.

A conventional ball hitch for a gooseneck trailer may be mounted near the center of the truck bed.

There may be users capable of driving the trailered load but in need of assistance to couple a conventional trailer to the ball hitch. Assistance may be needed to raise and lower the trailer using the hand crank. If coupling personnel are needed in addition to the driver, field conditions may arise wherein the lone driver is not able to couple or uncouple the load when the need arises. It may be desirable to have a user friendly coupling system and method in field applications. It may be desirable to have a method and system to reduce the manual demands of coupling a trailer to ball hitch for the trailer industry at large.

SUMMARY OF THE INVENTION

The present invention addresses some of the issues presented above by providing a user friendly system and method for coupling and uncoupling a ball coupler of a goose neck trailer to a ball hitch. More particularly, the subject invention raises and lowers a gooseneck ball hitch for securing to and removal from a trailer coupler in the absence of manually cranking a gear box. Employment of the present invention alleviates the need to raise and lower the trailer manually, for example, via cranking of the low geared mechanical system. The present invention provides a reliable and user friendly coupling of the trailer to the truck mounted ball hitch. Aspects of the present invention are provided for summary purposes and are not intended to be all inclusive or exclusive. Embodiments of the present invention may have any of the aspects below.

One aspect of the present invention is a ready connection of the invention to conventional ball hitches and compatibility with conventional gooseneck trailers.

Another aspect of the present invention is raising and lowering of the ball hitch via a hydraulic piston.

Another aspect of the present invention is using an extension stroke and a retraction stroke during the coupling procedure.

Another aspect of the present invention is using an extension stroke and a retraction stroke during the uncoupling procedure.

Another aspect of the present invention is to provide a user with an easy user interface.

Another aspect of the present invention is the compatibility with existing trailer, existing truck power, or both.

Another aspect of the present invention may be the use of an auxiliary battery.

Another aspect of the present invention is a recharging of an auxiliary battery via the truck's alternator.

Another aspect of the present invention is the ready installation of the hydraulic pump and auxiliary battery in an enclosed container.

Another aspect of the present invention is its user friendly operation in industrial applications. In accordance with an exemplary embodiment, two push and hold buttons provide the respective rod extending and rod retracting movements with concurrent ball hitch displacement or load transfer as further described herein.

Yet another aspect of the present invention is a manual override capacity of the invention coupling system, where an existing conventional gear box with hand crank for raising and lowering the gooseneck trailer is accommodated; the present invention readily accommodates conventional manual raising and lowering of the trailer.

Yet another aspect of the present invention may be the use of an off the shelf battery.

Another aspect of the present invention may be the use of an off the shelf hydraulic pump.

Another aspect of the present invention may be the use of a bidirectional pump, rated at 3000 psi pump, and running on 12 volts.

Another aspect of the present invention is incorporating flexible rubber 3000 psi hydraulic hoses for the hydraulic lines.

Another aspect of the present invention is accommodation of a driver needing coupling and uncoupling assistance.

Another aspect of the present invention is accommodation of a trailer hauler who cannot or should not raise and lower a trailer by manual means, such as cranking the low geared trailer arm.

Another aspect of the present invention is reduced manual labor required to couple the trailer to the truck.

Another aspect of the present invention is reduced manual labor required to uncouple the trailer to the truck.

Another aspect of the present invention is the incorporation of a conventional ball hitch; another aspect of the present invention may be configuration to mate with a turnover ball (B&W TRAILER HITCHES, *Turnover Ball*, Humboldt, Kansas, USA); still another aspect may be configuration to mate with a flatbed ball hitch.

Another aspect of the present invention is the use of a custom hydraulic piston with custom cylinder top cap.

Another aspect of the present invention is a custom piston rod assembly.

Another aspect of the present invention is to provide hydraulic powered ball hitch vertical displacement of near eight inches.

Another aspect of the present invention is the application to varying sized and varying designs of ball hitches and trucks, to include flatbed trucks and B&W gooseneck trailer ball hitches (B&W TRAILER HITCHES, *Turnover Ball*, Humboldt, Kansas, USA). Another aspect of the present invention is the use of off the shelf parts in combination with custom parts.

Another aspect of the present invention is to provide equivalent safety features in invention-piston mode and in manual mode.

Another aspect of the present invention is to maintain conventional load capacity while in invention-piston mode.

Another aspect of the present invention is to provide 12,000 ft.lbs of lift via the hydraulic cylinder.

Another aspect of the present invention is to provide the same minimum and maximum vertical coupling distance capacity as compared to conventional manual coupling, and in turn, accommodate the same conventional trailer-truck combinations as respective conventional gooseneck trailers.

Another aspect is the use of a custom dual directional piston rod head; rod head shown for example in FIG. 3B; the rod head used in combination with three rings, opposite directional seals each on one side of a center ring; rings shown for example in FIG. 11.

Another aspect of the present invention is the use of a custom rod exit end and affixing method to anchor the ball hitch to the free end of the piston rod.

Another aspect of the present invention is accommodation of a flatbed ball hitch using its conventional external mounting threads.

Another aspect of the present invention is incorporation of a turnover ball hitch (B&W TRAILER HITCHES, *Turnover Ball*, Humboldt, Kansas, USA) and an associated locking arm.

Yet another aspect of the present invention is a press fit connection from a piston rod to a ball hitch with a notch to groove combination;

Yet another aspect of the present invention is the use of a conventional coupler locking arm to secure the coupler to the ball hitch;

Another aspect of the present invention is the capacity to provide up to 12,000 pounds of lift (ft.lbs) with 3000 psi of extension pressure.

Another aspect of the present invention is the capacity to lower a load of 12,000 pounds (ft.lbs) with 3000 psi of retraction pressure.

Another aspect of the present invention is a lift and lower design that accommodates a differential in piston head area and piston head area minus piston rod area.

Another aspect of the present invention is the use of a wiping ring at the retaining nut, or cylinder nut. The retaining nut is shown for example in FIG. 8A. Another aspect of the present invention is raising and lowering a standard gooseneck ball of 2 and 5/16 inch. In accordance with an exemplary embodiment of the present invention, a B&W turnover ball is used (B&W TRAILER HITCHES, *Turnover Ball*, Humboldt, Kansas, USA) is used, shown, for example in FIGS. 10A and 10B.

Another aspect of the present invention is the securing of the hydraulic cylinder to the truck bed with a removable fastening system.

Another aspect of the present invention is the use of a rotation-restricted piston head/piston rod assembly.

Another aspect of the present invention is the application of a non-rotating about the vertical axis of a piston rod during piston excursion, extension or retraction.

Another aspect of the present invention is the use of a guide rod to prevent rotation of the piston rod in the horizontal plane.

Another aspect of the present invention is the use of a guide rod to prevent rotation of the piston head in the horizontal plane.

Another aspect of the present invention is a vertically and rotationally anchored hydraulic cylinder to the truck bed.

Another aspect of the present invention is preventing extension and retraction induced rotation of the piston head and piston rod via anchoring of the cylinder cap, anchoring a guide rod to the cap, and running the guide rod through the piston head and into the piston rod off center of the piston's axial center.

Another aspect of the present invention is the accommodation of a conventional locking arm in turnover ball (B&W TRAILER HITCHES, *Turnover Ball*, Humboldt, Kansas, USA)

Another aspect of the present invention is anchoring the near one-half inch guide rod to the cap via threads.

Another aspect is that the custom hydraulic cylinder assembly with a same stroke and piston rod shaft can be adapted for automatic coupling systems for coupling a goose neck trailer to a flatbed truck.

Those skilled in the art will further appreciate the above-noted features and advantages of the invention together with other important aspects thereof upon reading the detailed description that follows in conjunction with the drawings.

BRIEF DESCRIPTION OF THE FIGURES

FIGS. 7A and 7B show a top view and a cross sectional view, respectively, of a ball hitch to piston rod connection, in accordance with an exemplary embodiment of the present invention;

FIG. 8A shows a bottom view of retaining nut for a hydraulic cylinder, in accordance with an exemplary embodiment of the present invention;

FIG. 8B shows a cross sectional view of retaining nut for a hydraulic cylinder, in accordance with an exemplary embodiment of the present invention;

FIGS. 9A and 9B show a top view and a side view along the axis of a piston rod, respectively, in accordance with an exemplary embodiment of the present invention;

FIG. 11 shows a top perspective view of three rings, an extension directional ring, a retraction directional ring, and the center ring, in accordance with an exemplary embodiment of the present invention;

FIGS. 19A and 19B show exemplary methods of uncoupling a trailer from a ball hitch, in accordance with respective exemplary embodiments of the present invention;

DETAILED DESCRIPTION OF THE
INVENTION

For more complete understanding of the features and advantages of the present invention, reference is now made to the detailed description of the invention along with the accompanying figures. The present invention may use a conventional gooseneck trailer while providing a hydraulic pump and piston to raise and lower a ball hitch. A present embodiment enables coupling the ball hitch to the coupler in a gooseneck trailer. Compatibility with conventional trailers and trailer hitches, while maintaining conventional load capacity is achieved. The hydraulic ball lift system and method has numerous industrial applications, reducing manual labor required for coupling. The invention, as defined by the claims, may be better understood by reference to the following detailed description. The description is meant to be read with reference to the figures contained herein. This detailed description relates to examples of the claimed subject matter for illustrative purposes, and is in no way meant to limit the scope of the invention. The specific aspects and embodiments discussed herein are illustrative of ways to make and use the invention, and are not intended to limit the scope of the invention. Parallel reference numbers across figures may refer to like elements for ease of reference. Reference numbers may also be unique to a respective figure or embodiment.

A hydraulic pump provides the fluid flow needed to transmit power from a prime mover to a hydraulic actuator, piston. In accordance with the present invention a conventional pump may be employed. The present invention incorporates off the shelf, modified, and custom components in accordance with exemplary embodiments of the present invention.

The invention utilizes a hydraulic system. Force that is applied at one point is transmitted to another point using an incompressible fluid. The fluid may be conventional off the shelf hydraulic oil. The force may be multiplied in the raising and lowering process. In accordance with an exemplary embodiment of the present invention, a single rod with dual direction head forms the piston assembly.

Figure 1A:
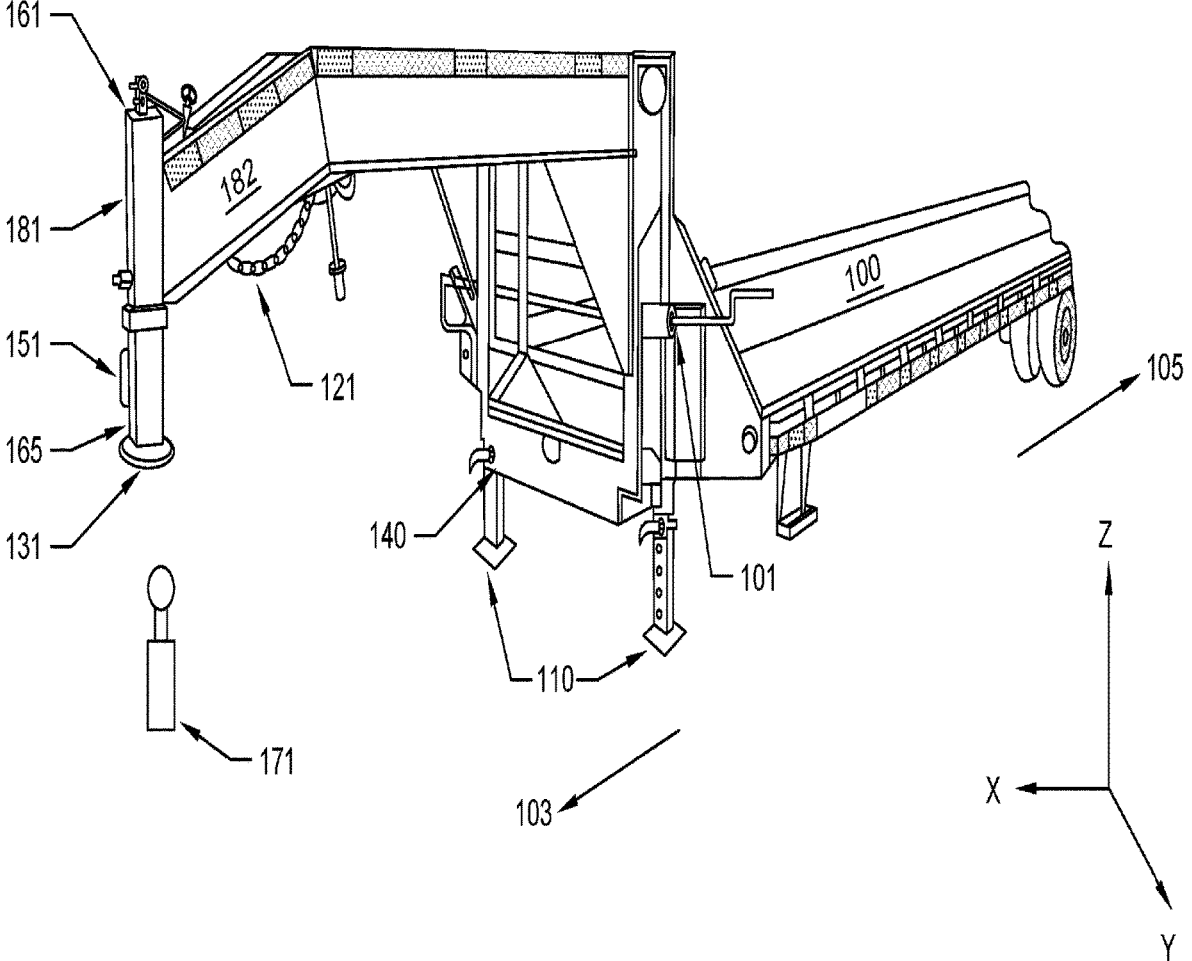
FIG. 1A shows a right front perspective view of a conventional gooseneck trailer and conventional coupling system.
Figure 1B:
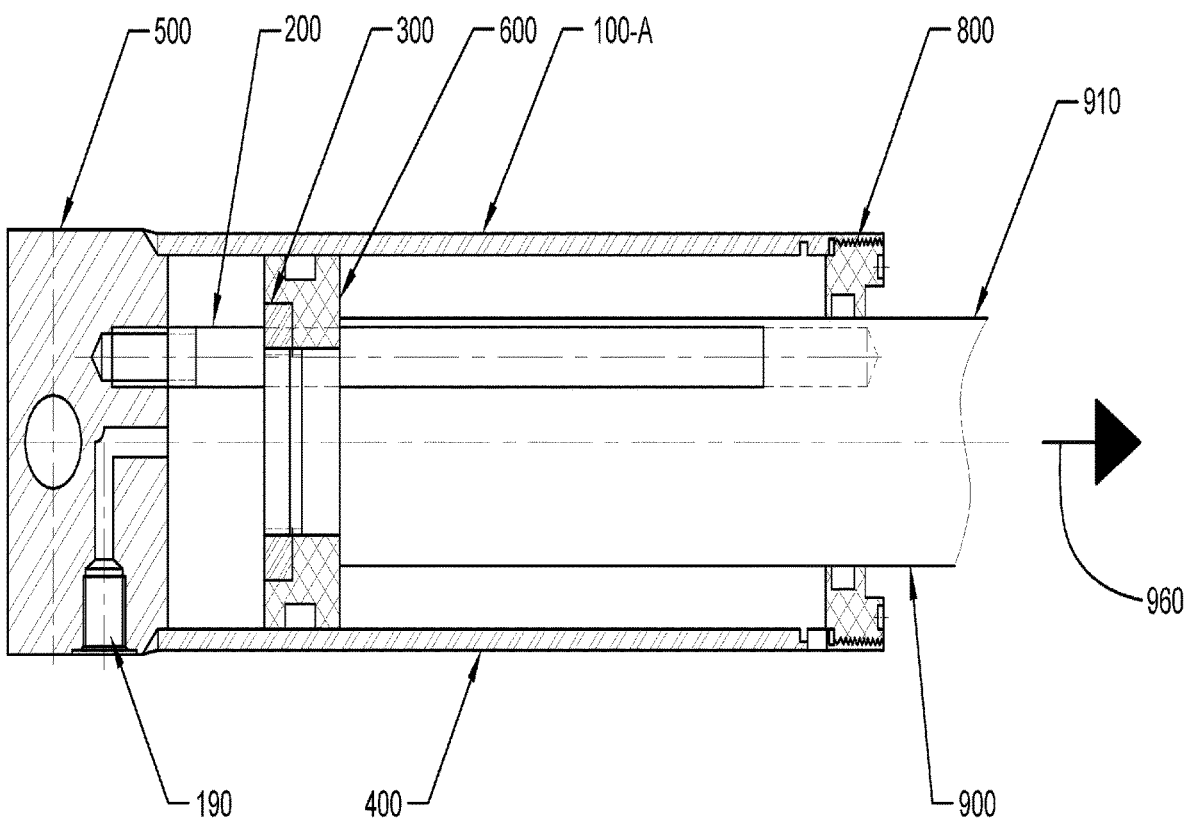
FIG. 1B shows a cross sectional view along axial center of hydraulic cylinder and piston assembly, in accordance with an exemplary embodiment of the present invention.

FIG. 1B shows a cross sectional view along axial center of a hydraulic cylinder and piston assembly, in accordance with an exemplary embodiment of the present invention. Turning to FIG. 1B, a cylinder top cap 500 closes the top of a hydraulic cylinder 400. Within the cylinder 400 are a piston head 300 and piston rod assembly 600. A cylinder nut 800 allows the piston rod to pass through while retaining fluid within the cylinder 400. A guide rod 200 is affixed to the top cap 500 and extends into the rod 900. Rod 900 has a ball connecting end 910, which exits the cylinder 400 and extends in the direction 960 shown. Also shown in the subject view is a cap hydraulic port 190 into the cylinder top cap.

Figure 2:
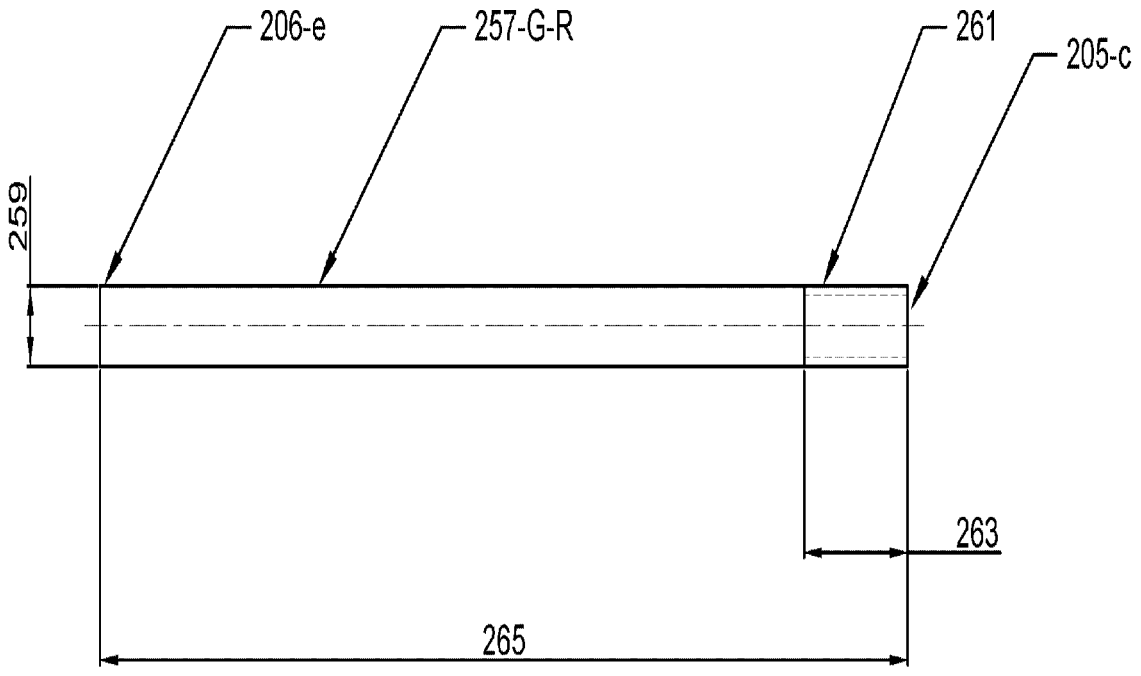
FIG. 2 shows a side view along axial length of a guide rod, in accordance with an exemplary embodiment of the present invention.
Figures 3A, 3B:
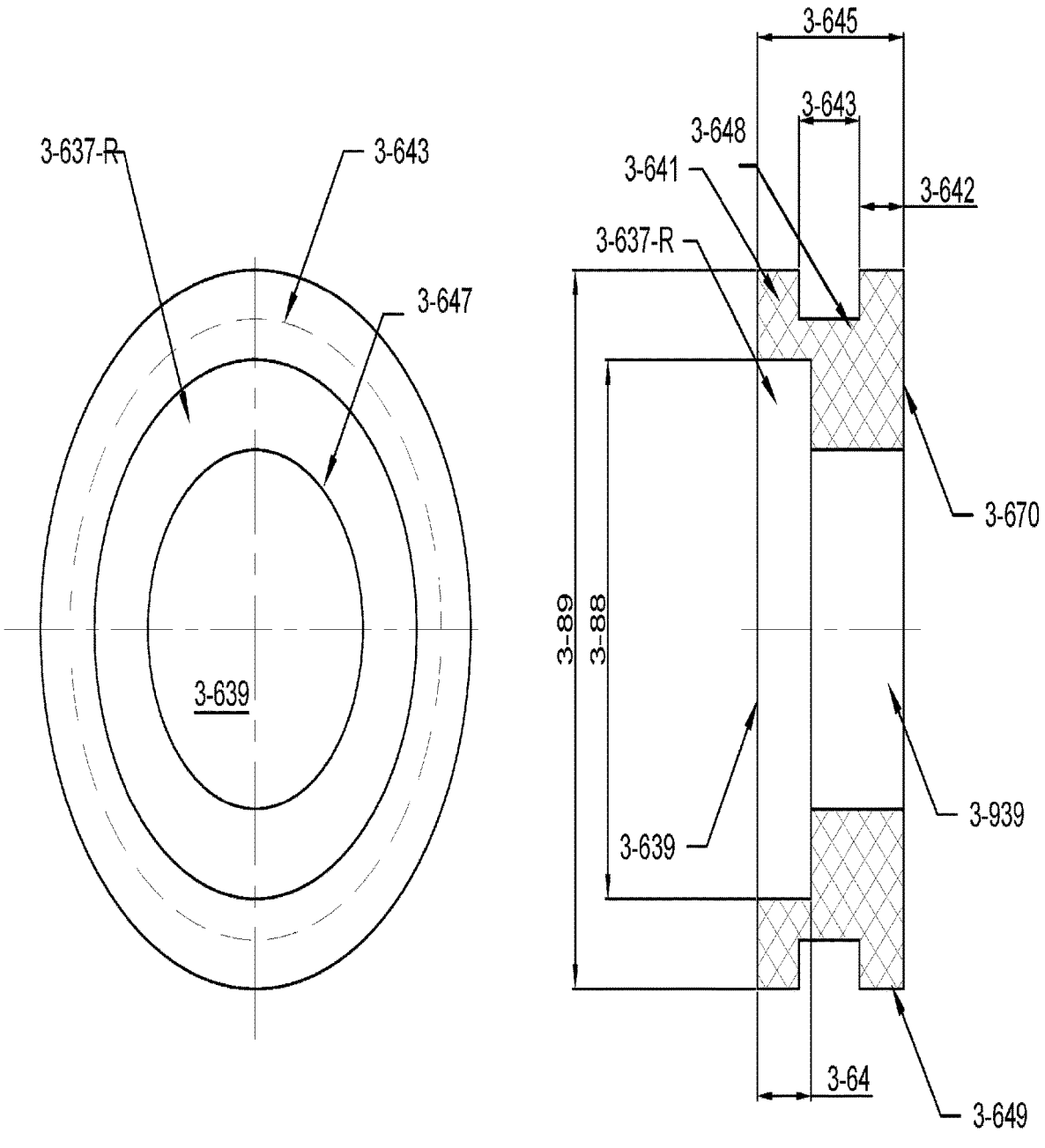
FIGS. 3A and 3B show a bottom view and a cross sectional view along the axis of a piston head, respectively, in accordance with an exemplary embodiment of the present invention.

FIG. 2 shows a side view along axial length of a guide rod, in accordance with an exemplary embodiment of the present invention. Turning to FIG. 2, a guide rod 200 is shown from its top cap 205-c end to its extension end 206-e. In accordance with an exemplary embodiment, the shaft 257-G-R of the guide rod 200 has a length 265 8.75 inches. In accordance with an alternate embodiment, at its cap end 205-c, the guide rod has external threads 261. Further in accordance with an exemplary embodiment, threads are 0.5 inch 13 right hand threads per inch. In accordance with an exemplary embodiment, the rod 200 has a diameter 259 of 0.5 inch. The length 263 of the threaded rod end 261 is 1.125 inches, in accordance with an exemplary embodiment. In accordance with an exemplary embodiment, anchoring of the guide rod 257-G-R on the cap end is by press fit. In accordance with an exemplary embodiment, the guide rod 257_G_R may be 0.5 inches in diameter 259. In accordance with another embodiment, the rod 257-G-R may have external threads and mate with internal threads on the cap 200, shown for example in FIG. 1B FIGS. 3A and 3B show a top view and a cross sectional view along the axis of a piston head, respectively, in accordance with an exemplary embodiment of the present invention. Turning to first to FIG. 3B, the piston head 3-642 has a ring channel 648 with an exemplary diameter 3-643 near 0.675 inches, in accordance with an exemplary embodiment. The top face 3-639 of the piston head accommodates a threaded spanner nut into the recess 3-637-R for securing the piston rod, not shown, into the head 3-641. Opening 3-367-R had a depth 3-64 near 0.4 inches, in accordance with an exemplary embodiment, to provide a thread depth of near 0.4 inches. The ring channel 648 is centered across a piston head 3-641 height 3-654 and is spaced 3-642 0.375 inches from each edge 3-670, 3-639, in accordance with an exemplary embodiment. The piston head 3-641 has a diameter 3-89, near one inch greater than the nut recess diameter 3-88. Turning to FIG. 3A, opening 3-939, circumscribes an insert rod end, rod not shown. This opening 3-939 steps 3-647 to the recess opening 3-637-R. The recess opening 3-637-R steps to the outer most diameter 3-89, shown in FIG. 3B, of head 3-641.

Figure 4A:
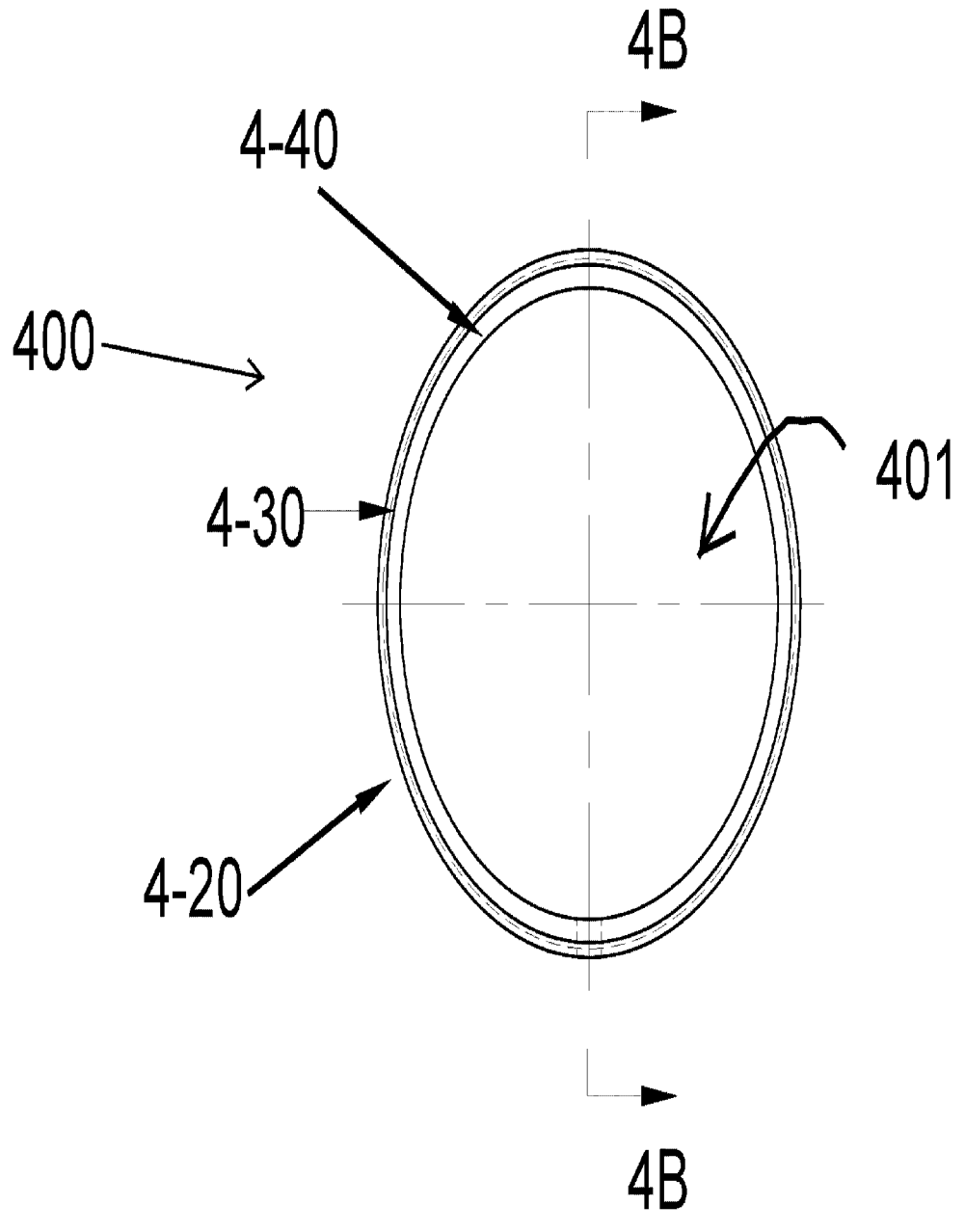
FIG. 4A shows a bottom view a hydraulic cylinder, in accordance with an exemplary embodiment of the present invention.
Figure 4B:
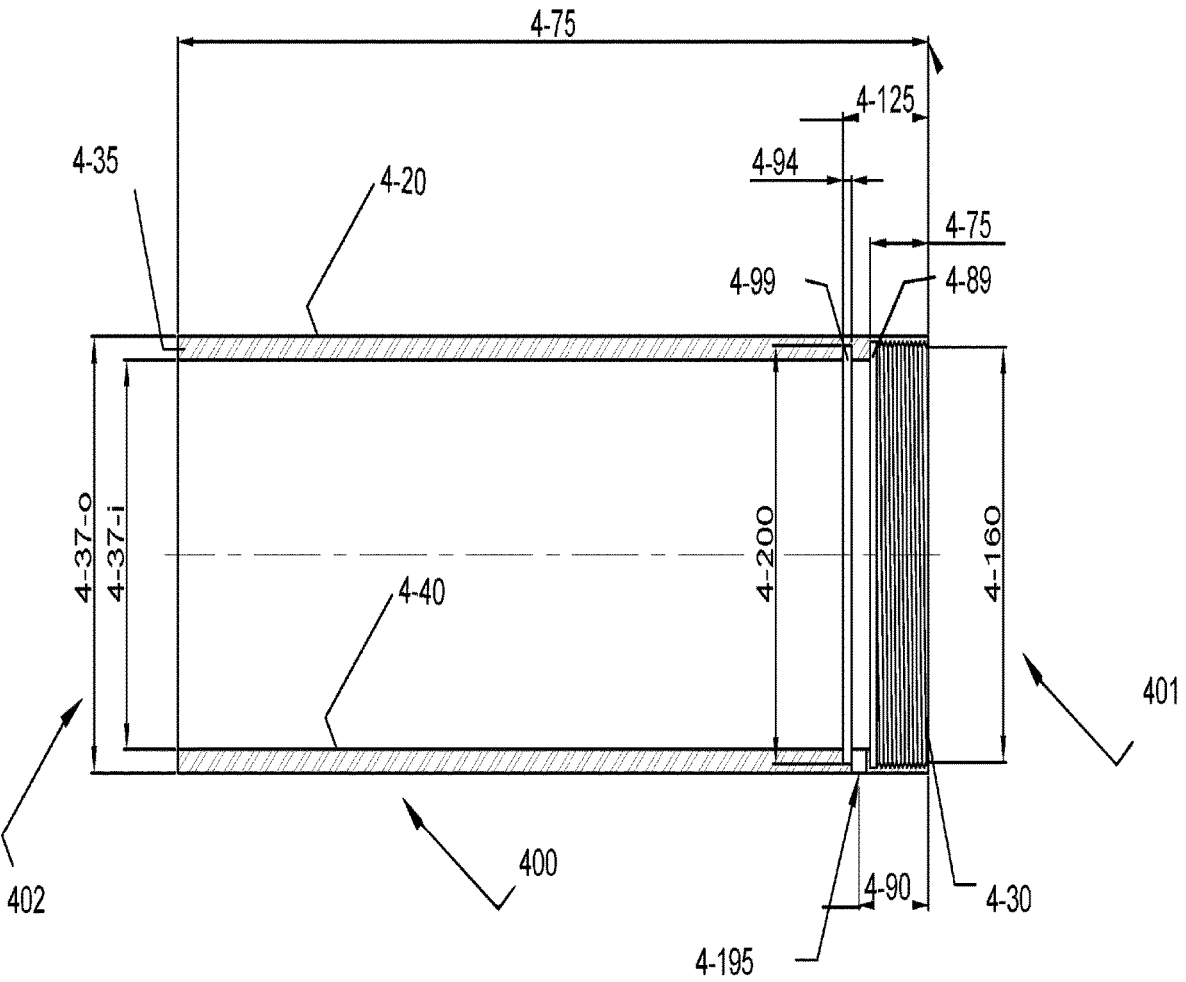
FIG. 4B shows a cross section view taken along axial center, as shown in FIG. 4A of a hydraulic cylinder, in accordance with an exemplary embodiment of the present invention.

FIG. 4A shows a bottom view a hydraulic cylinder, in accordance with an exemplary embodiment of the present invention. Turning to FIG. 4A, at the cylinder nut end 401 of the cylinder 400, internal threads 4-30 are cut into the cylinder's nut end 401 leaving a smooth outer wall 4-20. The threads 4-30 are more particularly shown and described with reference to FIG. 4B. Turning to FIG. 4A, Moving from nut end 401 to cap end 402 a step to the inner wall 4-40 is shown. FIG. 4B shows a cross section view taken along axial center, as shown in FIG. 4A of a hydraulic cylinder, in accordance with an exemplary embodiment of the present invention. Turning to FIG. 4B, the cylinder 400 has an outer diameter 4-37-o near 3.375 inches and greater than the inner diameter 4-37-i, for a wall thickness 4-35 near 0.375 inches. In accordance with an exemplary embodiment of the present invention, the inner tube wall 4-40 is honed to its 3.00 inch diameter. The cylinder tube 400 has length 4-75, in accordance with an exemplary embodiment, of near 9.75 inches. Internal threads 4-30 on the nut end 401 have depth into the tube toward the cap end 402 4-69 of 0.75 inches, in accordance with an exemplary embodiment. In accordance with an exemplary embodiment, threads 4-30 are 3.125 diameter inches of 12 unified fine thread (UNF) right hand threads. A lower fluid intake port 4-195 sits 0.9 inches into the nut end 401 of the hydraulic cylinder tube 400, in accordance with an exemplary embodiment. To keep the piston head, not shown from blocking the port 4-195, a fluid ring is positioned into groove 4-99 and anchored therein. The ring 4-99 is a distance 4-125 from the nut end 401 and the ring distance 4-125 is greater than the distance 4-90 of the fluid port 4-195. In accordance with an exemplary embodiment, the fluid ring distance 4-125 is 1.125 inches from the nut end 401. Ring groove 4-99 may have an exemplary thickness 4-94 of 0.09 inches and an exemplary diameter 4-200 of 3.2 inches. A cap end 402 of the cylinder is capped, cap not shown, as further described below. In accordance with an exemplary embodiment, the fluid port 4-195 is 0.25 inches, diameter not shown. Moving from nut end 401 to cap end 402, a stop gap 4-89 lacking in threads but of outer thread 4-30 diameter is cut into the inner wall 4-40 of the tube 400. On the cap end 402 of the gap 4-89, the inner wall diameter steps to its final diameter 4-37-i.

Figure 4C:
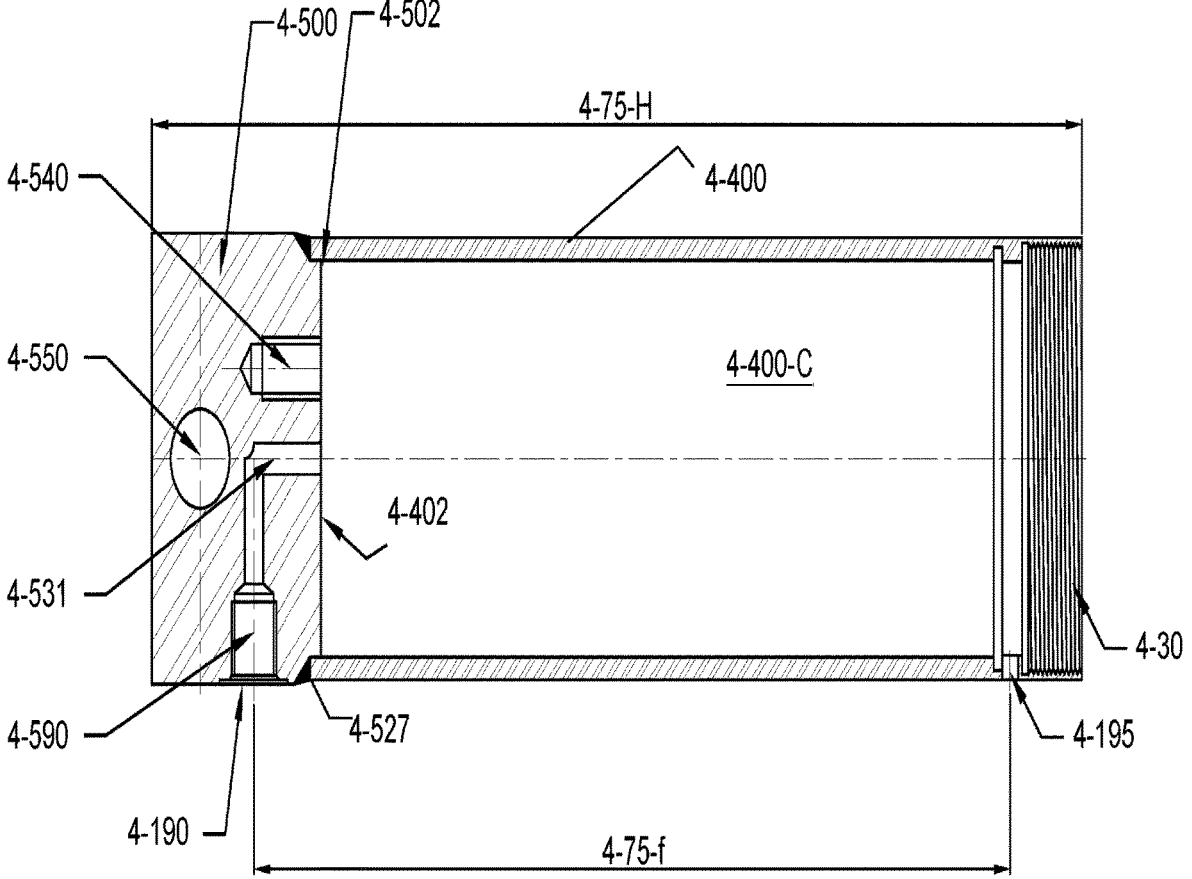
FIG. 4C shows a cross sectional view of a top cap attached to a hydraulic cylinder along the axis of a piston head, in accordance with an exemplary embodiment of the present invention.

FIG. 4C shows a cross sectional view of a cylinder top cap attached to a hydraulic cylinder along the axis of a piston assembly, in accordance with an exemplary embodiment of the present invention. The top cap 4-500 is secured to the cylinder tube 4-400 by press fit 4-502 at the cap end 4-402 and a weld 4-527. Further, the cap 4-500 has a through hole 4-550 for mounting the hydraulic cylinder into the goose neck pipe, pipe shown for example in FIG. 5B. A cap fluid port 4-190 is disposed in the cap 4-500 and a port intake 4-590 leads into the fluid pipe 4-531, channeling fluid into the cylinder cavity 4-400-C. The cap 4-500 and cylinder 4-400 as attached have a total length 4-75-H. In accordance with an exemplary embodiment, length 4-75-H is 11.75 inches. FIG. 4C also shows a distance between cap fluid port 4-190 and ring fluid port 4-195, center to center, 4-75-f. In accordance to an exemplary embodiment the length 4-75-f from center to center is 9.5 inches. Also shown in FIG. 4C is an anchor site 4-540 for the guide rod, rod not shown, where the guide rod is shown, for example, in FIG. 2.

Figure 5A:
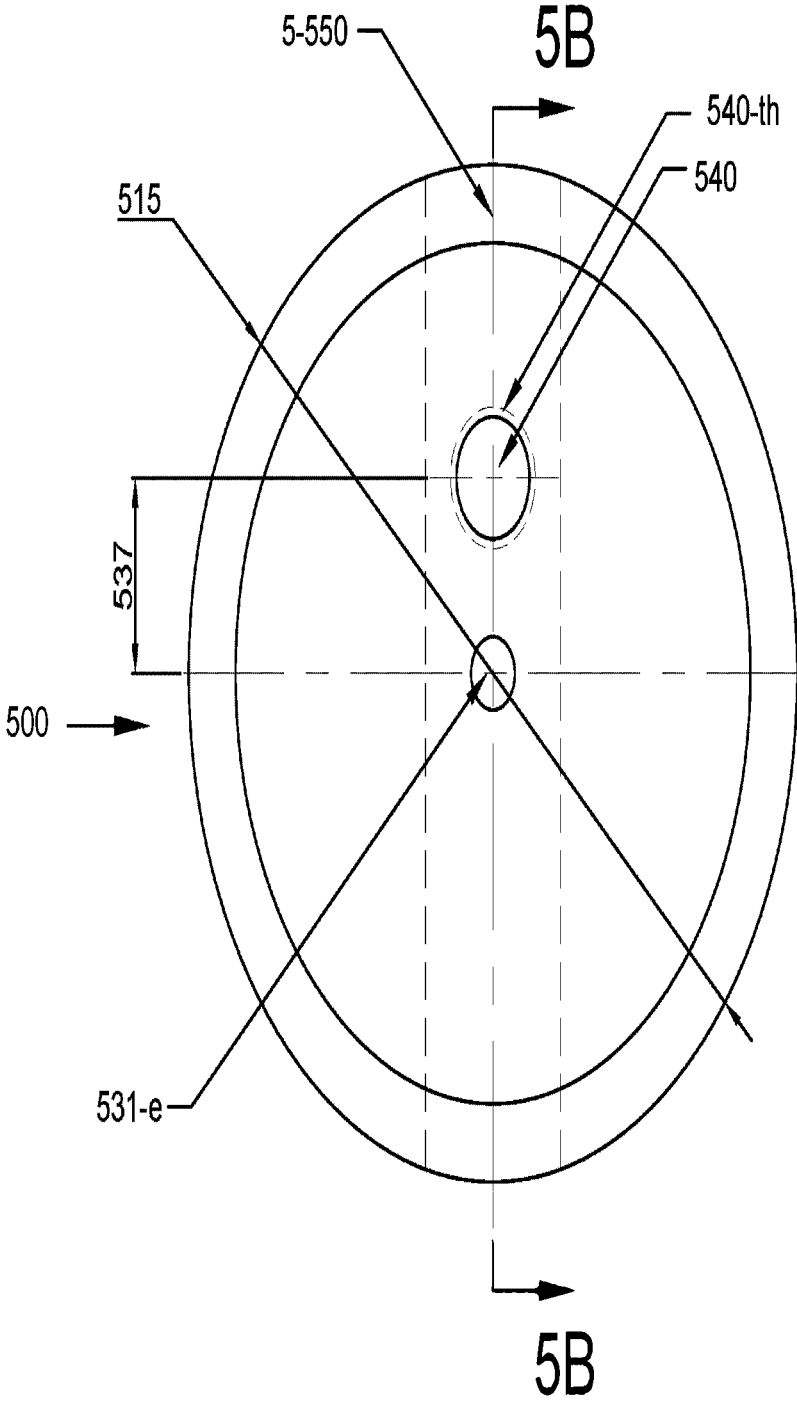
FIG. 5A shows a bottom view a top cap for a hydraulic cylinder, in accordance with an exemplary embodiment of the present invention.

FIG. 5A shows a bottom view a top cap for a hydraulic cylinder, in accordance with an exemplary embodiment of the present invention. At the center of the cap 500 is the exit for the upper fluid port 531-e. Displaced from the port 531-1 a center-to-center distance 537 is the anchor site 540 for the guide rod, rod not shown. In accordance with an exemplary embodiment the center to center distance 537 is 0.937 inches.

In accordance with an exemplary embodiment the anchor site 540 comprises internal threads 540-th. The cap 500 has an outer diameter of 515. In accordance with an exemplary embodiment, the outer diameter 515 is 3.385 inches. Through hole 5-550 for mounting the hydraulic cylinder into the goose neck pipe is shown passing through a center diameter of the cap 500 by dashed line and shown again in the cross sectional view of FIG. 5B, taken along line 5B-5B shown in FIG. 5A.

Figure 5B:
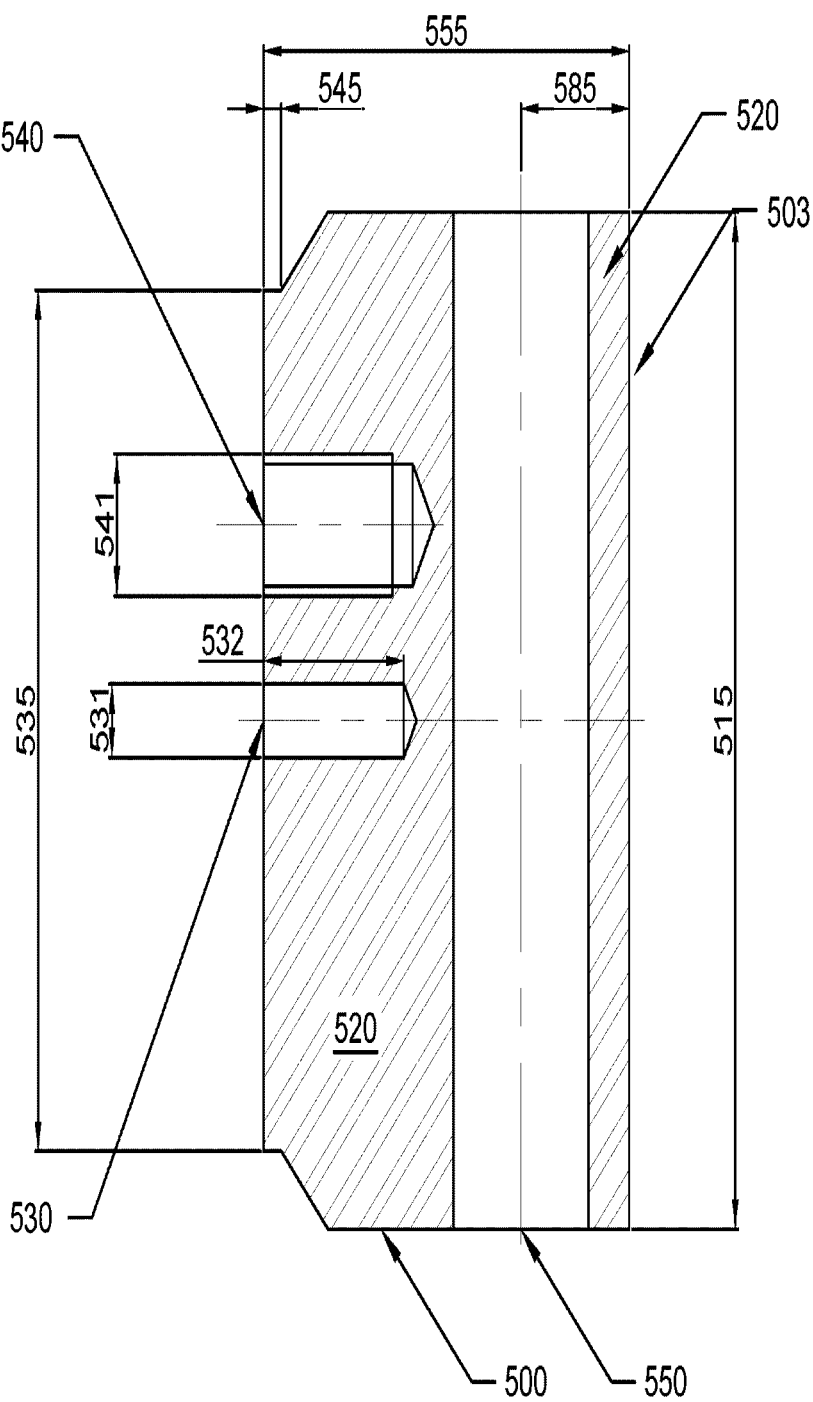
FIG. 5B shows a cross sectional view of a top cap for a hydraulic cylinder taken along the line shown in FIG. 5A, in accordance with an exemplary embodiment of the present invention.

FIG. 5B shows a cross sectional view of a top cap for a hydraulic cylinder taken along the line shown in FIG. 5A, in accordance with an exemplary embodiment of the present invention. The cap 500 has an insert end diameter 535 less than a top diameter 515. In accordance with an exemplary embodiment, insert end diameter 535 is near 3.0 inches, while top diameter is 3.5 inches. The through hole 550 for mounting the hydraulic cylinder assembly in the goose neck pipe is shown and is displaced a distance 585 from the top of the cap 503. The center of the through hole 550 to the outer side of the top 503 of the cap is a distance 585 of 0.625 inches, in accordance with an exemplary embodiment. Cap 500 is a solid piece 520, in accordance with an exemplary embodiment. Also shown in FIG. 5B are the anchor site 540 for the guide rod and the anchor site diameter 541. In accordance with an exemplary embodiment the anchor site diameter 541 is 0.499 inches for press fit. Upper fluid channel 531 is shown with its diameter 531 and depth 532 into the cylinder cap 500. In accordance with an exemplary embodiment, the fluid channel diameter 531 is 0.25 inches while the depth of the channel in the cross sectional view shown is 0.9 inches. Also shown is the total cap height 555 and the insertion distance 545. In accordance with an exemplary embodiment, the cylinder cap has a height 555 of 2.5 inches and an insertion height 545. of 0.125 inches.

Figure 6A:
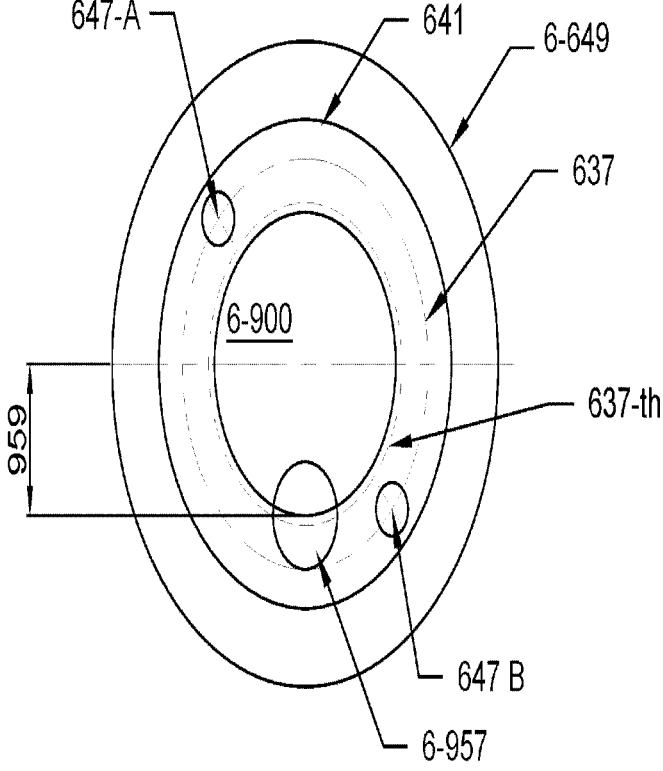
FIG. 6A shows a bottom view of a piston head assembly, in accordance with an exemplary embodiment of the present invention.

FIG. 6A shows a top view of a piston head assembly, in accordance with an exemplary embodiment of the present invention. Turning to FIG. 6A, a pair of spanner wrench holes 647-A and 647-B are shown disposed in a spanner nut 637. Also shown is the through hole 6-957 for the guide rod, guide rod shown for example in FIG. 2; the guide rod channel 957 is shown for example in FIG. 6B. Also shown are spanner nut 636 threads 637-th. Also shown is a distance 6-959 from a center of the piston rod 900 to a center of the guide rod through hole 6-957. The outer most edge 649 of the piston head 641 is also shown in this view.

Figure 6B:
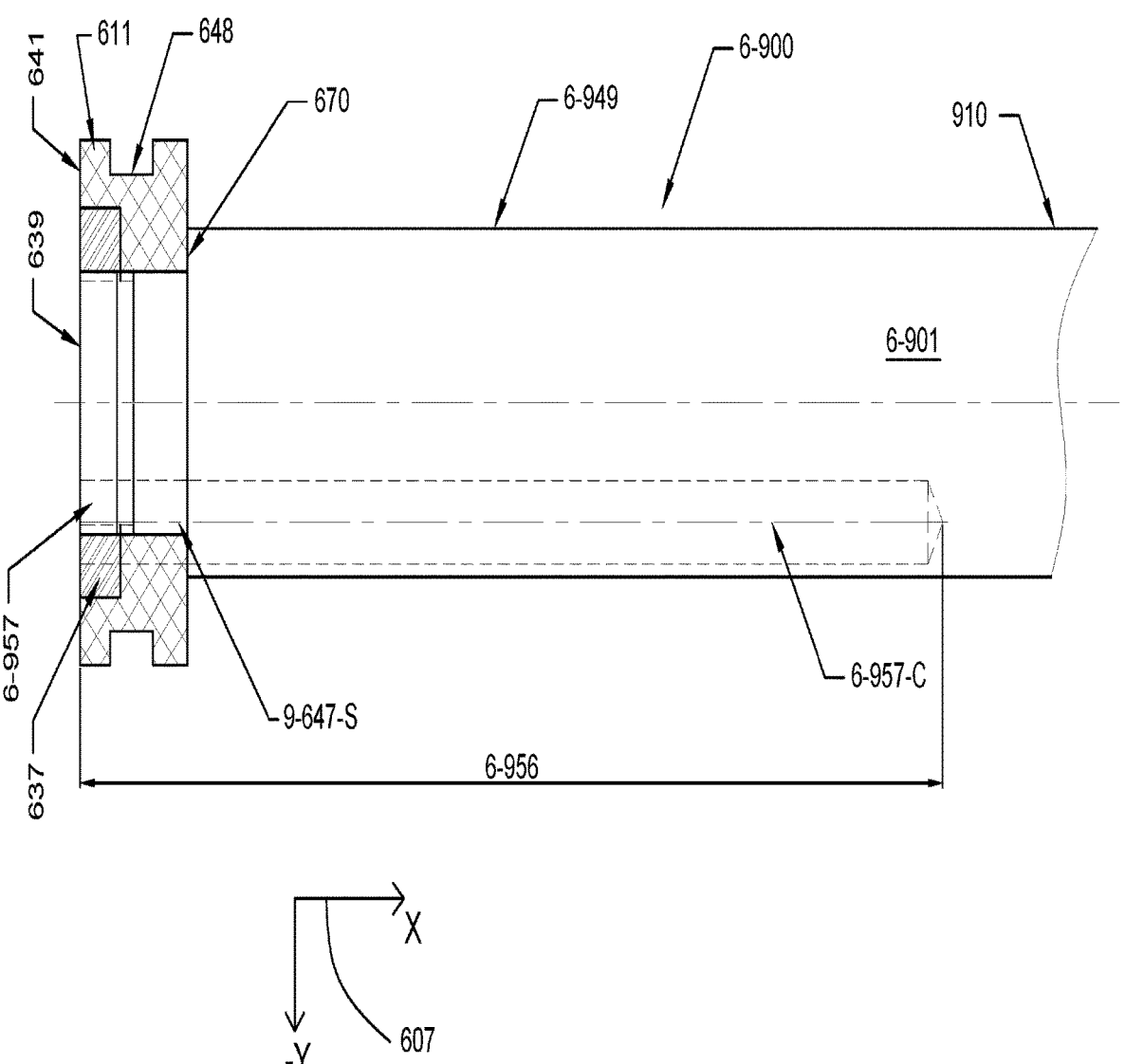
FIG. 6B shows a cross sectional view of a piston rod assembly, head and rod, taken along axial center, in accordance with an exemplary embodiment of the present invention.

FIG. 6B shows a cross sectional view of a piston rod assembly, head and rod, taken along axial center, in accordance with an exemplary embodiment of the present invention. Piston rod assembly 6-900 shows head 641 secured to rod 6-901. Turning to the head 641, the ring channel 648 is shown and the spanner nut 637 is shown seated in the recess 3-637-R, recess shown in FIG. 3B. Turning again to FIG. 6B, The spanner nut 637 is secured both around the head end 639 of the piston rod and within the piston head 640 by inner threads and outer threads, respectively, threads not shown. The step in rod diameter 9-647-S is also shown in this head rod assembly 6-900. Also shown is the head 641 rod 901 interface 670 between step 9-647-S and the rod's outer edge 949. A top opening 6-957, shown in dashed lines, crosses spanner nut 637 and the head side of the rod 639. The opening 6-957 extends through the head 641 and into the rod 901 in the X direction 607 and forms a guide rod channel 6-957-C cavity. The length 6-956 of the guide rod channel cavity 6-957-C is also shown, and in accordance with an exemplary embodiment is near 8.5 inches. The rod 6-901 extends, +X, to a ball connecting end 910 and the ball connecting end is later described and shown.

Figure 10A:
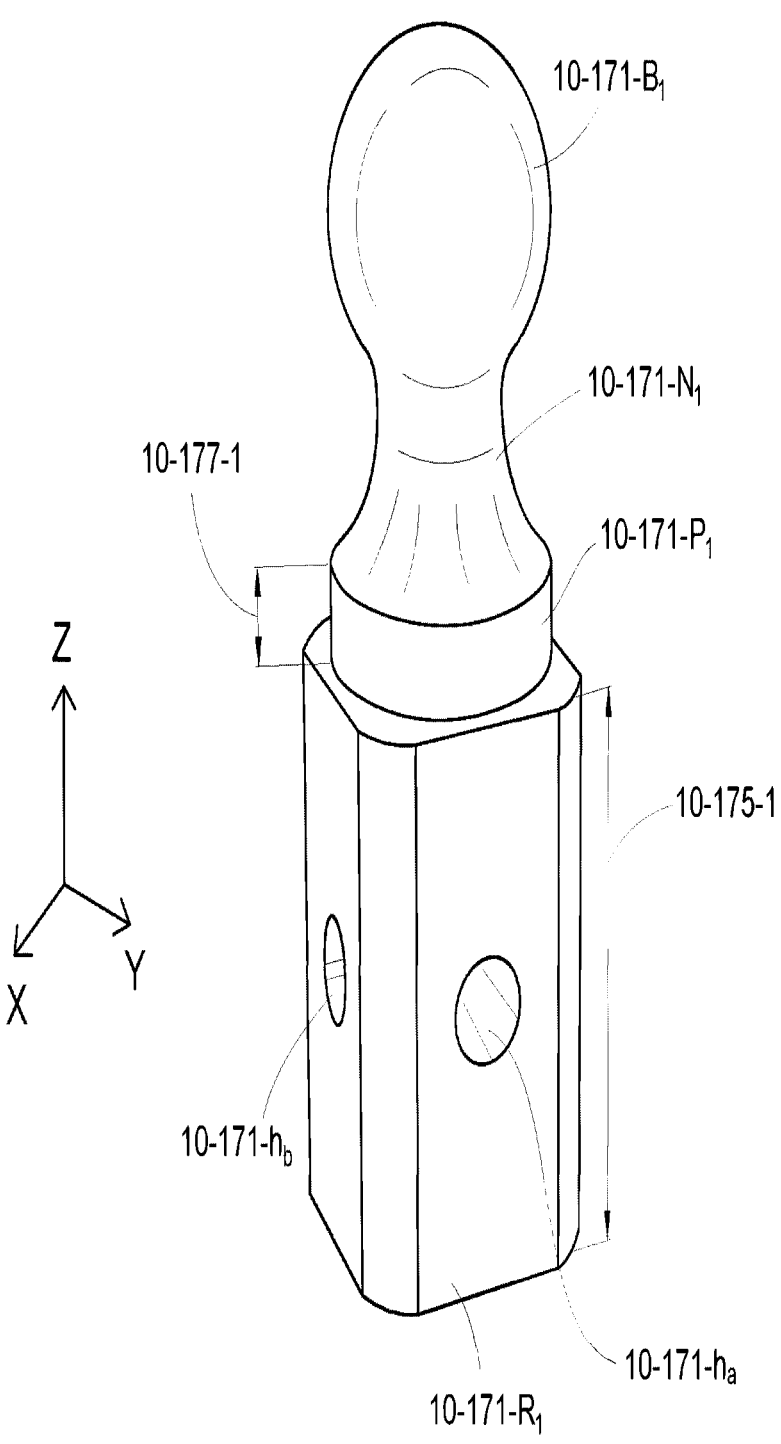
FIGS. 10A and 10B show front perspective views of ball hitches, in accordance with exemplary embodiments of the present invention, respectively.

FIGS. 7A and 7B show a top view and a cross sectional view, respectively, of a ball hitch to piston rod connection, in accordance with an exemplary embodiment of the present invention. Turning to FIG. 7A, a ball 171-B of a ball hitch 171 is shown with a ball diameter 171-$d$. In accordance with an exemplary embodiment, the ball diameter is $2\frac{5}{16}$ inches. The post 171-P which is beneath the ball, shown for example in FIG. 10A, is seen circumscribing ball 171-B in this view of the ball hitch. Referring again to FIG. 7A, continuing outward, a top surface 174 of a square 171-R base is shown in this top view. FIG. 7B shows a cross section view of a ball hitch to piston rod connection taken along line B-B in FIG. 7A. Turning to FIG. 7B, A ball connecting end 910 of rod 901 has a diameter 950. In accordance with an exemplary embodiment, diameter 950 is the same as the rod's diameter at cylinder exit and may be equal to 2.004 inches. The ball end of the rod 910 steps down to diameter 970, creating edge 912 upon which bottom edge 173 of ball hitch 171 abuts. Also shown in this cross section view is ball hitch 171 with a ball end 171-B, a neck 171-N, a post 171-P, and a square base 171-R. In accordance with an exemplary embodiment, the ball hitch 171 is an off the shelf ball hitch. Step down diameter 970 remains constant over the length 960-T-L of the inserting end 960-T of the rod's connecting end 910. The step down diameter 970 of rod 910 fits just inside the hollow of the square base 171-R. In accordance with an exemplary embodiment, the diameter 970 may be 1.5 inches, while length 960-T-L may be 2.625 inches. An end 961 of insertion end 960-T abuts up against a top inner side 178 of the square base 171-R. Also shown is locking through hole 171-A through the square base 171-R. In practice, in accordance with an exemplary embodiment, a through hole is present in the rod's insertion end 960-T and aligns with through hole 171-A. In accordance with another exemplary embodiment a weld is positioned at the corner edge formed with an outer side of ball connecting rod end 910 and bottom 173 of square base 171-R.

FIGS. 8A and 8B show a bottom view and a cross sectional view of retaining nut for a hydraulic cylinder, in accordance with an exemplary embodiment of the present invention. Turning to FIG. 8A, a rod opening 8-901-0 is shown at the center of the retaining nut for hydraulic cylinder 801. Two spanner wrench openings 802, 804 are shown 180 degrees apart. Line 8B-8B, shows the cross sectional view taken of the nut from FIG. 8A. Turning to FIG. 8B, the nut has an outer diameter 810. The outer threads on the nut 801, not shown, mate with threads 4-30, shown for example in FIG. 4B. the nut has a thickness 818, and holes 820-A and 820-B have a depth 812. In accordance with an exemplary embodiment, the thickness of the nut 815 is 0.375 inches, while the spanner hole depth 820-A, 820-B are both 0.25 inches.

FIGS. 9A and 9B show a top view and a side view along the axis of a piston rod, respectively, in accordance with an exemplary embodiment of the present invention. Turning first to FIG. 9A, the top view is taken from the piston head side 939 of the rod 901. The outermost rod diameter 950 of the rod extends across outer surfer 949. Turning to FIG. 9B, the rod 901 has a shaft portion 901-S and a head portion 901-H. The rod shaft's 901-S outer diameter 950 is shown in both FIGS. 9A and 9B. The outer surface 949 of the shaft of the rod 901 which extends and retracts is shown. Turning to FIG. 9B, the portion 901-H of the rod 901 is circumscribed by the head 641 when assembled, head not shown, and has a height 910. External threads, not shown, are present along surface 966 which mate with the spanner nut in recess 3-637-R. Moving from head 901-H to shaft 901-S, a nut gap 938 has a non-threaded decreased diameter 938 and is provided to limit the excursion of the nut and to assist in providing a stable mechanical connection. The step down in diameter nut gap 930 has a height 930, which in accordance with an exemplary embodiment may be 0.125 inches. Continuing along the rod 901 from head 901-H end to shaft 901-S a second diameter step 937, returning to 940 is made, with a height 920 spanning the 901-H head from shaft 901-S to nut gap 938. In accordance with an exemplary embodiment, the head portion 901-H diameter 940 is 1.5 inches, in accordance with an exemplary embodiment. And in accordance with an exemplary embodiment, the rod shaft 901-S diameter 950 may be 2.0 inches. A ball connecting end 910 of the rod, in accordance with exemplary embodiments is shown and described, for example, at FIGS. 7B, 23D, and 23F.

Figure 10B:
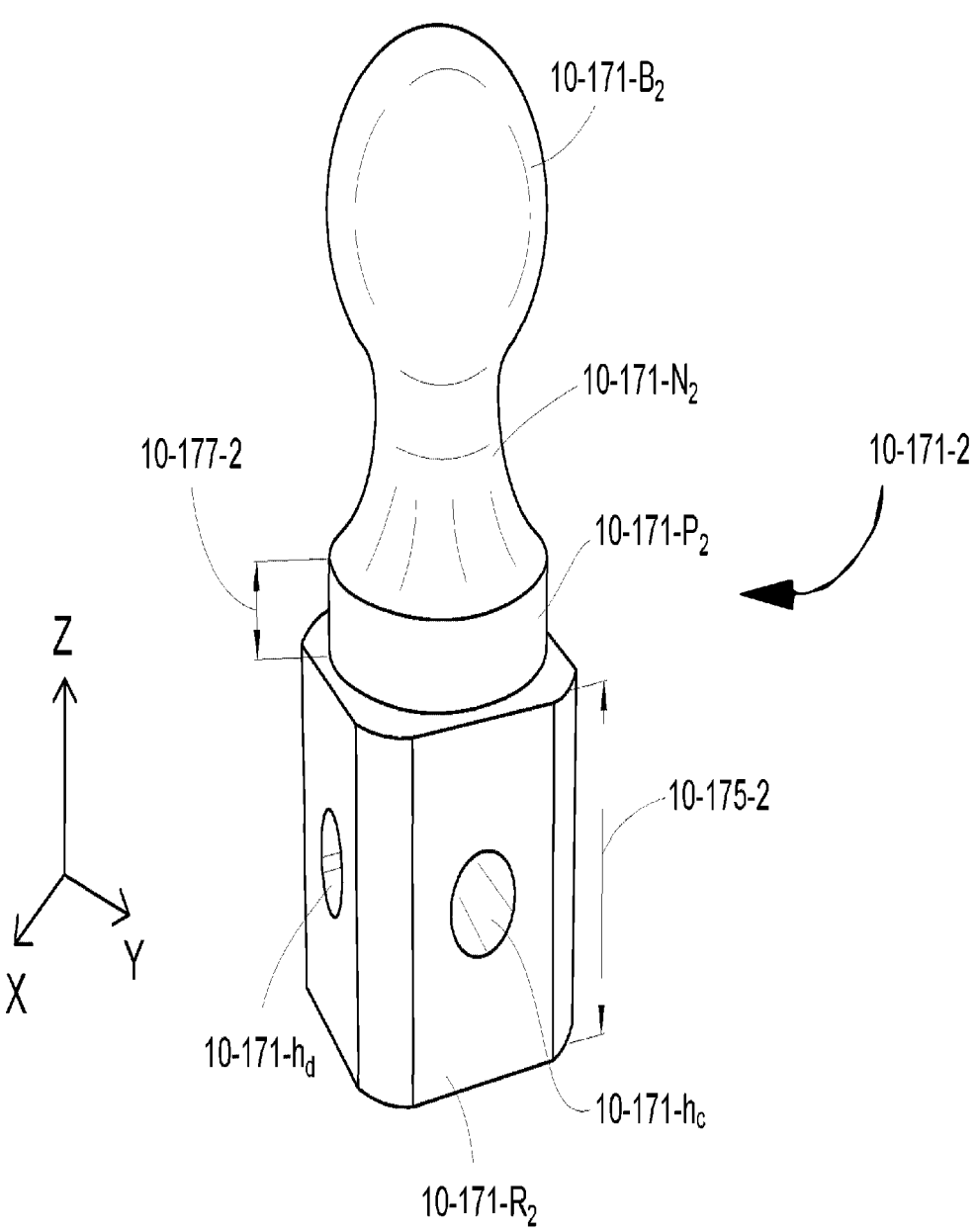

FIGS. 10A and 10B show front perspective views of ball hitches, in accordance with exemplary embodiments of the present invention, respectively. Embodiments of the present invention readily accommodate off the shelf ball hitches, which may be machined from a solid piece and are conventional; reference is now made to the same in furtherance of a detailed description. Turning to FIG. 10A, a ball hitch 10-171, such as a B&W ball hitch (B&W TRAILER HITCHES, *Turnover Ball*, Humboldt, Kansas, USA), is shown with a ball 10-171-B₁ atop a neck 10-171-N₁. The neck 10-171-N₁ integrates into a cylindrical post 10-171-P₁ which is integrated with a square base 10-171-R₁. The square base 10-171-R₁ has two perpendicular through holes 10-171-$h_a$, 10-171-$h_b$. In accordance with an exemplary embodiment a conventional post height 10-177-1 is used. And in accordance with the exemplary embodiment shown in FIG. 10, the height 10-175-1 of the square base 10-171-R₁ is 4 inches. Turning to FIG. 10B, a ball hitch 10-171-2, such as a B&W SHORT (B&W TRAILER HITCHES, *Turnover Ball*, Humboldt, Kansas, USA), is shown with a ball 10-171-B₂ atop a neck 10-171-N₂. The neck 10-171-N₂ integrates into a cylindrical post 10-171-P₂ which is fixed atop or integrated with a square base 10-171-R₂. The square base 10-171-R₂ has two perpendicular through holes 10-171-$h_c$, 10-171-$h_d$. In accordance with an exemplary embodiment a conventional post height 10-177-2 is used. And in accordance with the exemplary embodiment shown in FIG. 10B, the height 10-175-2 of the square base 10-171-R₂ may be 2.0 inches.

FIG. 11 shows a digital image of three rings, an extension directional ring, a retraction directional ring, and the center ring, in accordance with an exemplary embodiment of the present invention. Turning to FIG. 11, a round center ring 11-397 sits atop extension directional ring 11-396. Retraction direction ring 11-398 is shown above round center ring 11-397. When assembled, ring 11-398 will be seated above round ring 11-397 at the 11-397-398 interface. The assembled three rings 11-396, 11-387, 11-398 will seat into ring channel 648 of the piston head 3-642, shown for example in FIGS. 6B and 3B.

Figure 12:
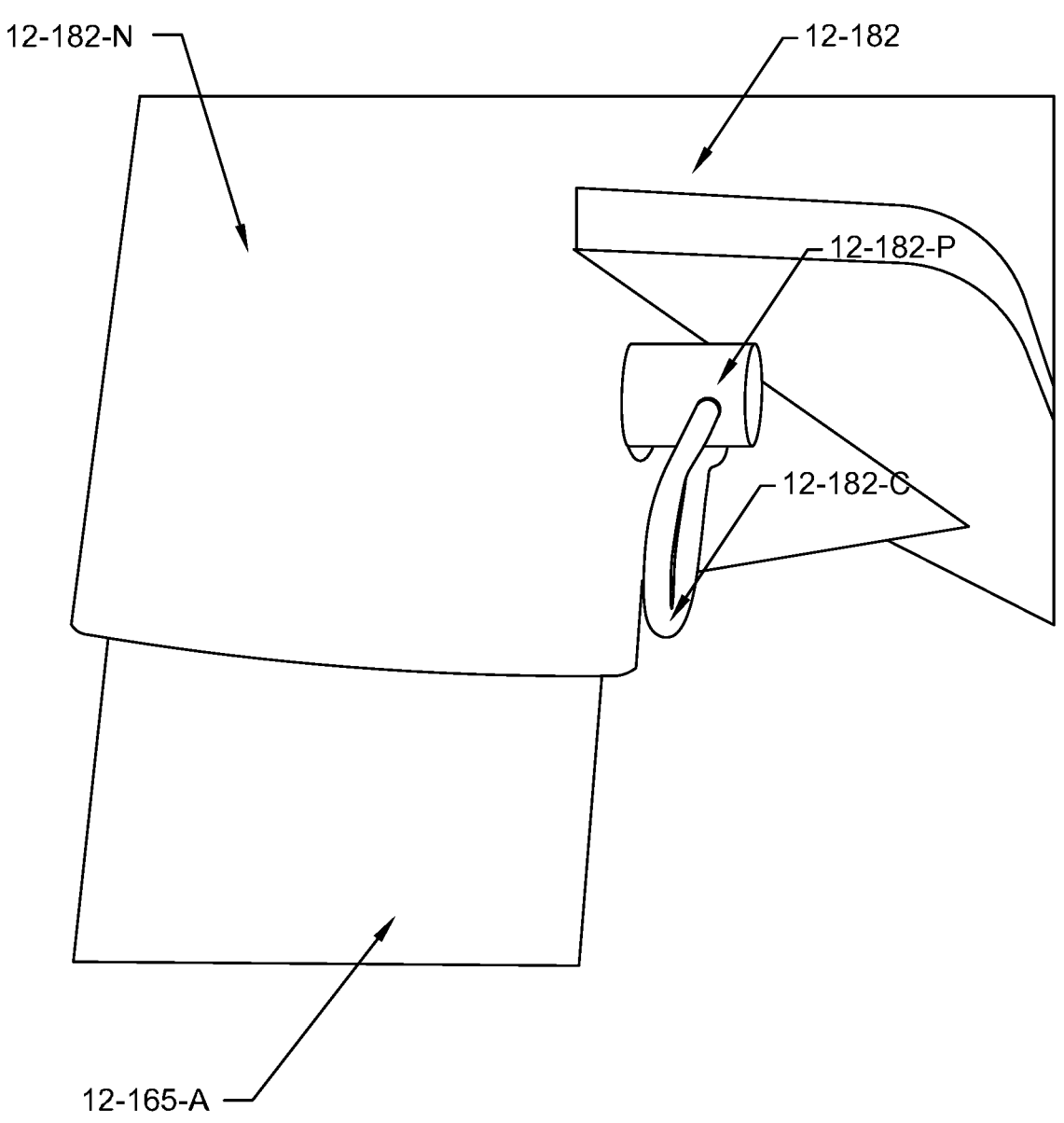
FIG. 12 shows a conventional gooseneck coupled to a pipe, in accordance with an exemplary embodiment of the present invention as applied to a conventional gooseneck trailer.

FIG. 12 shows an image of a conventional gooseneck coupled to a pipe, in accordance with an exemplary embodiment of the present invention as applied to a conventional gooseneck trailer. Turning to FIG. 12, a gooseneck trailer 12-182 is shown with the neck of the gooseneck 12-182-N. Exemplary embodiments of the present invention enable hydraulic coupling and uncoupling of a conventional trailer 12-182 and neck 12-182-N. Pipe 12-165-A is accommodated by a conventional trailer 12-182 and the pipe 12-165-A, in accordance with an exemplary embodiment, is of conventional diameter, height, and material. The pipe

12-165-A is shown secured to the neck at 12-182-N via post 12-182-P and cotter pin 12-182-P. Also shown is a cotter pin 12-182-C through the post 12-182-P end.

Figure 13:
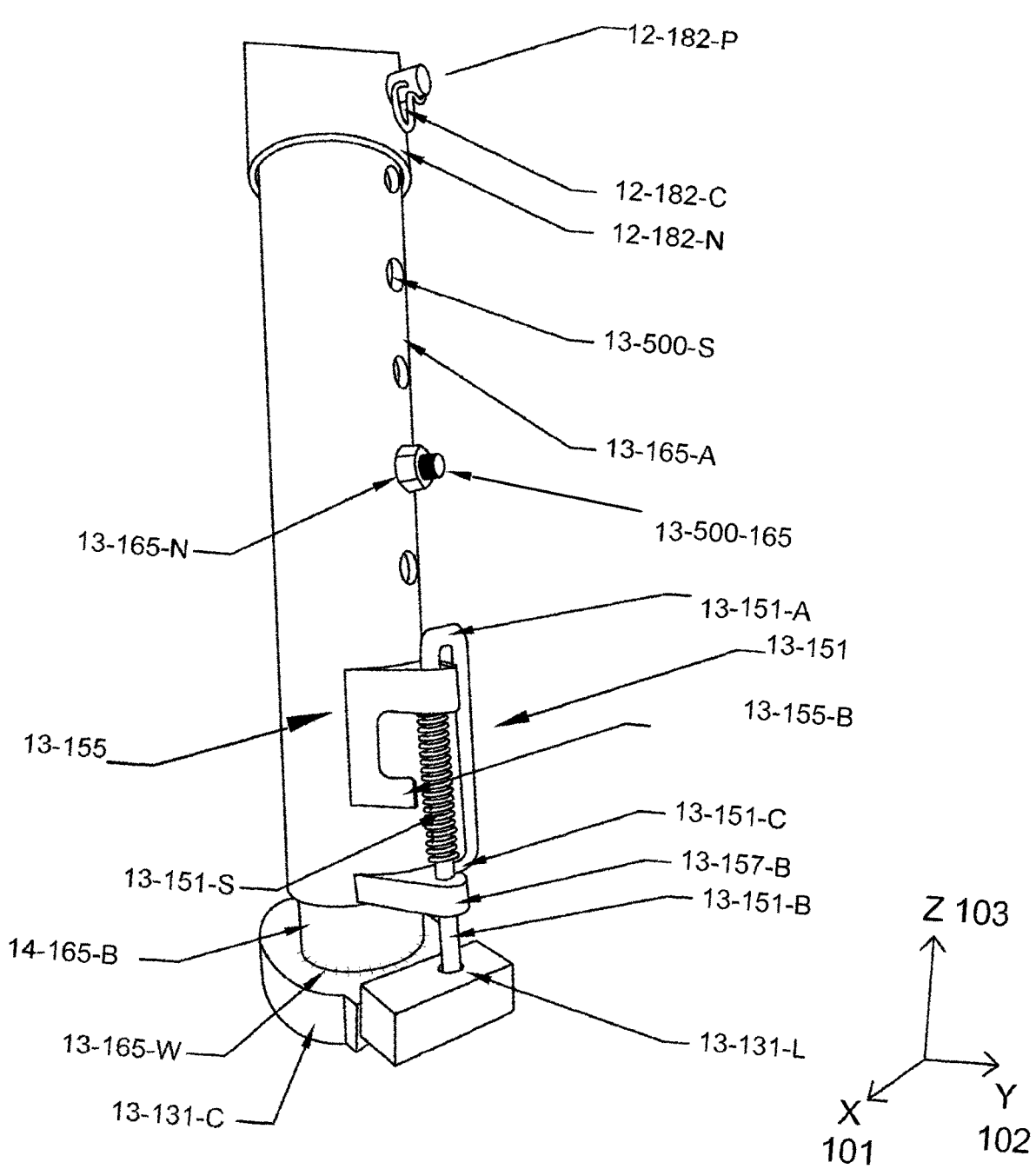
FIG. 13 shows a side view perspective of exterior connections of an exemplary embodiment of the present invention as applied to a gooseneck trailer from a side view perspective.

FIG. 13 shows exterior connections of an exemplary embodiment of the present invention secured to a gooseneck pipe, in accordance with an exemplary embodiment of the present invention from a side view perspective. Turning to FIG. 13, pipe 13-165-A is shown secured to the neck at 12-182-N via post 12-182-P and cotter pin 12-182-C. A series of through holes 13-500-S are shown in pipe 13-165-A. Extending from a bottom −Z 103 of pipe 13-165-A is inner pipe 13-165-B. Welded 13-165-W to inner pipe 13-165-B is coupler 13-131-C. In accordance with an exemplary embodiment of the present invention, neck 12-182, pipe 13-165-A, inner pipe 13-165-B and coupler 13-131-C are off the shelf components. Inner pipe 13-165-B is secured to pipe 13-165-A with bolt 13-500-165 passing through 13-500-S and a corresponding and aligned inner pipe 13-165-B through hole, hole not shown. Securing bolt 13-500-175 is nut 13-165-N. In accordance with an exemplary embodiment, nut 13-165-N may be a locking nut with washer, washer not shown, secures the bolt 13-500-165-A, anchoring the coupler 13-131-C and inner pipe 13-165-B into the pipe 13-165-A. In accordance with an exemplary embodiment, an alternate fastener, for example a quick release pin, may be used to secure inner pipe 13-165-B to the pipe 13-165-A for bolt 13-500-165.

A locking pin 13-151 with top bend 13-151-A, bottom bend 13-151-C and insertion end 13-151-B is shown. A bottom of locking pin 13-151-B is shown inserted into locking pin hole 13-131-L. And the locking pin bracket 13-155 is shown securing the locking pin's orientation and position relative to the pipe 14-165-A. A locking pin guide 13-157-B is welded beneath the pin bracket 13-155 and the insertion end 13-151-B passes there-through when the coupler 13-131-C is locked. Also shown is spring 13-151-S, which assists in keeping pin 151 in a locked position. Lower bracket part 13-155-B is used to raise end 13-151-B and lower bend 13-131-C unlocking coupler 13-131-C by removing end 13-151-5 from locking hole 13-131-L on the coupler 13-131-C. In accordance with an exemplary embodiment, the locking pin 13-155, bracket 13-155 and guide 13-157-B may be off the shelf or in alternate embodiment, any or all of the locking pin 13-155, bracket 13-155 and guide 13-157-B may be modified, in accordance with the present invention.

Figure 14:
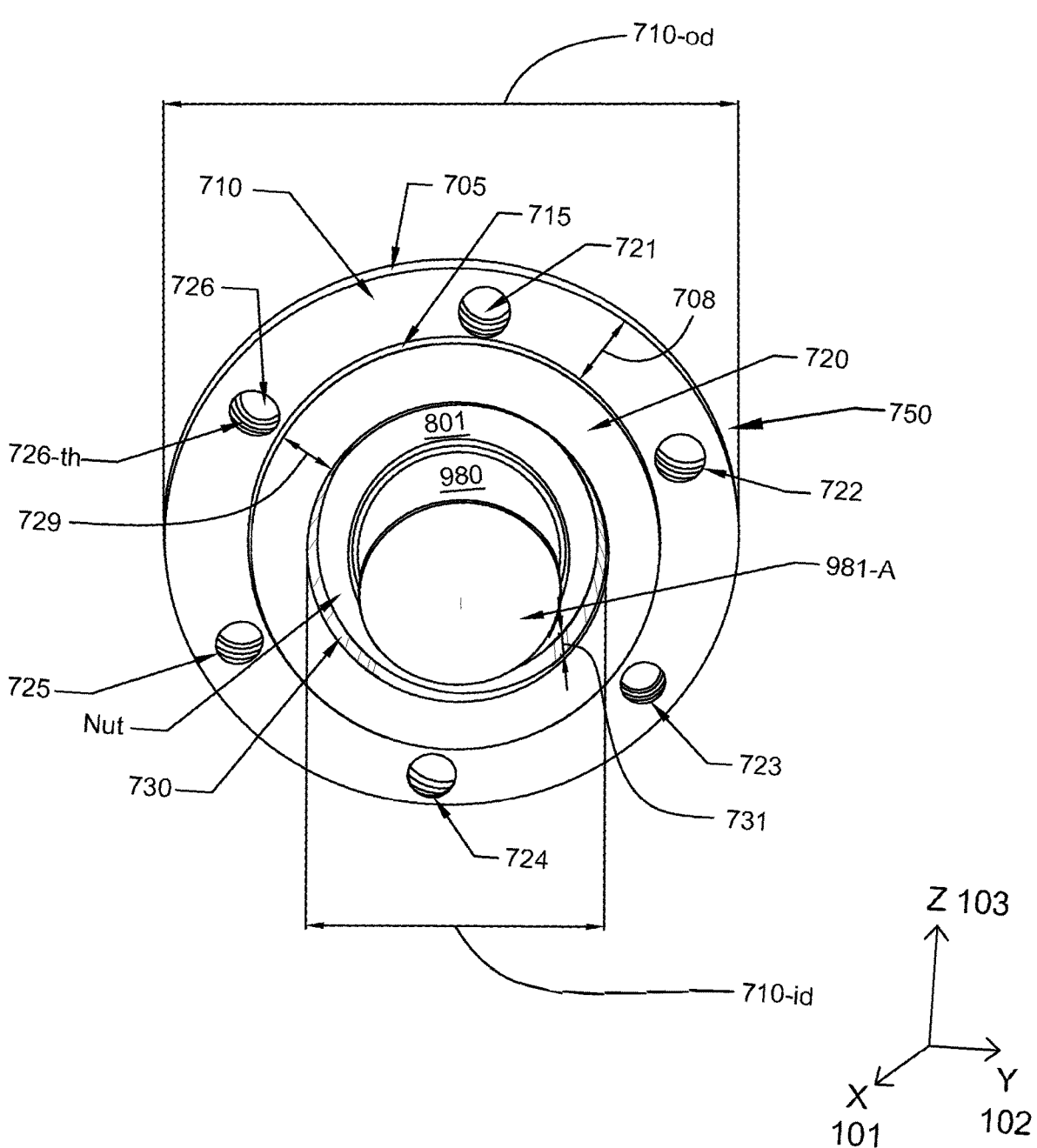
FIG. 14 shows a side view of the ball connecting end of a piston rod extending from a hydraulic cylinder, in accordance with an exemplary flat bed embodiment of the present invention.

FIG. 14 shows a front perspective view of the ball connecting end of a piston rod extending from a hydraulic cylinder, in accordance with an exemplary embodiment of the present invention. Turning to FIG. 14, a hydraulic cylinder mounting ring 750 is shown. Circular ring 750 has an outer diameter 710-*od* with an outermost edge 705. Ring 750 steps up to a new face level, inner face, 720 at middle edge 715. Edges 705 to 715 define the outer face 710. Inner face 720 spans from middle edge 715 to inner edge 730 forms a male lip. Evenly spaced about the circumference of outer face 710 are six mounting holes 721-726. Holes 721-726 are centered with respect to the outer edge 705 and the middle edge 715. Threaded holes, for example 727-th may be 0.5 inch diameter with 20 threads per inch. In accordance with an exemplary embodiment, outer diameter 710-*od* may be 7 inches. The outer face 710 has radial distance 708, while inner face 720 has a radial distance 729. In accordance with an exemplary embodiment, distance 708 may be 1.25 inches and distance 729 may be 0.75 inches. Inside ring 750, inside inner edge 730, the retaining nut 801 for hydraulic cylinder is visible in this view. Retaining nut

Figure 15:
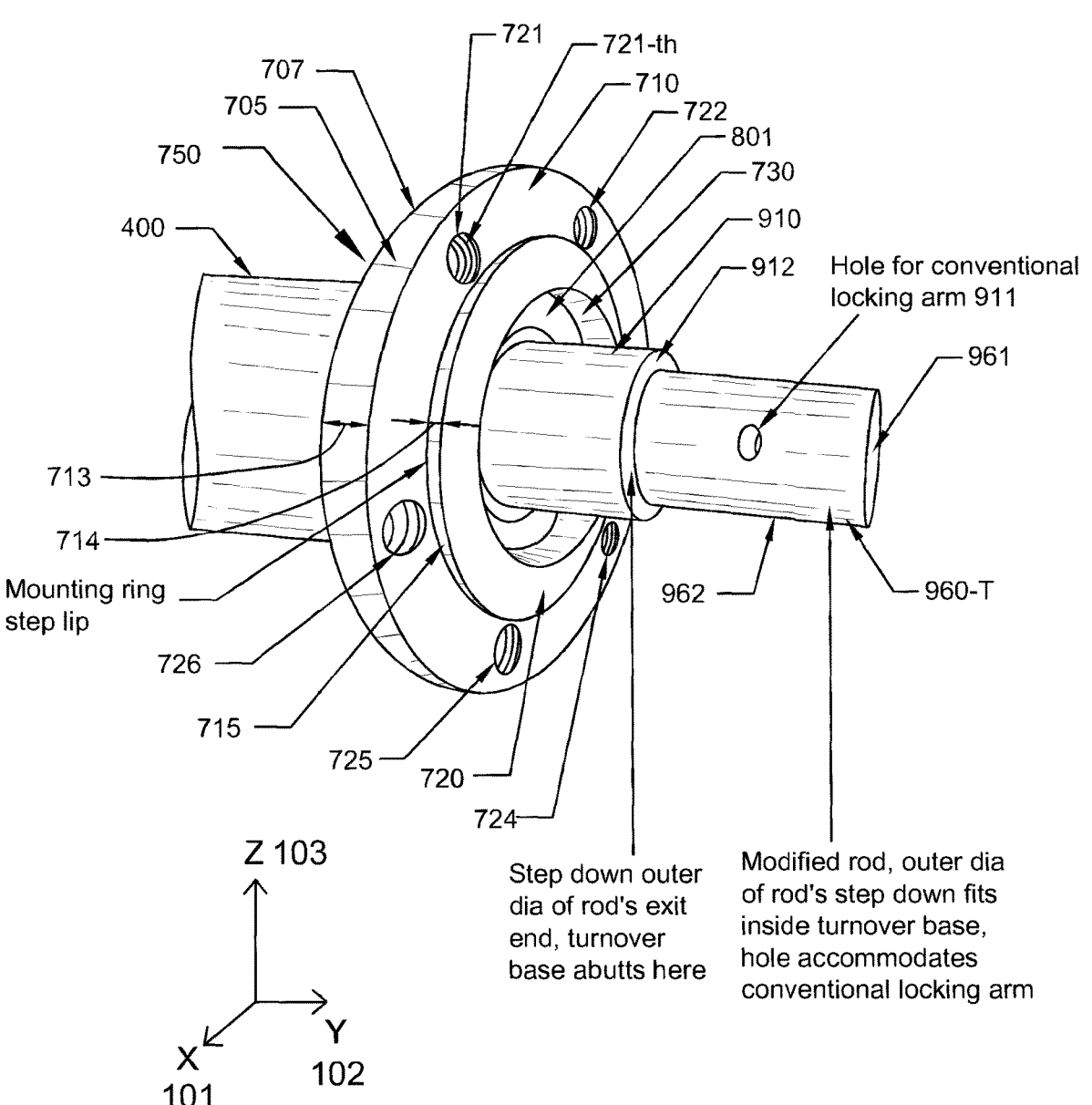
FIG. 15 shows a side perspective view of the ball connecting end of a cylinder and rod, in accordance with another exemplary embodiment of the present invention.

801 is shown, for example in FIG. 8A. Referring again to FIG. 14, retaining nut 801 circumscribes piston rod 980 at the rod's ball hitch end 981-A, where the custom rod end 981 is shown, for example in FIG. 20B and is described in more detail with reference to the same. Turning again to FIG. 14, inner edge 730 has a height 731. In accordance with an exemplary embodiment, height 731 may be 0.875 inches. Inner edge 730 forms the inner diameter 710-*id* of mounting ring 750. In accordance with an exemplary embodiment, the inner diameter 710-*id* may be 3.0 inches FIG. 15 shows a side perspective view of the ball connecting end of a piston rod extending from a hydraulic cylinder, in accordance with an exemplary embodiment (B&W) of the present invention. From the left, −Y, hydraulic cylinder 400 is shown with mounting ring 750. The position of back side 707 of mounting ring 750 is shown. Outer edge 705 has a height 713. In accordance with an exemplary embodiment, the height 713 may be 0.50 inches. Middle edge 715 has a height 714. In accordance with an exemplary embodiment, the height 714 may be 0.375 inches. Mounting holes 721, 722, 724, 725, and 726 are shown. Inner face 720 is shown spanning from middle edge 715 to inner edge 730. Inner edge 730 circumscribes retaining nut 801. Exiting out of the cylinder 400 from retaining nut 801 is the ball connecting end 910 of the piston rod 960-T. The connecting end 910 steps down 912 to a second diameter and forms ball mounting end 962. End face 961 will meet an inner surface of a top inner side 178 of the square base 171-R, shown for example in FIG. 7B. Referring again to FIG. 15, In accordance with the exemplary embodiment of FIG. 125, the inserting end 960-T of the ball hitch connecting end 910 of the piston rod accommodates a B&W turnover ball hitch (B&W TRAILER HITCHES, *Turnover Ball*, Humboldt, Kansas, USA). Also shown in the view of FIG. 15 is through hole 711 which accommodates a conventional turnover ball locking arm (B&W TRAILER HITCHES, *Turnover Ball*, Humboldt, Kansas, USA).

Figure 16:
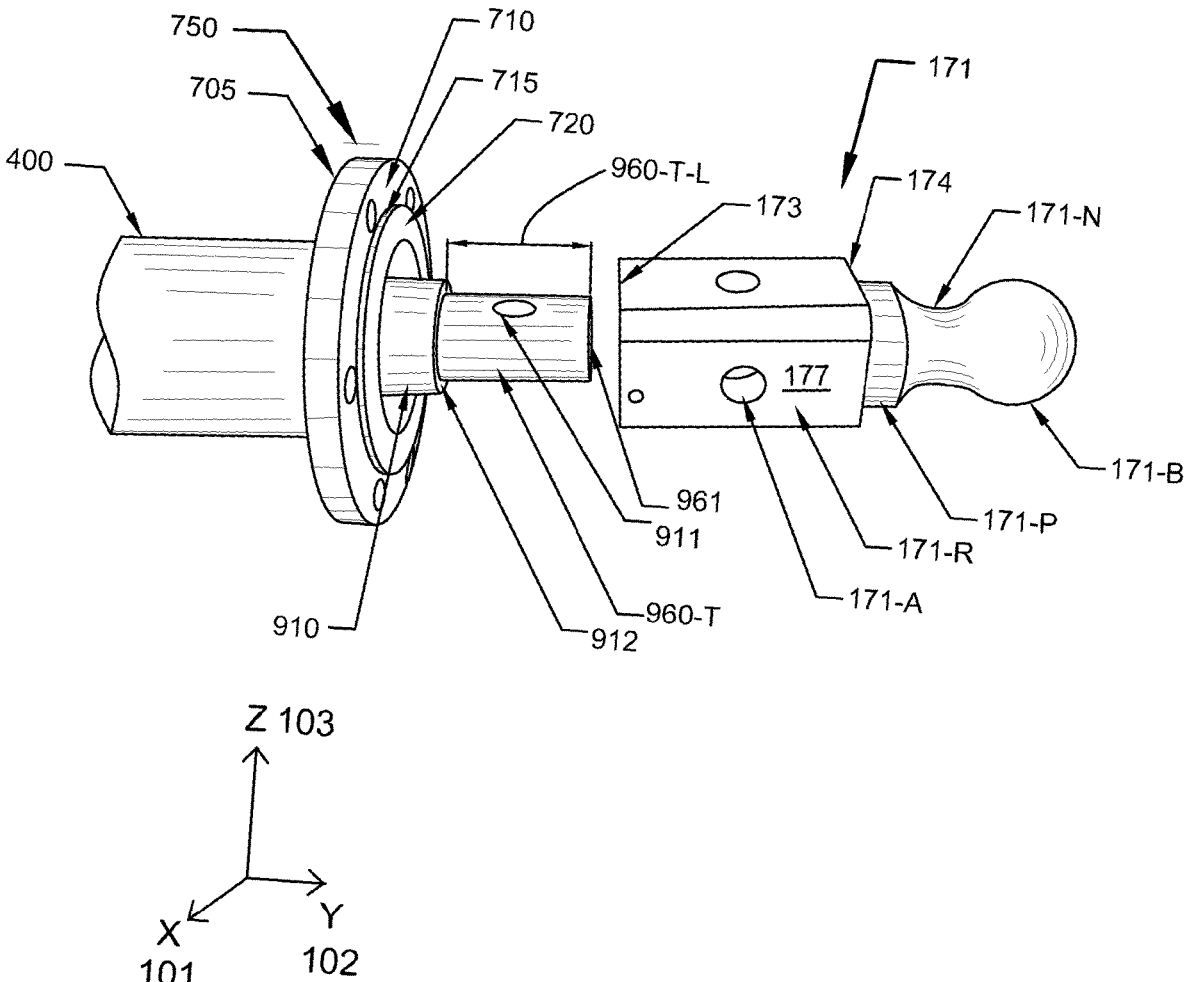
FIG. 16 shows a side perspective view of a piston rod's ball connecting end and ball hitch in an exploded view, in accordance with an exemplary embodiment of the present invention.

FIG. 16 shows a side perspective view of a piston rod's ball connecting end and ball hitch in an exploded view, in accordance with an exemplary embodiment of the present invention. Turning to FIG. 16, from the −Y direction, hydraulic cylinder 400 is shown with outer edge 705 of mounting ring 750. Outer face 710 is shown spanning from outer edge 705 to middle edge 715 and inner face 720 is shown circumscribing the ball connecting end 910 of the piston rod. The ball inserting end 960-T has a length 960-T-L. In accordance with an exemplary embodiment length 960-T-L may be 2.5 inches. Ball connecting end 910 steps down to the insertion end 960-T forming face 912 upon which a bottom edge 173 of the square base 171-R will abut. The ball 171-B is shown and moving toward the insertion end 960-T of the rod the neck 171-N and post are shown 171-P. When assembled, inserting end 960-T is press fit into base 171-R. In accordance with an exemplary embodiment, a notch is machined in inserting end 960-T and mates with a groove disposed in an inner side of base 171-R, notch and groove not shown. A top surface 174 of a square 171-R base is shown. A locking arm through hole 171-A is shown disposed in face 177 of the square base 171-R. In accordance with an exemplary embodiment of the present invention, ball 171 is secured to insertion end 960-T of the piston rod by press fit and with holes 911 and 171-A aligned to afford pass-through of a conventional locking arm. The locking arm passes through both locking through-hole 171-A and through locking hole 911 in insertion end 960-T. In accordance with an exemplary embodiment, an off the shelf locking arm can be used to lock the turnover ball in position when the rod is retracted and top surface 174 is flush with the truck bed. When in hydraulic extension and or retraction mode for coupling or uncoupling, a locking arm is removed from holes 911 and 171-A.

Turning to FIG. 16, from the −Y direction, hydraulic cylinder 400 is shown with outer edge 705 of mounting ring 750. Outer face 710 is shown spanning from outer edge 705 to middle edge 715 and inner face 720 is shown circumscribing the ball connecting end 910 of the piston rod. The ball inserting end 960-T has a length 960-T-L. In accordance with an exemplary embodiment length 960-T-L may be 2.5 inches. Ball connecting end 910 steps down to the insertion end 960-T forming face 912 upon which a bottom face 173 of the square base 171-R will abut.

Figure 17:
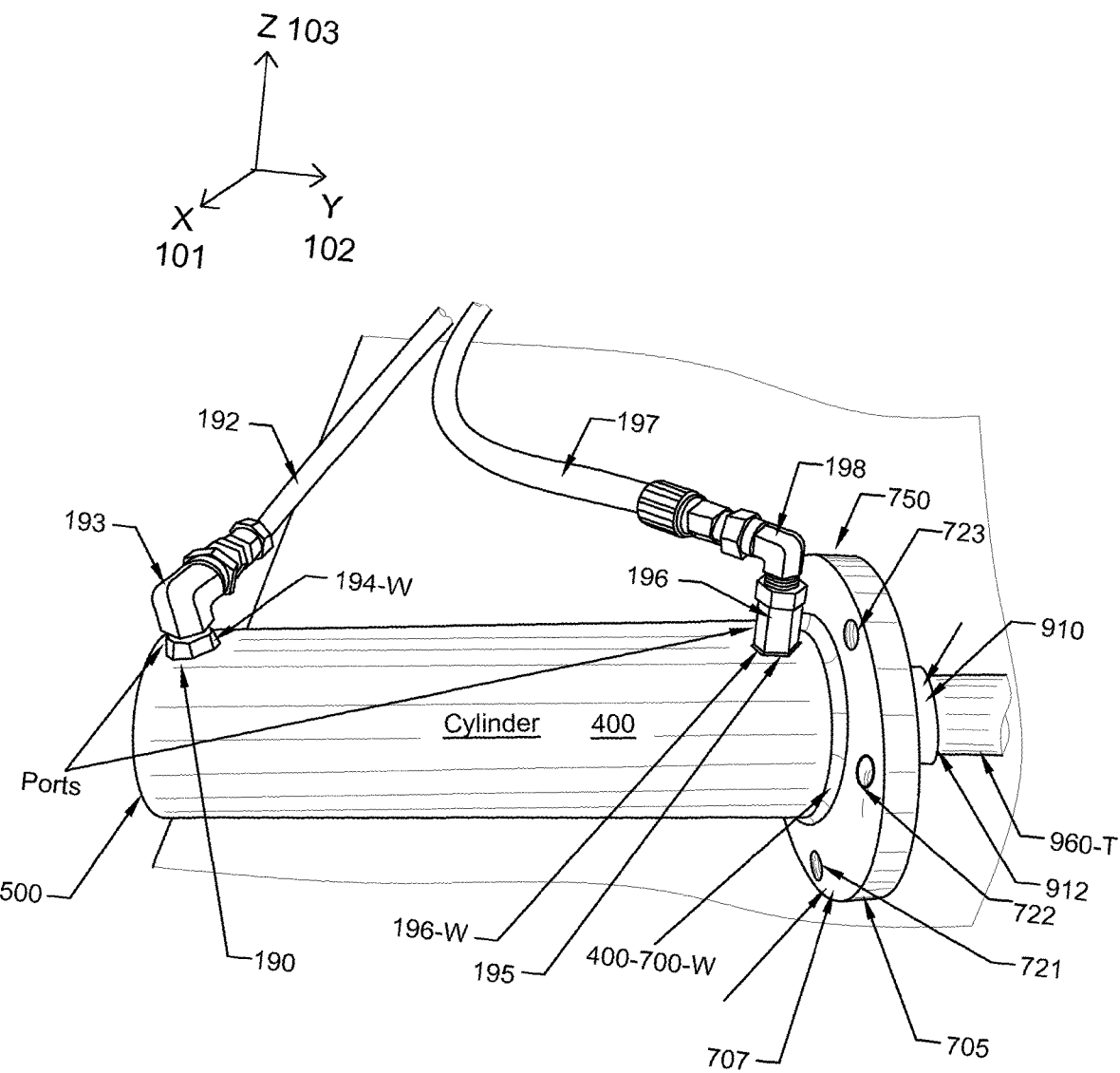
FIG. 17 shows hydraulic connections to a cylinder and a piston rod extending from the cylinder, in accordance with an exemplary embodiment of the present invention.

FIG. 17 shows a front perspective view hydraulic connections to a cylinder and a piston rod extending from the cylinder, in accordance with an exemplary embodiment of the present invention. Turning to FIG. 17, the hydraulic cylinder is resting on a plane surface XY. Two hydraulic ports 195, 190 provide the input port for the rod extension stroke 190 and the input port for the rod retraction stroke 195. Input extension port 190 is displaced in top cap 500 and retraction port 195 is displaced near mounting ring 750. Three mounting holes 721, 722, and 723 can be seen in this view. Weld 400-700-W affixes the mounting ring 750 to the exit end of the cylinder 400. Hydraulic fitting 196 is welded 196-W to input port 195. Hydraulic fitting 193 is welded 194-W to input port 190. Fitting 193 is an elbow fitting, while elbow 198 is connected to straight fitting 196. Hydraulic lines 192, 197 connect to hydraulic fittings 193, 196, respectively. Outer edge 705 is shown in the foreground, +X, and moving toward the rod exit end, +Y, the step down 912 of the rod's ball connecting end is shown before the rod insertion end 960-T. The rod's ball connected end 910 is shown towards, −Y, the mounting ring 750, from the step down 912. The back side 707 of the mounting ring 750 is clearly visible in this view. The mounting ring 750 is press fit across its inner diameter and the hydraulic cylinder 400 outer diameter 4-37-*o*, shown in FIG. 4B and then welded, in accordance with an exemplary embodiment. In an alternate exemplary embodiment mounting ring 750 and cylinder 400 may be machined from a single stainless steel piece.

Figure 18A:
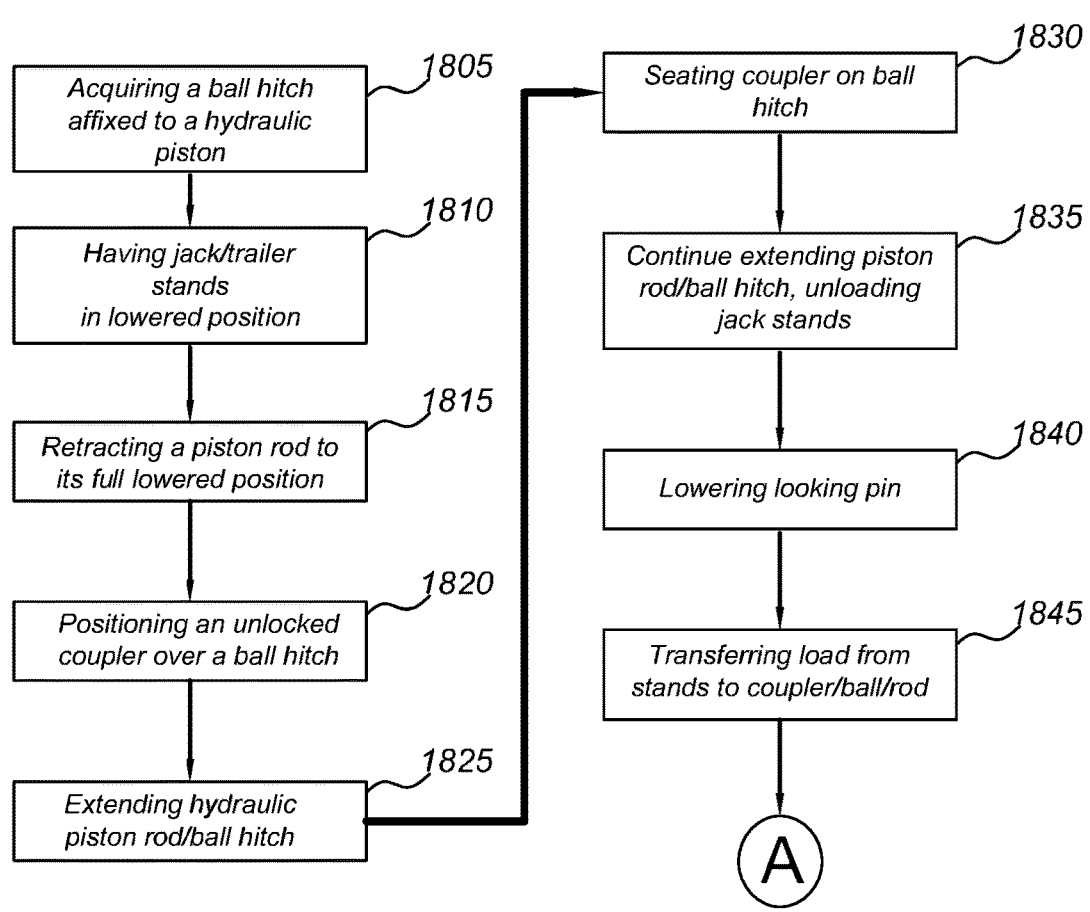
FIGS. 18A and 18B show exemplary methods of coupling a ball hitch to a trailer, in accordance with respective exemplary embodiments of the present invention.

FIG. 18A shows an exemplary method of lowering a ball coupler to a trailer hitch in accordance with an embodiment of the present invention. Turning to FIG. 18A, the exemplary method includes: acquiring a ball hitch affixed to a hydraulic piston 1805; having jack trailer stands in lowered position 1810; retracting a piston rod to its full lowered position 1815; positioning an unlocked coupler over a ball hitch 1820; extending rod-ball hitch via hydraulics 1825; seating coupler on ball hitch 1830; continue extending piston-ball hitch, unloading jack stands 1835; lowering the locking pin 1840 d transferring load from stands to coupler-ball-rod 1845.

Figure 18B:
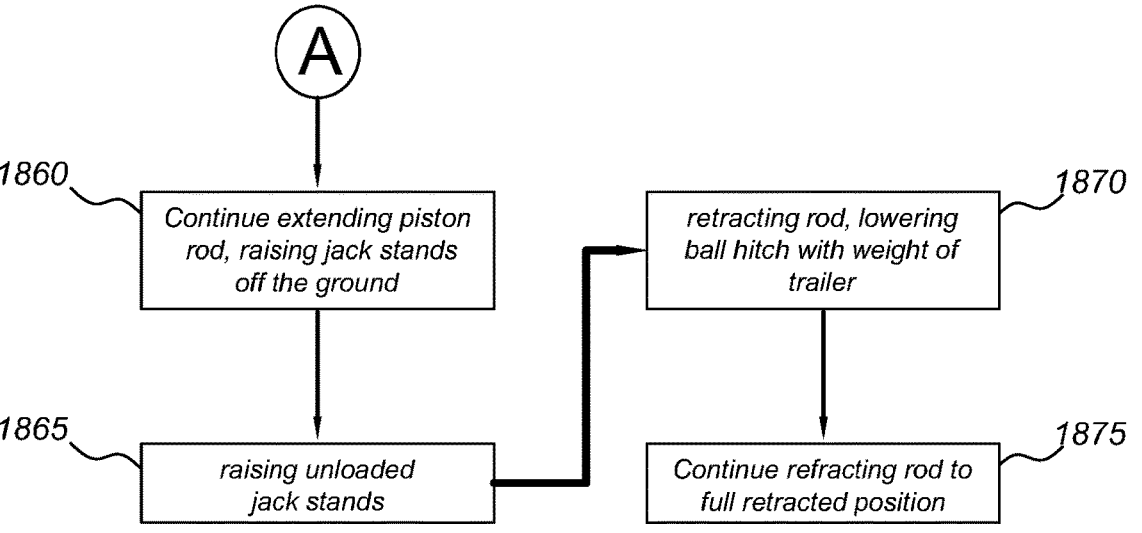

FIG. 18B shows an exemplary method of coupling a ball coupler to a trailer hitch in accordance with an embodiment of the present invention. Turning to FIG. 18B, a method of coupling a hydraulic coupler may include the methods of FIG. 18A and may further include: continue extending piston rod, raising jack stands off the ground 1860; raising unloaded trailer jack stands 1865; retracting the rod, lowering the ball hitch with the weight of the trailer on it 1870; and continue retracting the rod to its full retracted position 1875, Methods of the present invention may include any of the elements shown in FIGS. 18A and 18B and additional method elements as well.

FIG. 19A shows an exemplary method of uncoupling a ball coupler from a ball hitch in accordance with an exemplary embodiment of the present invention. Turning to FIG. 19A, the exemplary method includes: extending a retracted rod with ball hitch coupled to a trailer 1905; continue extending rod, raising pipe-ball hitch 910; reaching full or near full extension and lowering jack stands 1915; raising locking pin, unlocking coupler 1920; retracting rod, lowering ball hitch; and transferring weight of trailer onto lowered jack stands 1930.

FIG. 19B shows a method of uncoupling a hydraulic coupler from ball hitch, in accordance with an exemplary embodiment of the present invention. The method of uncoupling a hydraulic coupler in accordance with an exemplary embodiment of the present invention may further include: continuing to retract rod to its full downward retracted position 1935 and driving away from the trailer on stands with the coupler clearing the ball hitch 1940. Methods of the present invention may include any of the elements shown in FIGS. 19A and 19B and additional method elements as well.

Figure 20A:
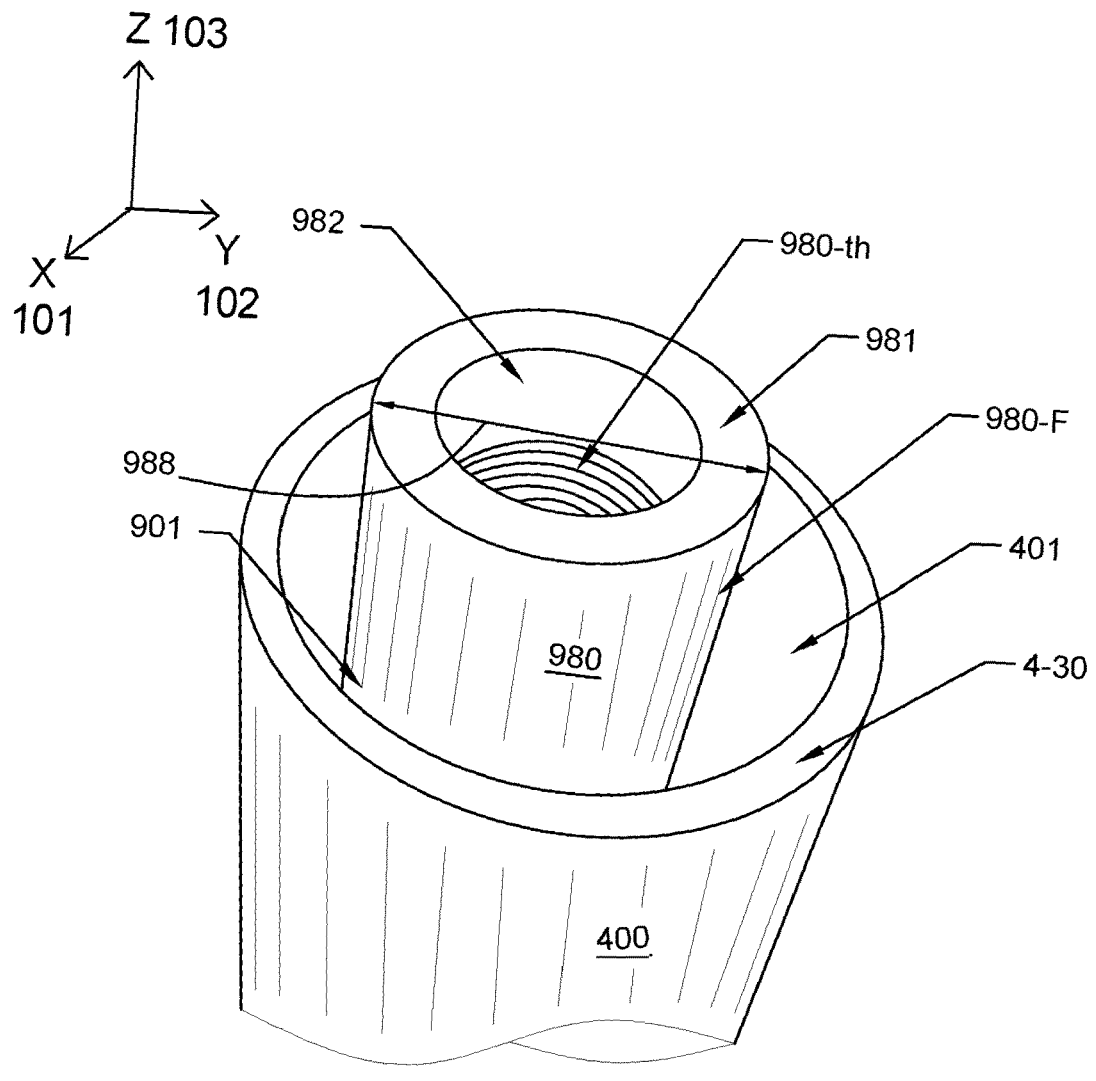
FIG. 20A shows a side perspective view of ball connecting end of a piston rod placed in a cylinder, in accordance with an embodiment of the present invention; hitch are shown.

FIG. 20A shows a side perspective view of the ball connecting end of a piston rod place in a cylinder, in accordance with an embodiment of the present invention. A piston rod 901 sits inside a hydraulic cylinder 400 and both sit on a same XY surface; the rod and cylinder are not assembled and positioned for illustrative purposes. Turning toward the top, +Z, the rod has ball connecting end 980 with a hollow center 982. The rod connecting end 980 has a ball meet surface 981. Internal threads are cut 980-th in the hollow 982 of rod 901. The outer diameter 988 of the rod connecting end 980 is shown. In accordance with an exemplary embodiment, outer diameter 988 is 2.5 inches.

Figure 20B:
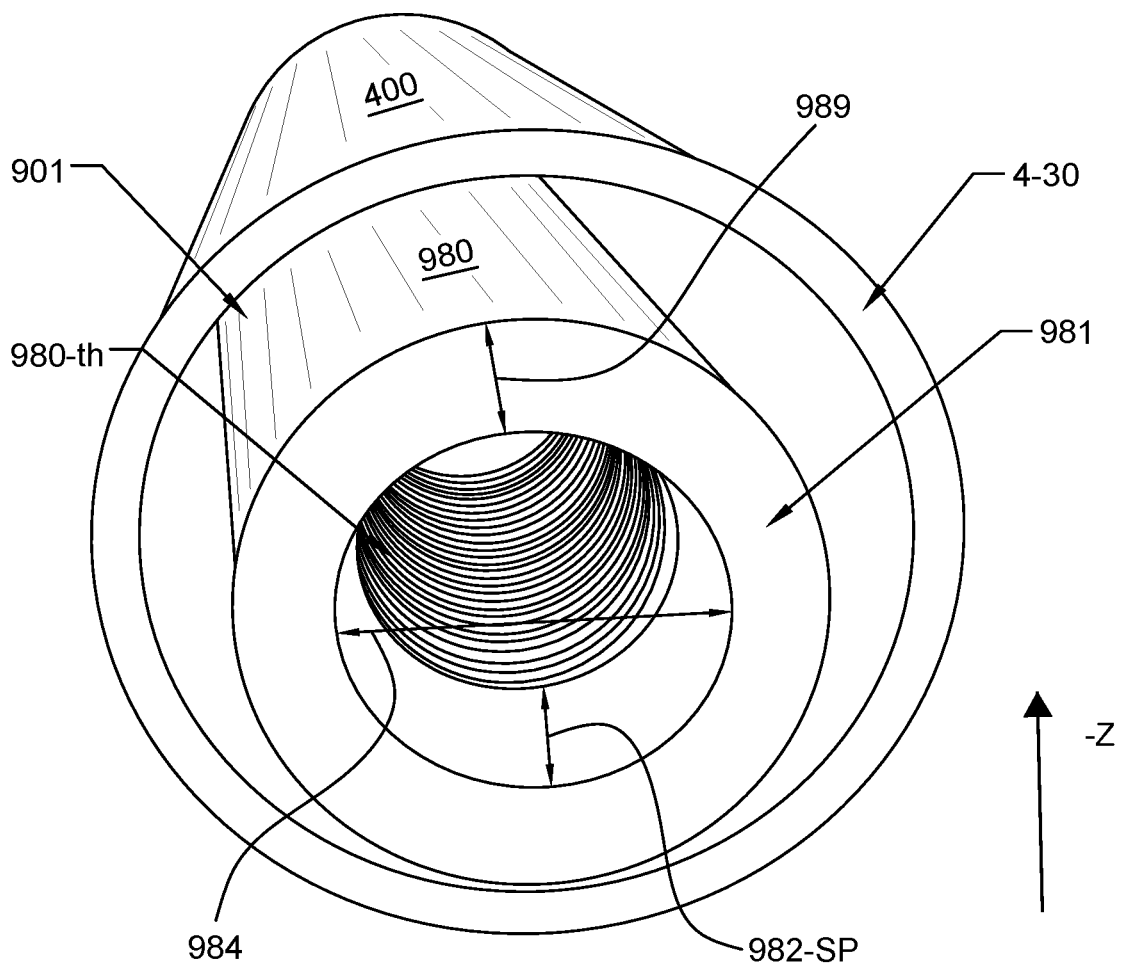
FIG. 20B shows a top perspective view of ball connecting end of a piston rod place in a cylinder, in accordance with an embodiment of the present invention.

FIG. 20B shows a top perspective view of the ball connecting end of a piston rod place in a cylinder, in accordance with an embodiment of the present invention. In this view, a width 989 of meet surface 981 is shown. In accordance with an exemplary embodiment, width 989 may be 0.75 inches. Also shown in this view is the exit end 4-30 of the hydraulic cylinder 400. The diameter of the rod's bored end 984 is shown. The rod hollow 982 has a diameter 984. In accordance with an exemplary embodiment, diameter 984 may be a 1 inch with a smooth bore 982-SP followed by 1 inch internal national threads 980-th in the −Z direction. In accordance with an exemplary embodiment, internal threads 980-th mate with the external threads of an off the shelf flatbed ball hitch 2⁵⁄₁₆ inches. In accordance with an exemplary embodiment, smooth bore distance 982-*sp* is 0.75 inches-Z from the ball meet surface 981.

Figure 20C:
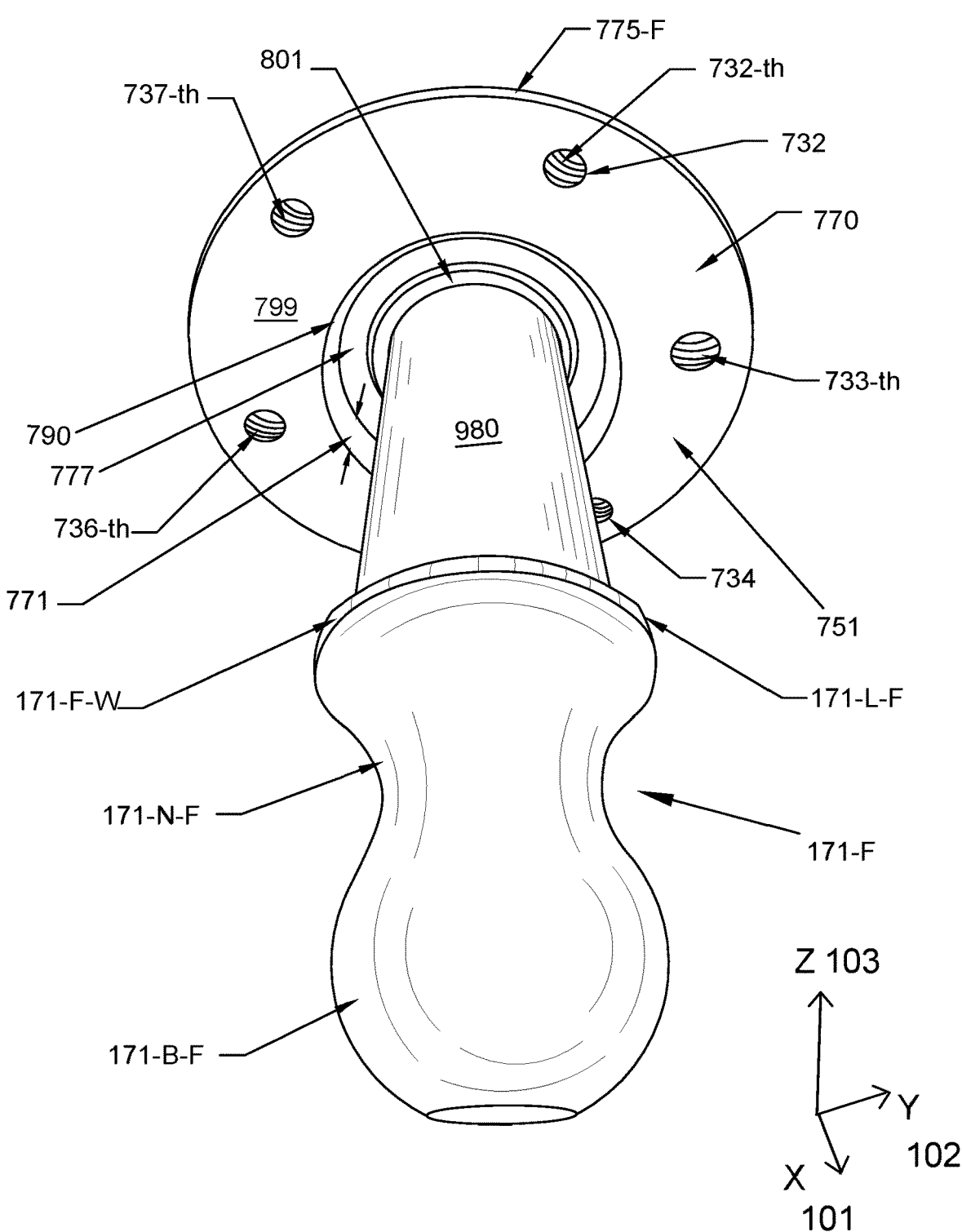
FIG. 20C shows a top perspective view of a ball connected to a rod extending from a hydraulic cylinder, in accordance with an embodiment of the present invention.

FIG. 20C shows a top perspective view of a ball connected to a rod extending from a hydraulic cylinder, in accordance with an embodiment of the present invention. Turning to FIG. 20C, a flatbed ball hitch 171-F is shown in the foreground +X 101. The ball hitch 171-F is welded 171-F-W to a rod's ball connecting end 980. The inner threads of the rod, shown for example in FIG. 20B, are mated with external threads, not shown, of the flatbed ball hitch 171-F. The weld 171-F-W is at the junction of the rod's 980 outer surface and the lip 171-L-F of the ball hitch 171-F. The ball 171-B-F, and the neck 171-N-F are also shown in this view. The rod 980 is shown extending, +X, from a top mounting ring 751 and is circumscribed by the retaining nut 801 of the hydraulic cylinder, which is visible through an inner opening of the top mounting ring's 751 inner face 777. Front face 770 drops, −X, to the inner face 777 at inner edge 790, where the inner edge 790 has a height 771. In accordance with an exemplary embodiment, this inner edge 790 height 771 may be 0.625 inches. A mounting hole 722 is shown with threads 722-*th*, further five of six threaded holes 732-*th*, 733-*th*, 734-*th*, 736-*th*, and 737-*th* are shown. In accordance with an exemplary embodiment, threaded holes 732-*th*-737-*th* may be 0.5 inches at 20 threads per inch. The outer edge 775 of the flat mounting plate 750-F is shown in this view. When assembled, ring 750, shown for example in FIG. 14, is bolted to top mounting ring 751. A top face 799 of top ring 751 is shown.

Figure 20D:
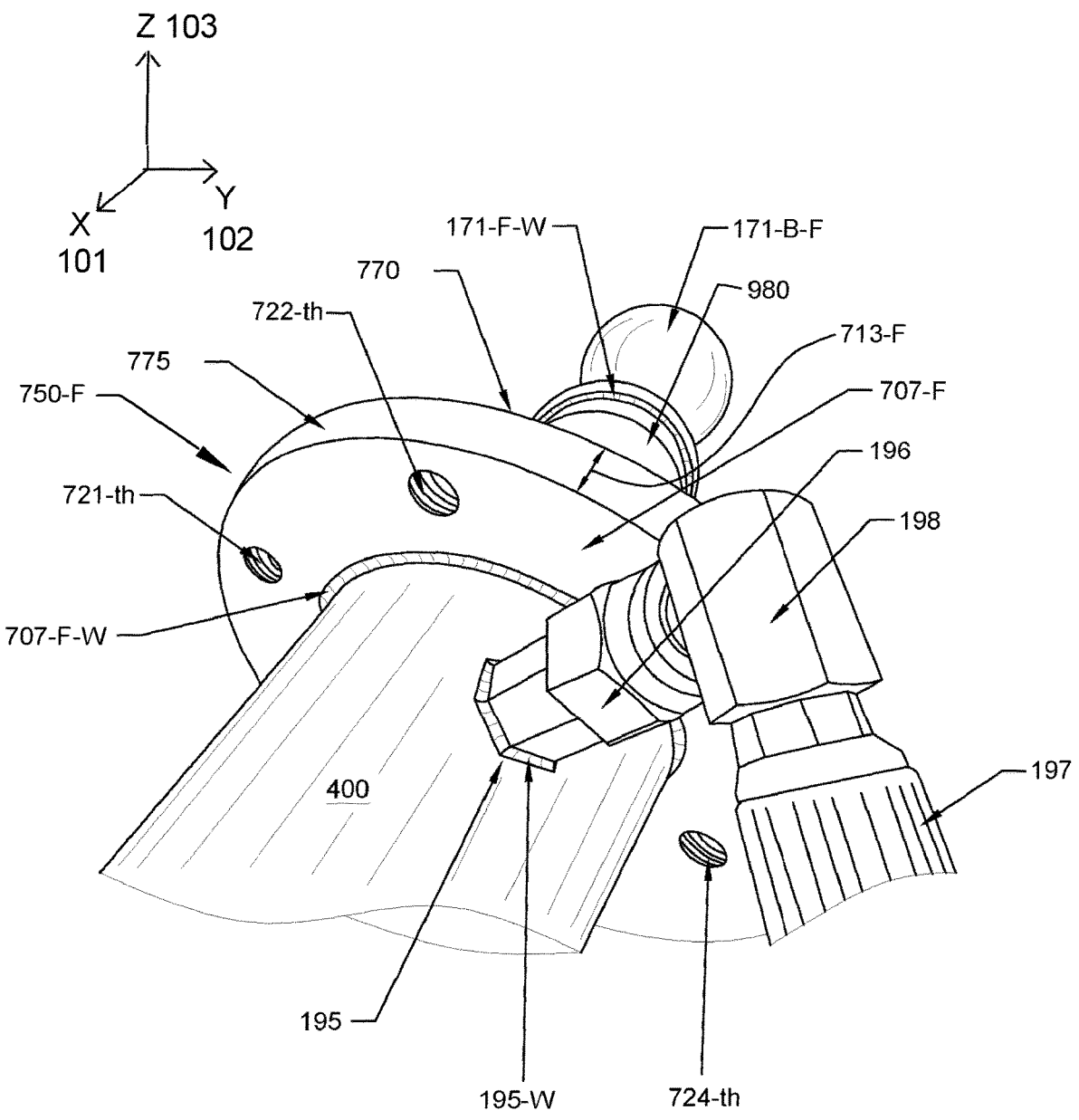
FIG. 20D shows bottom perspective partial view of a hydraulic ball hitch lift, in accordance with an embodiment of the present invent, in accordance with an embodiment of the present invention.

FIG. 20D shows bottom perspective partial view of a hydraulic ball hitch lift, in accordance with an embodiment of the present invention. In accordance with an exemplary embodiment, a hydraulic cylinder piston assembly, shown for example in FIG. 1B, is mounted underneath a flatbed truck. Turning to FIG. 20D, a conventional flatbed ball hitch 171-F-B is secured onto an exit end of a piston rod 980. The hydraulic cylinder 400 is resting on a plane surface XY. One of two hydraulic ports 195 is shown and provides the input port for the rod retraction stroke 195. Input retraction port 195 is displaced near flat mounting ring 750-F. Three threaded mounting holes 721-*th*, 722-*th*, and 723-*th* can be seen in this view. A back face 707-F of the lower mounting ring 750-F is clearly shown in this view. Weld 707-F-W secures lower flat mounting ring 750-F to the exit end of the cylinder 400. The back side 707 of the mounting ring 750 is clearly visible in this view. The mounting ring 750-F, shown for example in FIG. 20D, is press fit across its inner diameter and the hydraulic cylinder 400 outer diameter 4-37-*o*, shown in FIG. 4B, in accordance with an exemplary embodiment. Hydraulic fitting 196 is welded 195-W to input port 195. Fitting elbow 198 is connected to straight fitting 196. Hydraulic line 197 connects to hydraulic fittings 198. Outer edge 775 is shown in the foreground, +X, and an edge of front face 770 is shown in this view. The ball 171-F-B is welded 171-F-W to the ball connecting end 980 of the rod. The mounting plate edge 775 has a height 713-F. In accordance with an exemplary embodiment, height 713-F is 0.5 inches.

Figure 20E:
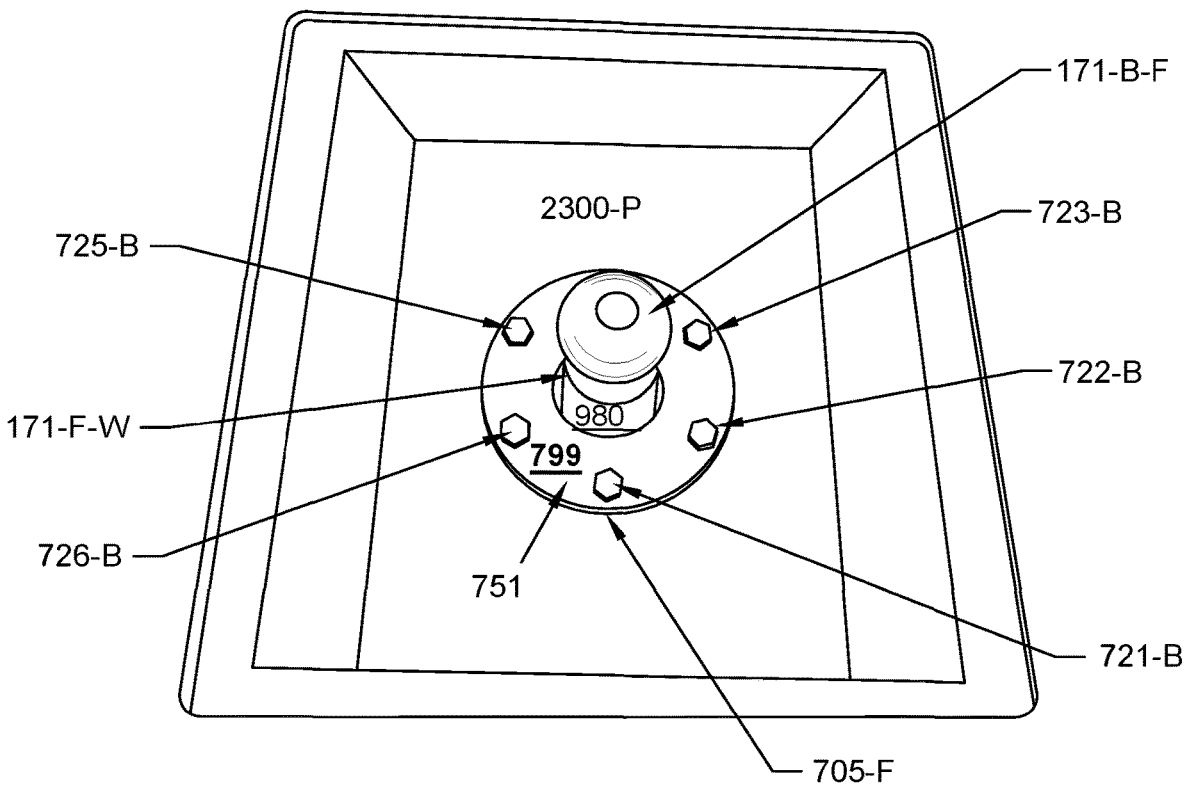
FIG. 20E shows a top perspective view a hydraulic ball hitch lift mounted in a flatbed truck, in accordance with an embodiment of the present invention.

In accordance with an exemplary embodiment, the lower flat mounting ring 750-F, FIG. 20D, is on a flatbed underside and, turning to FIG. 20E, a corresponding top mounting ring 751 is above the flatbed, where the flatbed and its opening for the ball hitch are sandwiched between the two rings 750-F, 751 and anchored in position with six bolts 721-B to 726-B. FIG. 20E shows a top perspective view a hydraulic ball hitch lift mounted in a flatbed truck, in accordance with an embodiment of the present invention. A flatbed ball hitch 171-F-B mounted on a ball connecting end of a rod 980 is shown in this top perspective view. The ball hitch is welded to the rod 980 and the location of the weld is shown 171-F-W. A top face 799 of top ring 751 is shown. The pan 2300-P is shown.

Figure 20F:
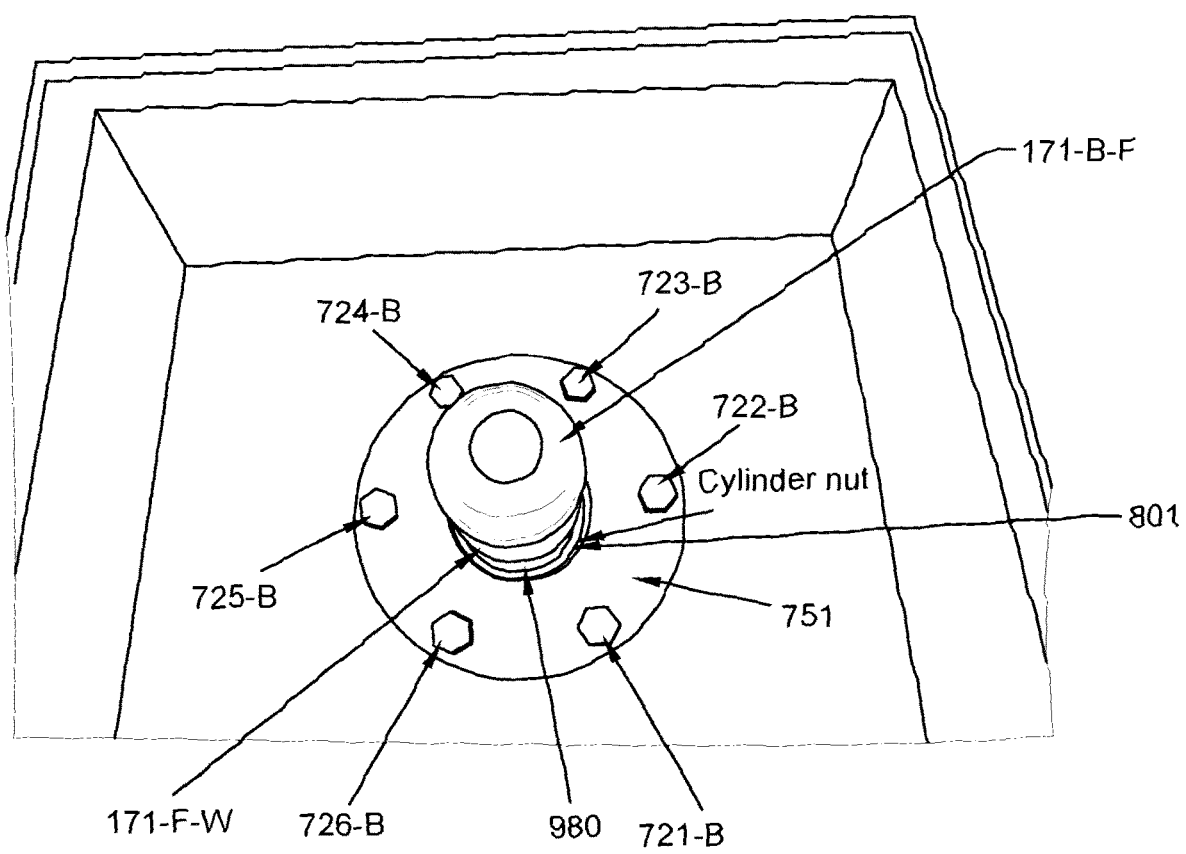
FIG. 20F shows another top perspective view a hydraulic ball hitch lift mounted in a flatbed truck, in accordance with an embodiment of the present invention.

FIG. 20F shows another top perspective view a hydraulic ball hitch lift mounted in a flatbed truck, in accordance with an embodiment of the present invention. In accordance with an exemplary embodiment, the lower mounting ring 750-F, shown for example in FIG. 20D, is on a flatbed underside and, turning to FIG. 20F, a corresponding top mounting ring 751 is above the flatbed, the flatbed and its opening for the ball are sandwiched between the two rings 750-F, 751 and anchored in position with six bolts 721-B to 726-B. A flatbed ball hitch 171-F-B welded 171-F-W to the ball connecting end of a rod 980 are shown in this top view. The retaining nut 801 for the hydraulic cylinder, not shown, can be seen in this view, and circumscribes the rod 980.

The welding 400-700-W of a mounting ring 750 to the cylinder 400, referenced above and shown for example in FIG. 17, may be the same across flatbed 750-F and turnover ball 750 embodiments. Further, the weld may be a 400-700-W standard weld. Or the mounting ring 750 may be different across different flatbed embodiments or across flatbed relative to B&W (B&W TRAILER HITCHES, *Turnover Ball*, Humboldt, Kansas, USA) ball hitches.

Figure 21A:
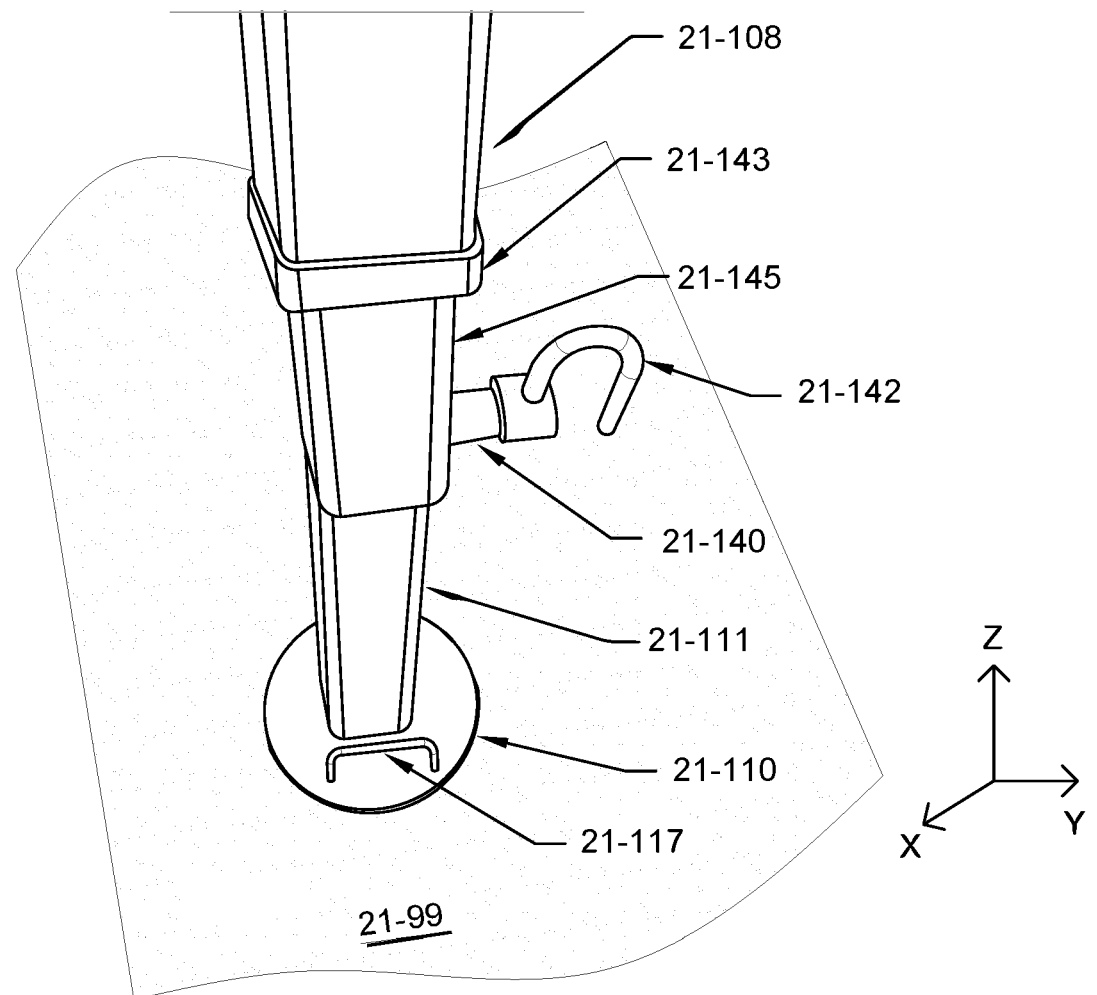
FIGS. 21A-21J illustrate a coupling phase sequence of a gooseneck trailer to a truck from a front perspective view, in accordance with an exemplary embodiment of the present invention.

FIGS. 21A-21J illustrate a coupling phase sequence of a gooseneck trailer to a truck, in accordance with an exemplary embodiment of the present invention. Turning to FIG. 21A, the load of the trailer is on the jack stands, where the foot 21-110 is on the ground 21-99 in the −Z direction. The trailer jack stands may be conventional, in accordance with embodiments of the present invention. A handle 21-117 is shown on the foot 21-110. Leg 21-111 is lowered with release of handle 21-142 from base 21-145 which is affixed to base 21-108 at coupling 21-143.

Figure 21B:
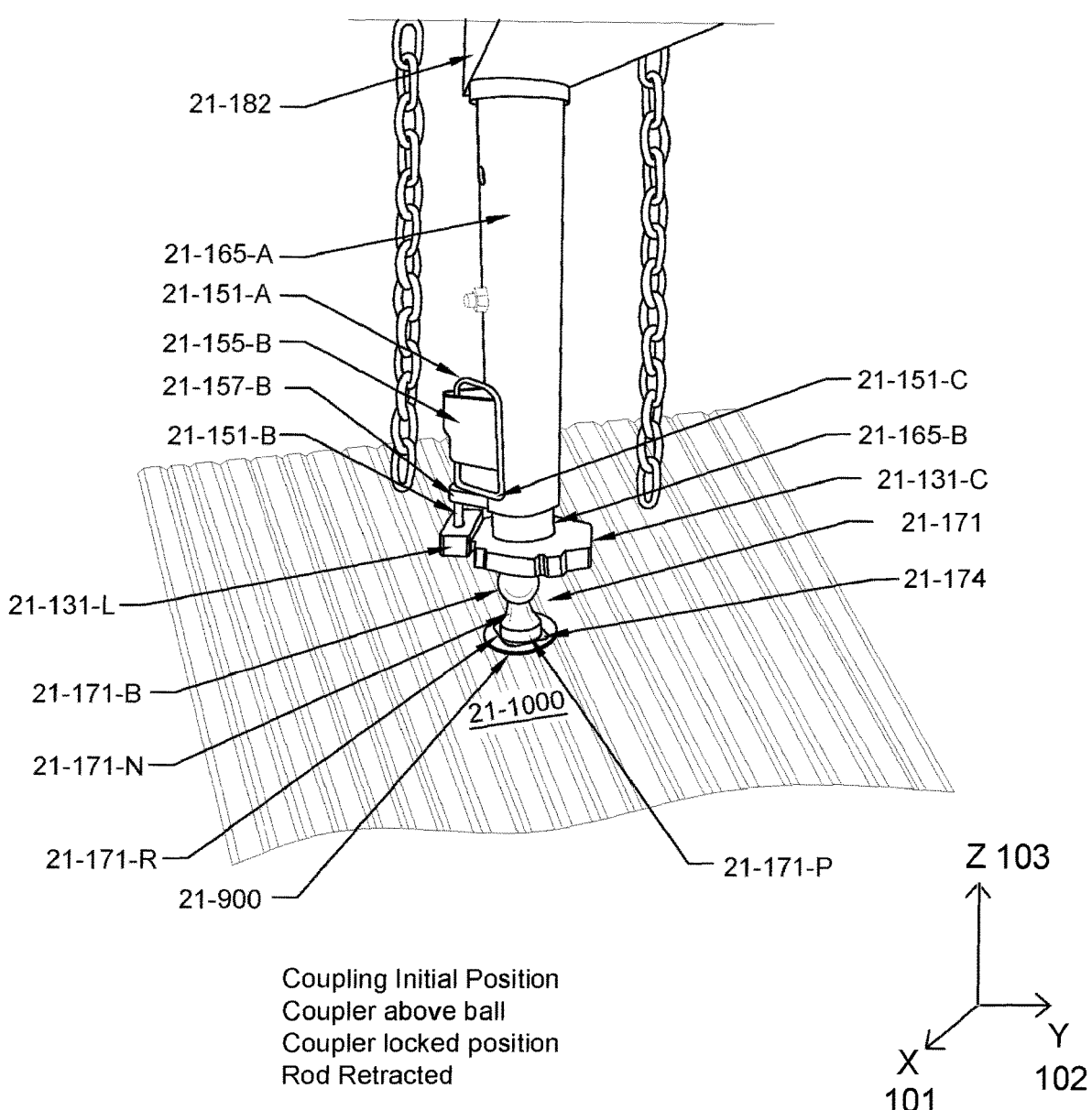

Turning to FIG. 21B, up top, +Z direction, the gooseneck 21-182 of the trailer can be seen with the pipe 21-165-A of an exemplary embodiment of the present invention attached thereto, are shown in the back of the truck 21-1000. Extending from pipe 21-165-A is inner pipe 165-B which is affixed to coupler 21-131-C. From the bottom, −Z direction, coupler 21-131-C is centered over the ball hitch 21-171. Locking pin 21-151-B is lowered in its locked position. A locking pin upper bend 21-151-A is turned and the insertion end 21-131-B is secured into the locking position of the coupler lock 21-131-L. In this above the truck bed 21-1000 view, the hydraulic cylinder assembly is not visible. The rod, not shown is in its full retracted position. FIG. 21B shows the hydraulic ball hitch in an initial coupling state. Chains 21-121 rest on the bed 21-1000. In accordance with an exemplary embodiment, inner pipe 21-165-B is welded to coupler 21-131-C. A conventional locking arm, not shown, in accordance with an exemplary embodiment, is withdrawn from the ball hitch holes 10-171-*ha* or 10-171-*hb*, shown for Example in FIG. 10A.

Figure 21C:
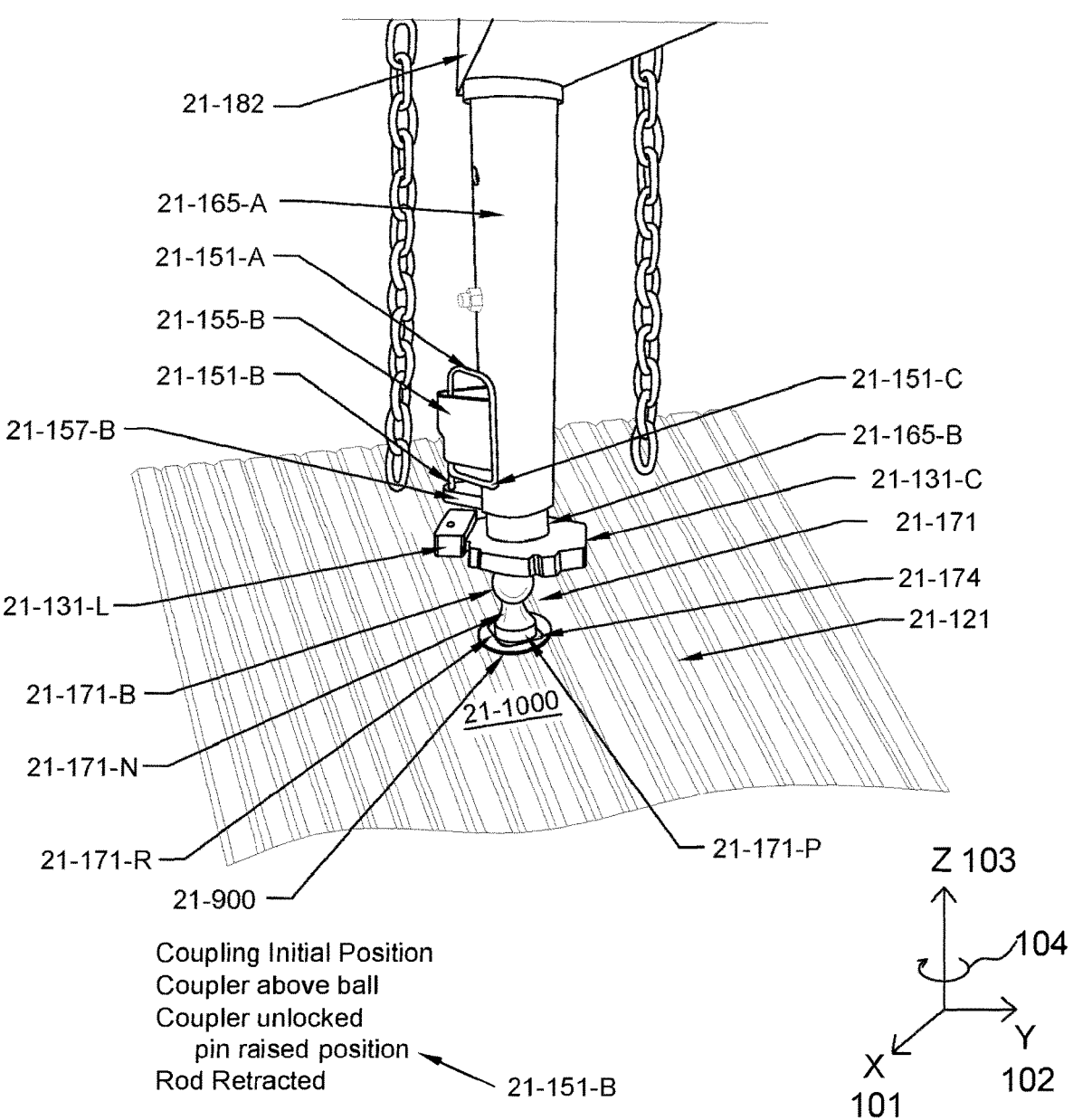

Turning to FIG. 21C, the insertion pin 21-131-B of the locking pin is raised above the lock 21-131-L of the coupler 21-131-C to guide 21-157-B. The bottom bend of the locking pin 21-151-C is shown raised, +Z, above guide 21-157-B. The upper bend 21-151-A is raised above bracket 21-155-B. In accordance with an exemplary embodiment, pin bends 21-151-A, 21-151-C would be rotated clockwise 104 in a secured unlocked position. Referring again to FIG. 21C, and as in FIG. 21B above, up top, +Z direction, the gooseneck 21-182 of the trailer can be seen with the pipe 21-165-A of an exemplary embodiment of the present invention attached thereto, are shown in the back of the truck 21-1000. Extending from pipe 21-165-A is inner pipe 165-B which is affixed to coupler 21-131-C. From the bottom, −Z direction, coupler 21-131-C is centered over the ball hitch 21-171. The ball 21-171-B, the neck 21-171-N, the post 21-171-P are visible above the truck bed 21-1000. A top surface 174 of a square 21-171-R base is visible and is flush with the truck bed. Surrounding the square base 21-171-R is bed plate 21-900, which has a square center opening and a circular outside.

Figure 21D:
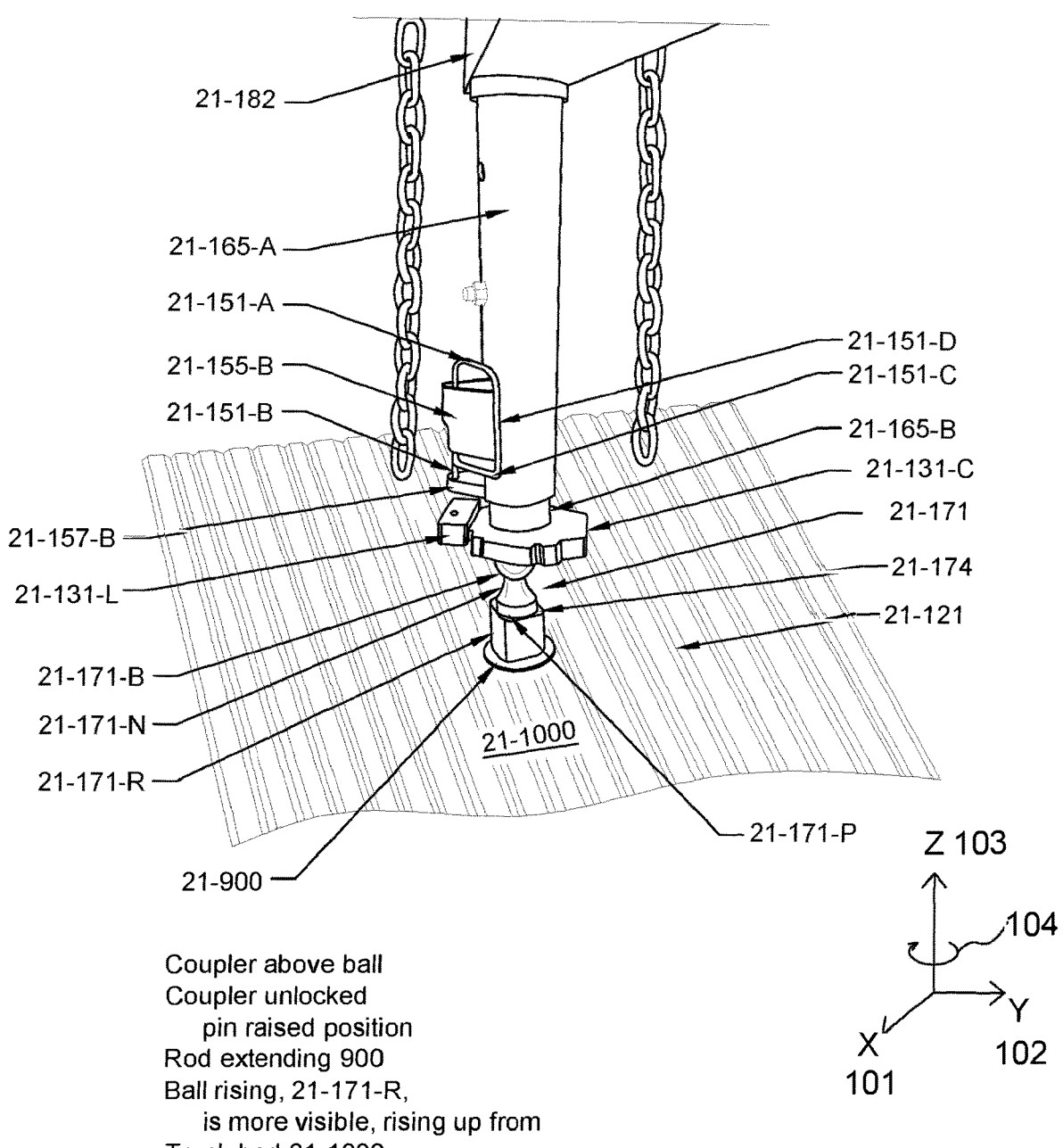
Figure 21E:
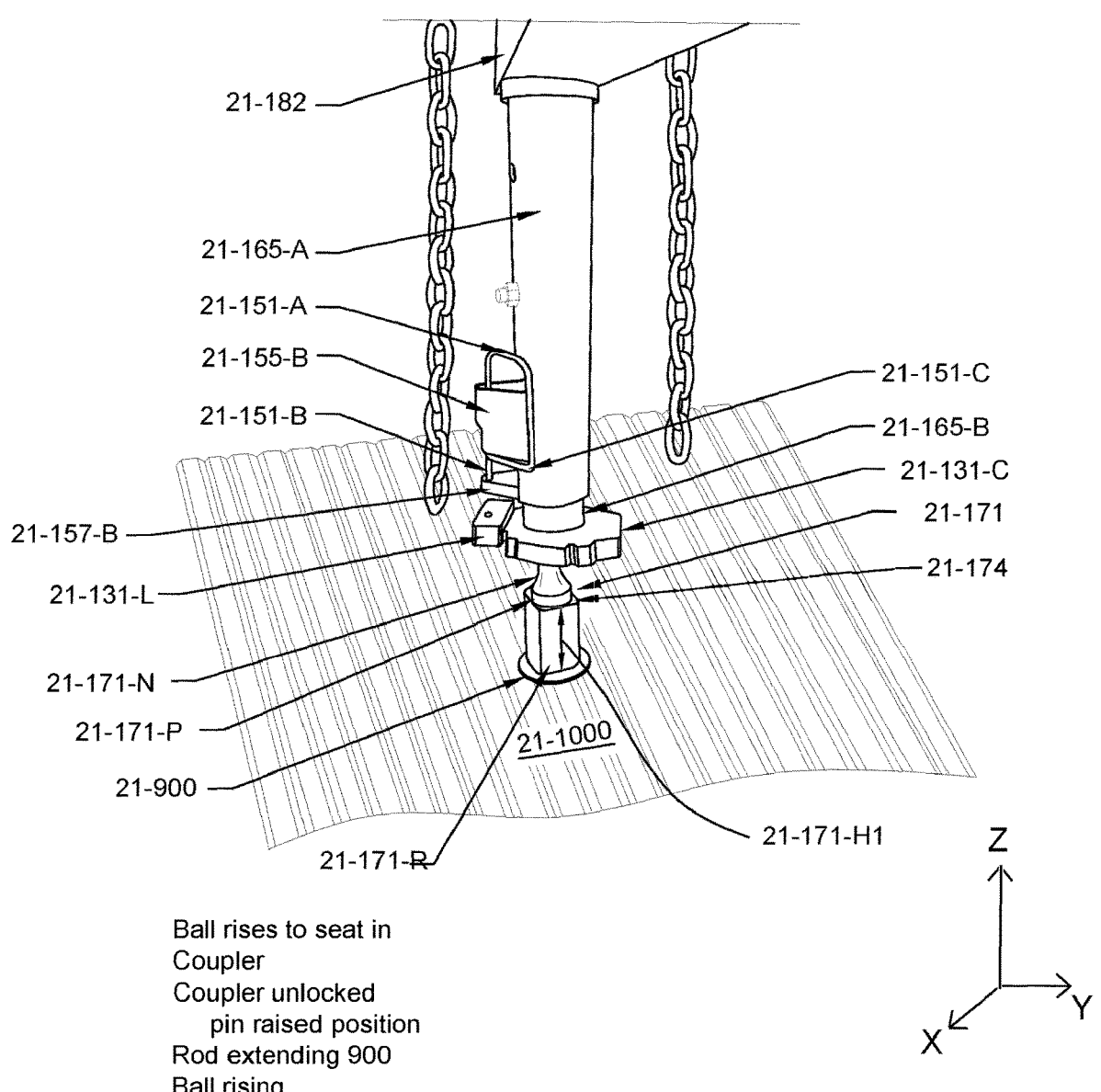

FIG. 21D shows a continuation in the coupling process of the hydraulic ball in a coupling series, in accordance with an exemplary embodiment of the present invention. The coupler 21-131-C remains in the unlocked state. As in FIG. 21C above, looking up top, +Z direction, the gooseneck 21-182 of the trailer can be seen with the pipe 21-165-A of an exemplary embodiment of the present invention attached thereto, are shown in the back of the truck 21-1000. Extending from pipe 21-165-A is inner pipe 165-B which is affixed to coupler 21-131-C. From the bottom, −Z direction, coupler 21-131-C is centered over the ball hitch 21-171. From the truck bed 21-1000, the ball hitch 21-171 has risen, +Z. Sides of square base 21-171-R are now visible. The post 21-131-P and neck 21-131-N are still visible, while the ball 21-171-B is only partially visible in this view as it approaches and is covered by the couple r21-131-C. A top surface 21-174 of the square base is visible surrounding post 21-171-P. Lock 21-131-L remains in the unlocked state with insertion end 21-11-B of the pin above the lock. The guide 21-157-B and upper and lower bends 21-151-A, 21-151-C are shown. Underneath the truck, hydraulic fluid is pumped into port 195, shown for example in FIG. 17, extending the rod from the hydraulic cylinder and raising the ball hitch. The mounting ring 750, shown for example in FIG. 16, holds the hydraulic cylinder assembly 100-A in position beneath, −Z, the truck bed. Returning to FIG. 21D, above the truck bed 21-1000, the locking pin 21-151-A-21-151-C remains in an unlocked position and may be held in the unlocked, raised +Z, position by bracket 21-155-B. Guide 21-157-B is visible and insertion end 21-151-B of the pin rests therein.

Figure 23:
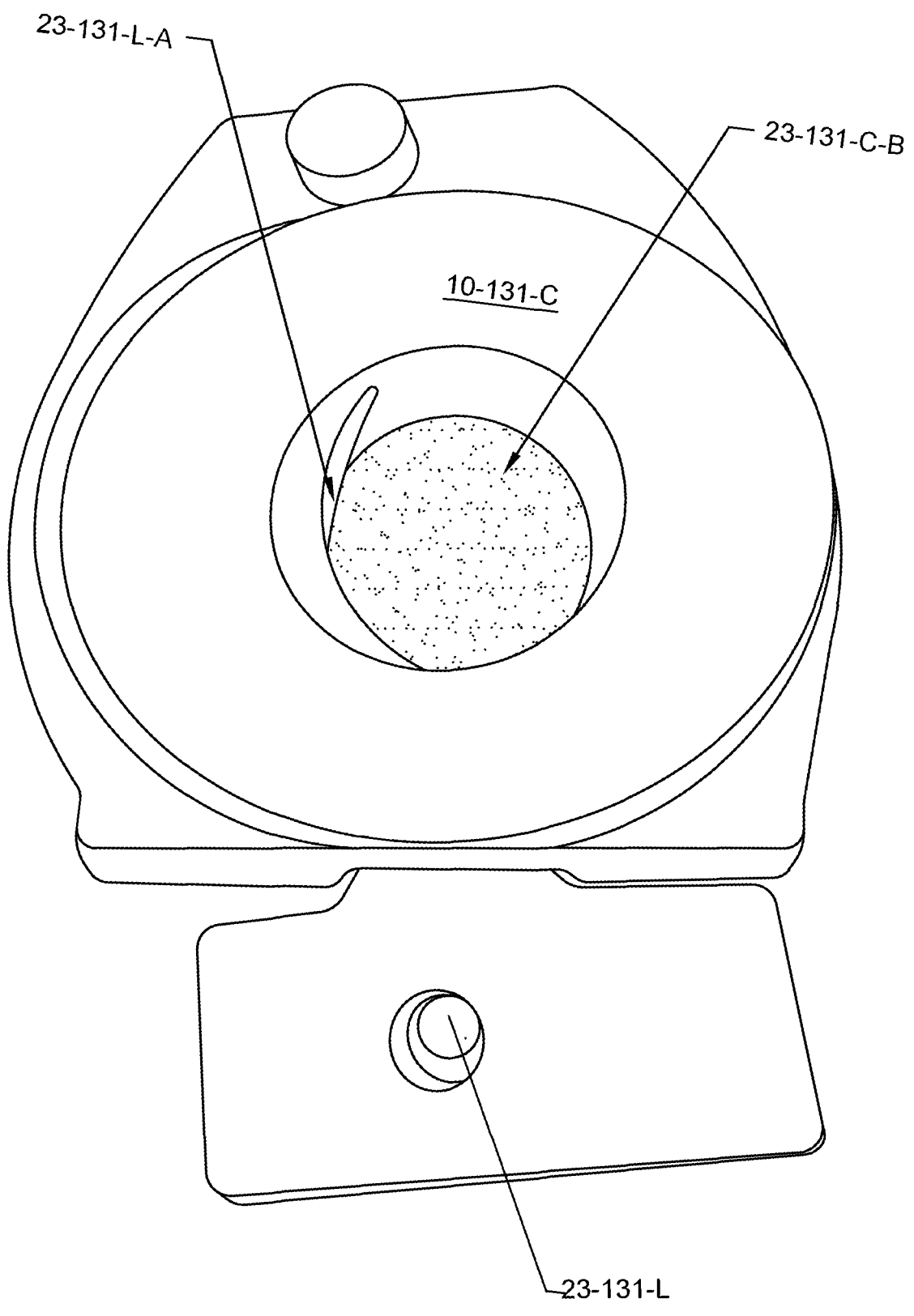
FIG. 23 shows a bottom perspective view of a coupler in its locked position, in accordance with an exemplary embodiment of the present invention.

FIG. 21 E shows a continuation in the coupling process from FIG. 21D of the hydraulic ball in a coupling series, in accordance with an exemplary embodiment of the present invention. Turning to FIG. 21E, the square base 21-171-R has risen higher, +Z direction. The insertion end 960-T of the rod 900 is press fit within the rectangular base 21-171-R, and is shown separated for example in FIG. 16. The rod 900 has been further extended out of the hydraulic cylinder 400, shown for example in FIG. 1B, raising +Z, the ball hitch 21-171 further above the truck bed 21-1000, referring again to FIG. 21E. A top face 21-174 of the rectangular base 21-171-R is now displaced a distance 21-171-H1 above, +Z, the truck bed 21-1000. Similar to FIG. 21D, above the truck bed 21-1000, the locking pin 21-151-A-21-151-C remains in an unlocked position and may be held in the unlocked, raised +Z, position by bracket 21-155-B. Guide 21-157-Bis visible and insertion end 21-151-B of the pin rests therein. The coupler 21-131-C remains in the unlocked state. As above, looking up top, +Z direction, the gooseneck 21-182 of the trailer can be seen with the pipe 21-165-A of an exemplary embodiment of the present invention attached thereto, are shown in the back of the truck 21-1000. Extending from pipe 21-165-A is inner pipe 21-165-B which is affixed to coupler 21-131-C. In accordance with an exemplary embodiment, inner pipe 21-165-B is welded to coupler 21-131-C. The post 21-171-P of the ball hitch 21-171 and neck 21-171-N are visible in this view at this point in the coupling series. The ball 21-171-B, not shown has risen to seat inside the coupler 21-171-C. The inside of the coupler is shown for example in FIG. 23. Referring to FIG. 23, a top inner surface 23-*iii* of the coupler meets a top, +Z of ball 21-171-B, referring back to FIG. 21E. in accordance with an exemplary embodiment, distance height 21-171-H1 may be 3.5 inches.

Figure 21F:
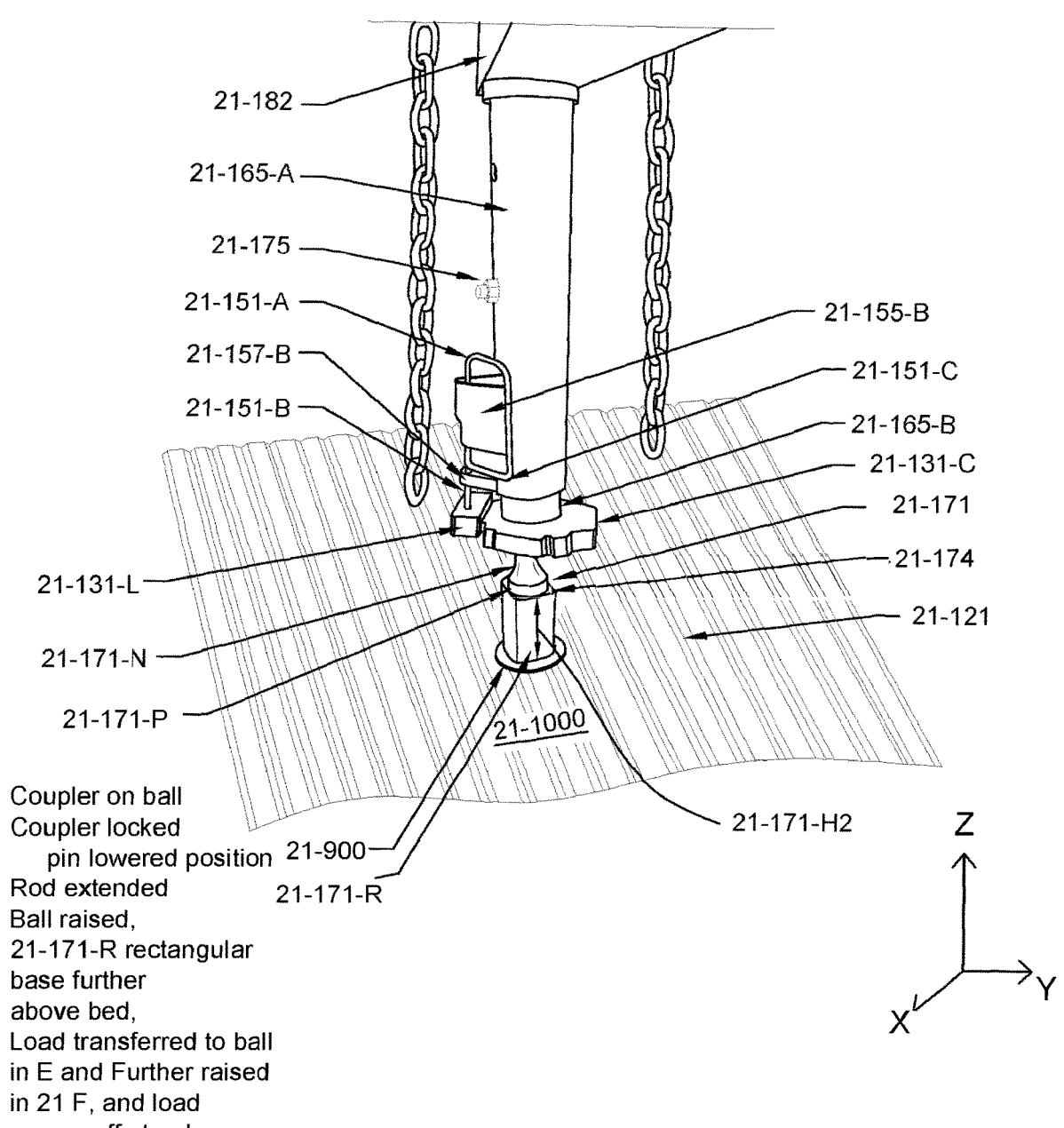

Turning to FIG. 21F, the ball hitch 21-171 has risen, +Z, slightly further above the truck bed 21-1000 and is displaced a distance 21-171-H2 therefrom. In accordance with an exemplary embodiment, distance height 21-131-H2 is 3.75 inches. Ball 21-171-B is seated within coupler 21-131-C and the trailer load is transferred off the lowered jack stands and through the coupler 21-131-C coupled to the ball 21-171-B, ball not shown. The locking pin 21-151-A to 21-151-C is shown in its locking position with insertion end 21-151-B seating in the locking dock 21-131-L of the coupler 21-131-C. Referring to FIG. 17, hydraulic fluid is pumped through port 195, extending the rod 900 further out +Y of the cylinder 400.

Referring again to FIG. 21F, the gooseneck 21-182 of the trailer with the pipe 21-165-A attached thereto, are shown in the back of the truck 21-1000. Extending from pipe 21-165-A is inner pipe 21-165-B which is affixed to coupler 21-131-C. And, bed plate 21-900, which has a square center opening and a circular outside, is shown surrounding the square base 21-171-R and mounted top and bottom of the truck bed 21-1000.

Figure 21G:
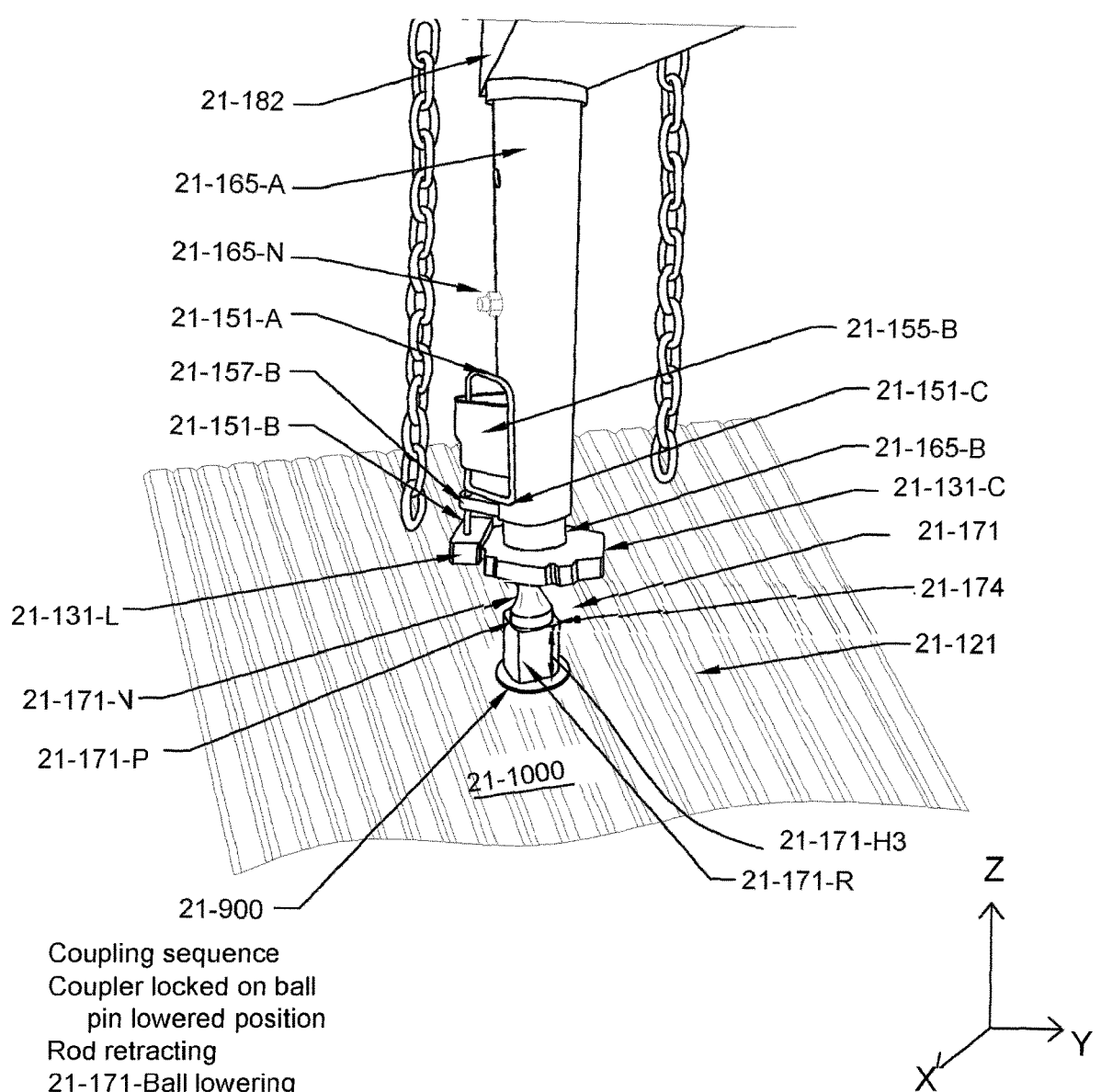

Referring to FIG. 21G, with the trailer load off of the jack stands, shown for example in FIG. 21A, retraction of the rod begins in the coupling series. Referring to FIGS. 17 and 4C, hydraulic fluid is now pumped through port 195. In turn, referring to FIG. 1B, the piston rod 900 begins to retract into the cylinder 400. Referring again to FIG. 21G, as the rod retracts, the square base 21-131-R lowers, −Z, where top face 21-174 is now displaced a height 21-171-H3 above bed plate 21-900. In accordance with an exemplary embodiment distance height 21-171-H3 is 3.0 inches. As the trailer lowers with the retraction of the rod, the gooseneck 21-182 with the pipe 21-165-A attached thereto, are shown in this view. Extending from pipe 21-165-A is inner pipe 21-165-B and coupler 21-131-C is affixed to inner pipe 21-165-B. Nut 21-165-N secures inner pipe 21-165-P into outer pipe 21-165-A. The locking pin 21-151-A to 21-151-C is shown and remains in its locking position with insertion end 21-151-B seated in the locking dock 21-131-L of the coupler 21-131-C. The insertion end 21-151-B passes through the guide 21-157-B, while, in accordance with the exemplary embodiment of FIGS. 21A-21J, the bottom bend 21-131-C of the locking pin nears the guide. In accordance with an exemplary embodiment the locking pin is held in its lowered position at least in part by pin spring 13-151-S, shown for example in FIG. 13. Referring again to FIG. 21G, post 21-171-P of the ball hitch 21-171 and neck 21-171-N are visible in this view at this point in the coupling series. The ball 21-171-B, not shown, is seated inside the coupler 21-171-C.

Figure 21H:
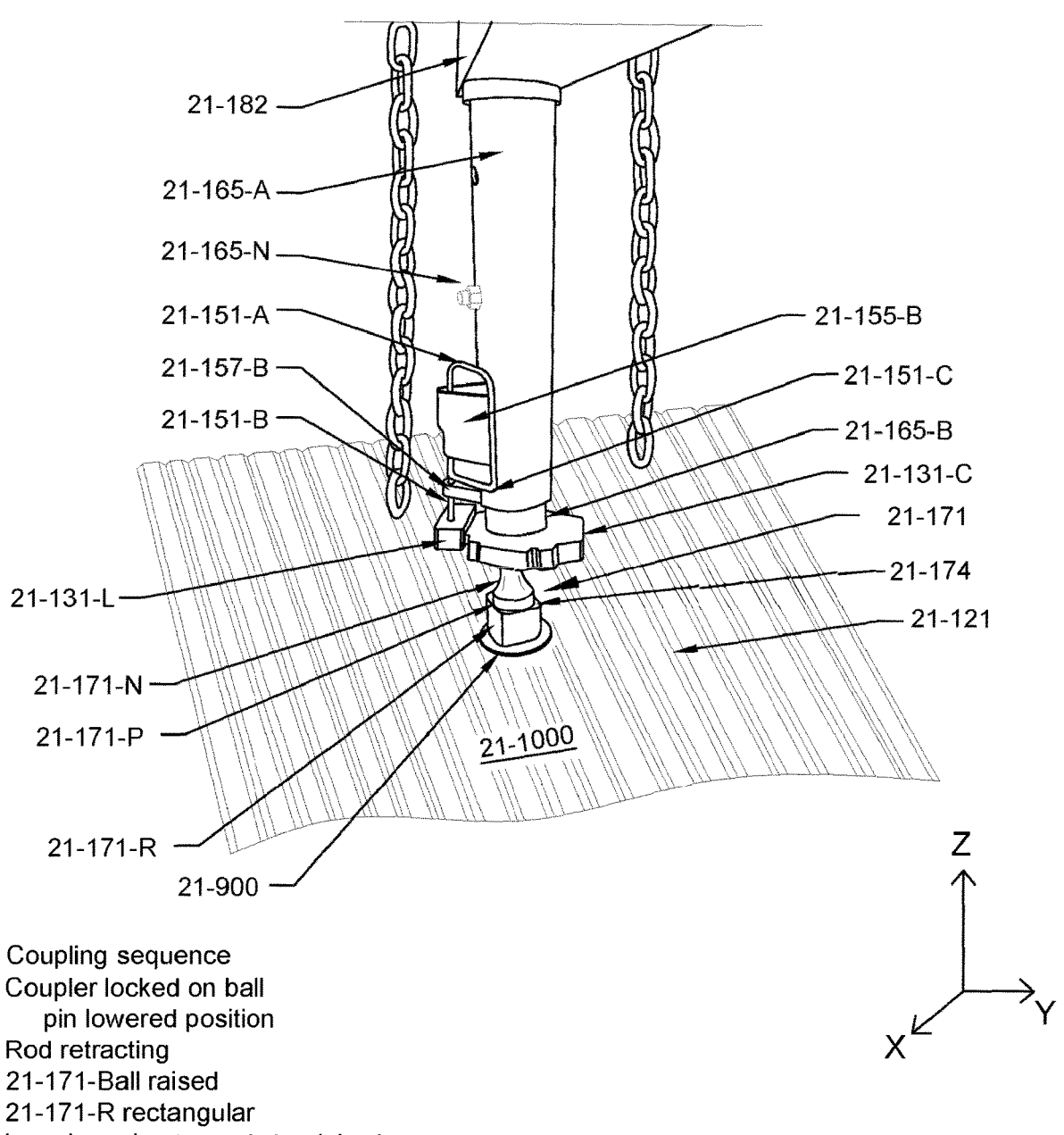

Continuing with the load bearing phase of the coupling series and turning to FIG. 21H, the rod is further retracted, lowering, −Z, the ball hitch 21-171 relative to the truck bed 21-1000. Referring to FIGS. 17 and 4C, hydraulic fluid is pumping pumped through port 195. In turn, referring to FIG. 1B, the piston rod 900 continues to retract into the cylinder 400. Referring again to FIG. 21H, as the rod retracts, the square base 21-131-R lowers, −Z, where top face 21-174 is nearer, −Z, the bed plate 21-900 as compared to FIG. 21G. Referring again to FIG. 21H, post 21-171-P of the ball hitch 21-171 and neck 21-171-N are visible in this view at this point in the coupling series. The ball 21-171-B, not shown, is seated inside the coupler 21-171-C. Turning to the top, +Z, the gooseneck 21-182 with the pipe 21-165-A attached thereto, are shown in this view. Extending from pipe 21-165-A is post 21-165-B and coupler 21-131-C is affixed to inner pipe 21-165-B. Nut 21-165-N secures inner pipe 21-165-P into pipe 21-165-A. The locking pin 21-151-A to 21-151-C is shown and remains in its locking position with insertion end 21-151-B seated in the locking dock 21-131-L of the coupler 21-131-C. The insertion end 21-151-B passes through the guide 21-157-B, the upper bend 21-151-A is above bracket 21-155-B and lower bend 21-151-C nears guide 21-157-B, in accordance with the exemplary embodiment shown in FIG. 21H.

Figure 21I:
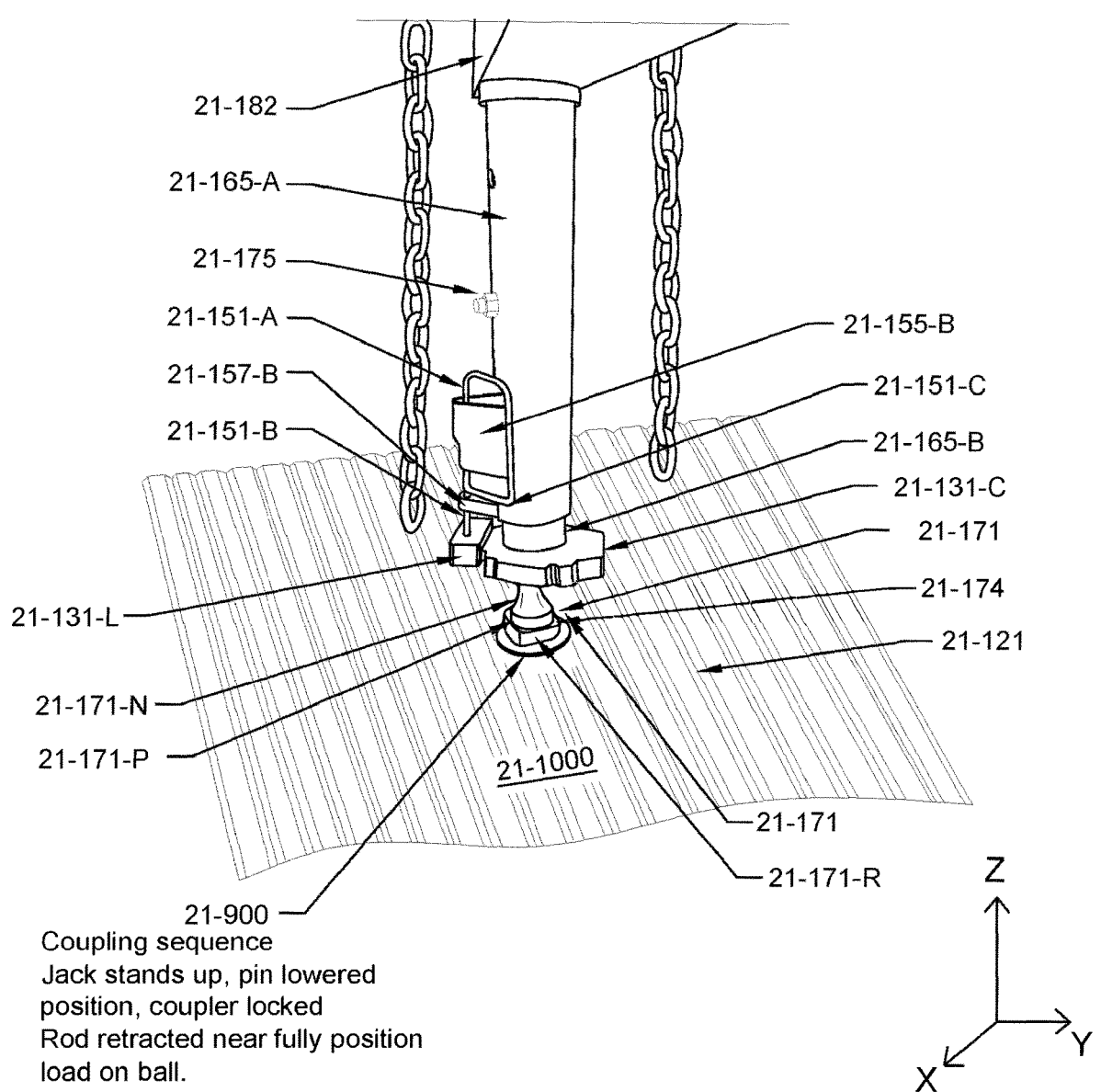

Continuing with the coupling sequence and turning to FIG. 21i, the ball hitch 21-171 further lowers, −Z, towards the truck bed 21-1000 as the rod, not shown, continues to retract. The jack stands remain up, jack stands not shown. The pin 21-151-A to 21-151-C remains in the locked position, with insertion end 21-151-B inserted in the locking dock 21-131-L of coupler 21-131-C. Lower bend 21-131-C is just above, +Z, guide 21-157-B and bracket 21-155-B is shown. Turning upwards, +Z, the gooseneck 21-182 with the pipe 21-165-A attached thereto are shown in this view. Extending from pipe 21-165-A is inner pipe 21-165-B and coupler 21-131-C is affixed to inner pipe 21-165-B. Nut 21-165-N secures inner pipe 21-165-B into pipe 21-165-A. The post 21-171-P of the ball hitch 21-171 and neck 21-171-N are visible in this view at this point in the coupling series. The rectangular base 21-171-R is lower, −Z, with respect to the truck bed 21-1000 as compared with FIG. 21H and, in turn, top surface 21-174 is nearer plate 21-900 as compared to the distance between top surface 21-174 and plate 21-900 in FIG. 21H. The rod is near full retraction, with top surface 21-174 being displaced above, +Z, the truck bed about 0.5 inches.

Figure 21J:
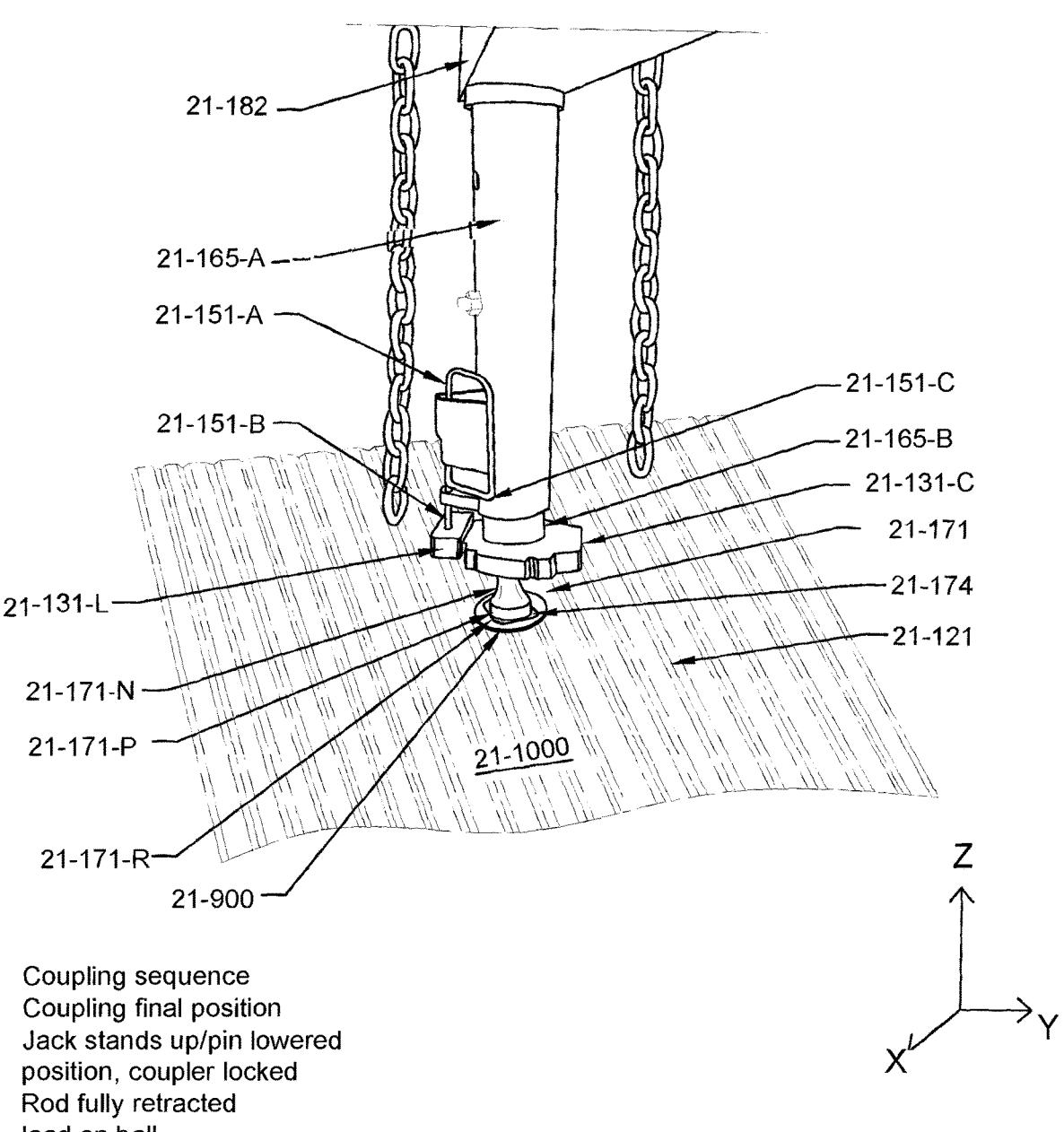

FIG. 21J shows the ball hitch 21-171 fully lowered to the truck bed 21-1000. At this point, a locking arm can be used to lock the ball hitch 21-171 in place. More particularly, the locking arm of a turnover ball (B&W TRAILER HITCHES, *Turnover Ball*, Humboldt, Kansas, USA) can be passed through locking hole 171-A and locking hole 911 in rod insertion end 960-T, shown for example in FIG. 16, underneath the truck bed, in accordance with an exemplary embodiment of the present invention. Top surface 21-174 is now even with in the XY plane with truck bed plate 21-900. Referring to FIGS. 17 and 4C, hydraulic fluid has been pumped through port 195. In turn, referring to FIG. 1B, the piston rod 900 has fully retracted into the cylinder 400. Referring again to FIG. 21J, as the rod has retracted and lowered the square base 21-131-R beneath, −Z, the truck bed, square base not shown. Similar to the view of FIG. 21I, the pin 21-151-A to 21-151-C remains in the locked position, with insertion end 21-151-B inserted in the locking dock 21-131-L of coupler 21-131-C. Lower bend 21-131-C is just above, +Z, guide 21-157-B and bracket 21-155-B is shown. Turning upwards, +Z, the gooseneck 21-182 with the pipe 21-165-A attached thereto are shown in this view. Extending from pipe 21-165-A is inner pipe 21-165-B and coupler 21-131-C is affixed to inner pipe 21-165-B. Nut 21-165-N secures inner pipe 21-165-B into pipe 21-165-A. The post 21-171-P of the ball hitch 21-171 and neck 21-171-N remain visible in this view of the coupling series. The locking arm hole 171-A, shown for example in FIG. 16, is not shown in FIGS. 21D-21H.

Figure 22A:
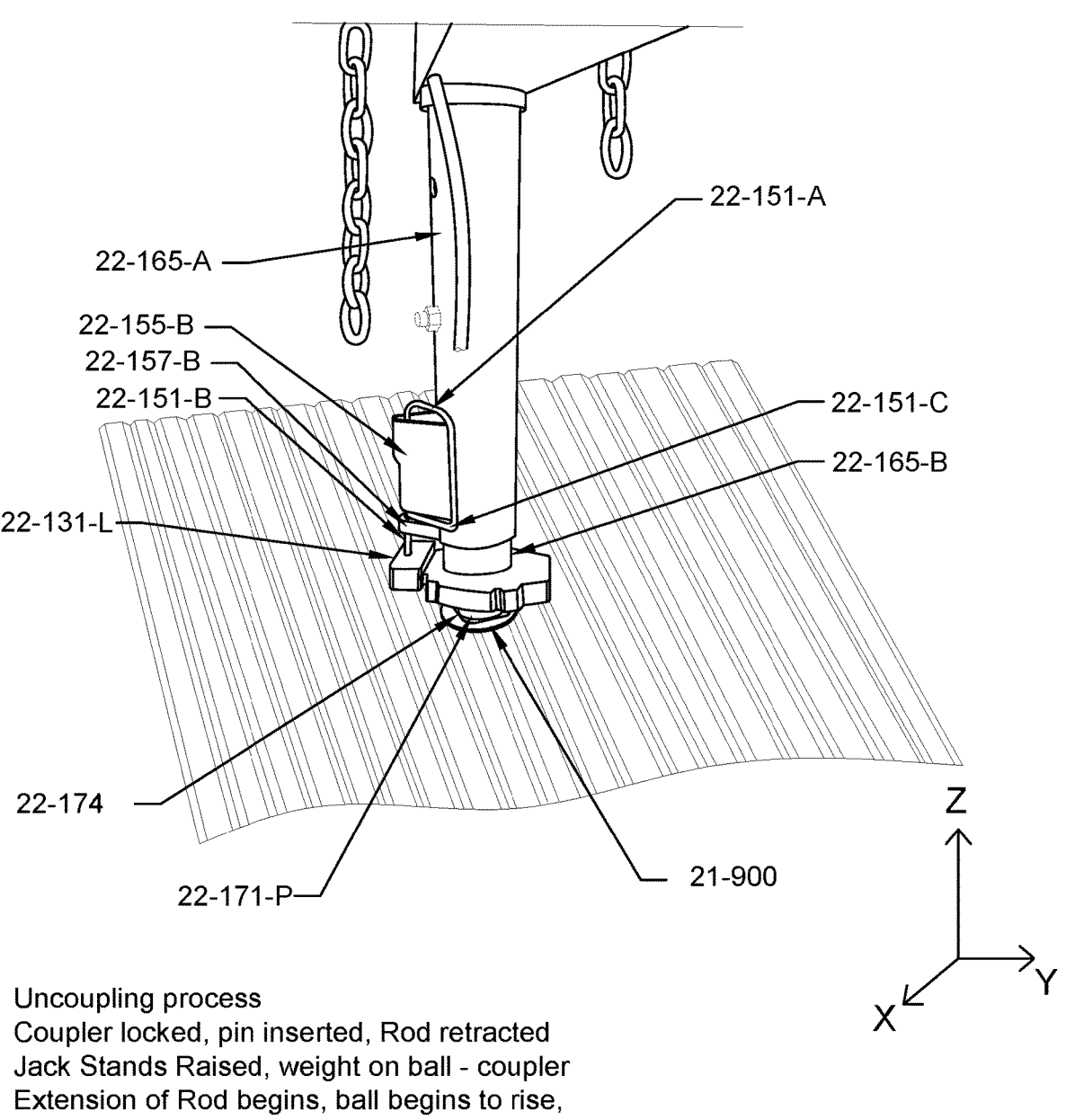
FIGS. 22A-22J illustrate an uncoupling phase sequence of a gooseneck trailer from a truck from a front perspective view, in accordance with an exemplary embodiment of the present invention.

FIGS. 22A-22I illustrate an uncoupling phase sequence of a gooseneck trailer from a truck, in accordance with an exemplary embodiment of the present invention. Turning to FIG. 22A, the load is on the ball hitch 22-171 coupled to the coupler 22-131-C and the parts upwards +Z therefrom. The coupler 22-131-C is locked, the pin 21-151-B is inserted in the locking dock 22-131-L. The pipe 22-165-A is shown. The insertion end 22-151-B of the locking pin passes through guide 22-157-B and bracket 22-157-B is shown. A top surface 22-174 is visible and surrounded by truck plate 21-900. The jack stands are not lowered and do not bear load, stands not shown. The rod is fully retracted before uncoupling begins. The locking arm of the turnover ball (B&W TRAILER HITCHES, *Turnover Ball*, Humboldt, Kansas, USA) is removed from aligned hole 911 through-hole 171-A, shown for example in FIG. 16. Then, extension of the rod, rod not visible in this view, begins in the uncoupling phase. The ball hitch 21-171 begins to rise pushing upwards on the coupler-inner pipe-outer pipe 22-131-C, 22-165-B, 22-165-A structural chain. Turning to FIGS. 4C and 17, hydraulic fluid is pumped into port 190 to extend the rod 960-T out of the cylinder 400. The cylinder assembly 400 is mounted beneath the truck and is not visible in the above, +Z, truck bed views of FIGS. 22A-22J.

Figure 22B:
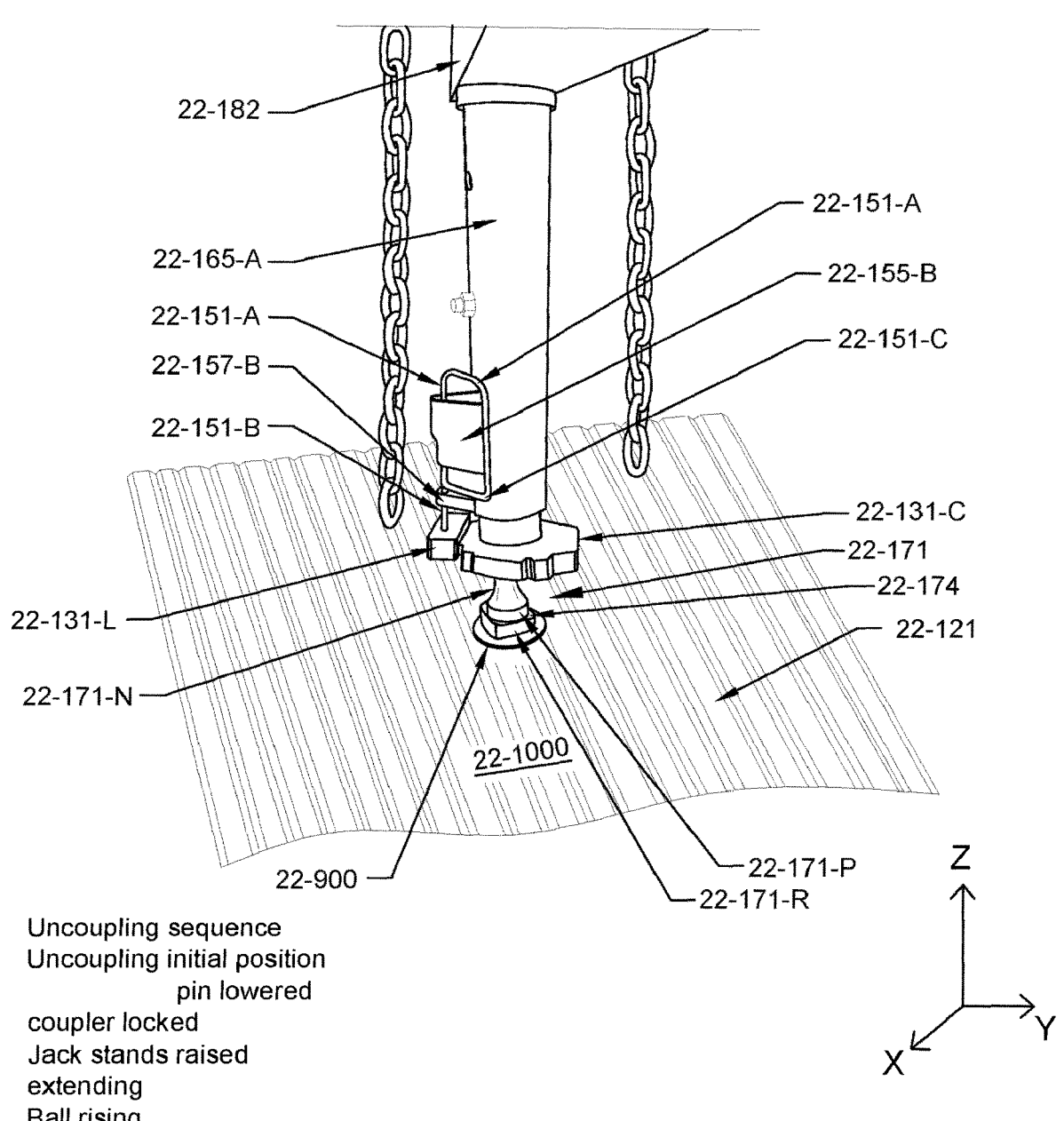

Referring to FIG. 22B, a same perspective view as that shown is FIG. 22A is provided. As the rod extends, rod not shown, ball hitch 22-171 rises above, +Z, the truck bed. The square base 22-171-R becomes visible and top face 22-174 is now above, +Z, the truck plate 22-900. Pin 21-151-A to 21-151-C remains in the locked position, with insertion end 21-151-B inserted in the locking dock 21-131-L of coupler 21-131-C. Lower bend 21-131-C is just above, +Z, guide 21-157-B and bracket 21-155-B is shown. Turning upwards, +Z, the gooseneck 21-182 with the pipe 21-165-A attached thereto are shown in this view. Extending from pipe 21-165-A is inner pipe 21-165-B and coupler 21-131-C is affixed to inner pipe 21-165-B.

Figure 22C:
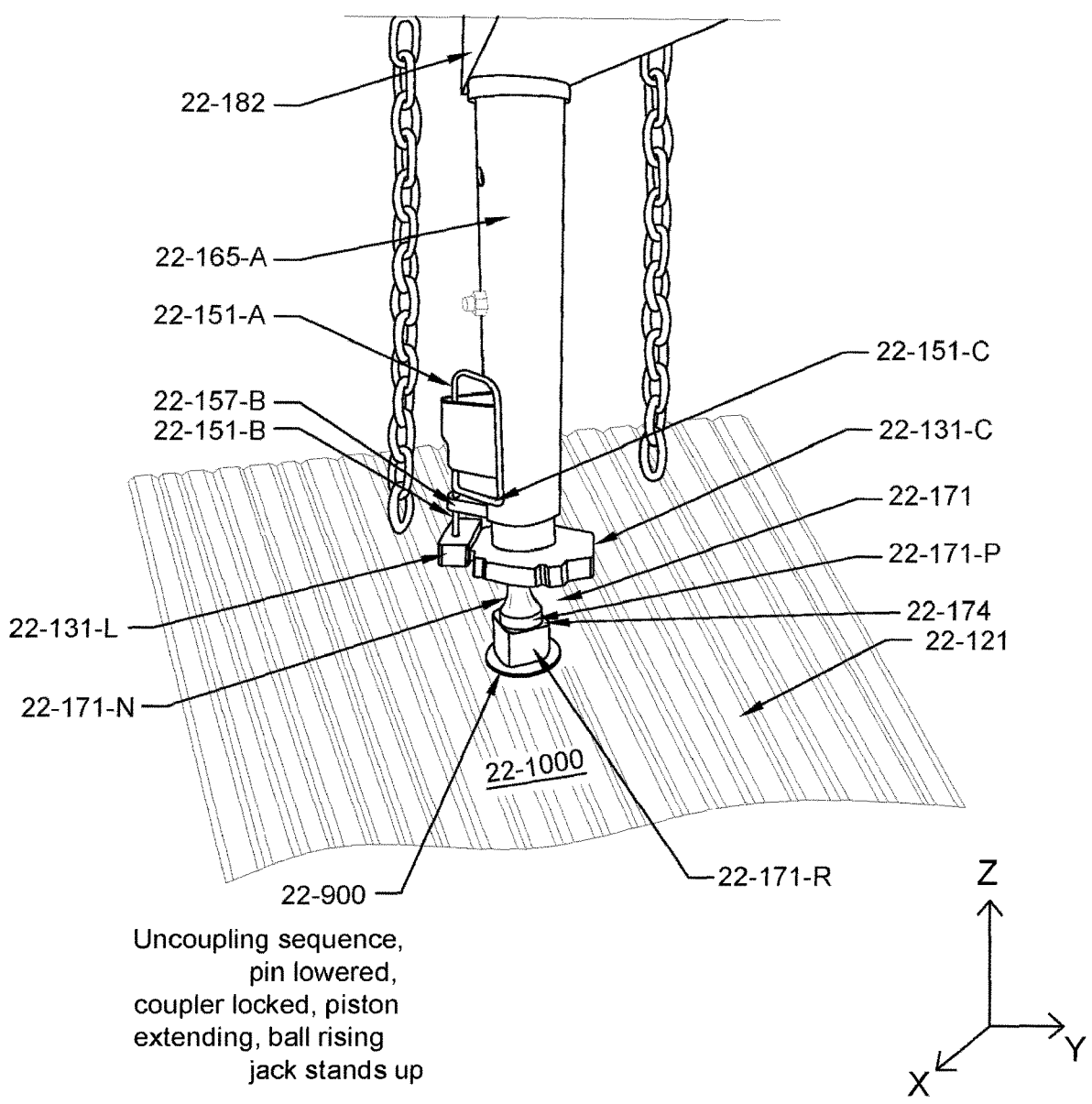

FIG. 22C shows top surface 22-174 of the ball hitch 22-171 well above, +Z, the truck bed 22-1000. In turn, the rod 960-T is well extended from the hydraulic cylinder 400, shown for example in FIGS. 17 and 4C, respectively. The insertion end of the pin 22-151-B passes through guide 22-155-B. The insertion end of the pin 22-151-B remains in locking dock 22-131-L, keeping the coupler 22-131-C locked about the ball of the ball hitch 22-171. The ball is not visible as it is seated within the coupler 22-171-C. Beneath, −Z, the coupler 22-131-C the neck 22-171-N, post 22-171-P and the square base 22-171-R are shown. Top surface 22-174 is over an inch above, +Z, truck plate 22-900. As in previous views, truck plate 22-900 is mounted on the truck bed 22-1000. The rod is partly extended in this view and the neck of the trailer is rising 22-182. The gooseneck 22-182 and outer pipe 22-165-A are shown.

Figure 22D:
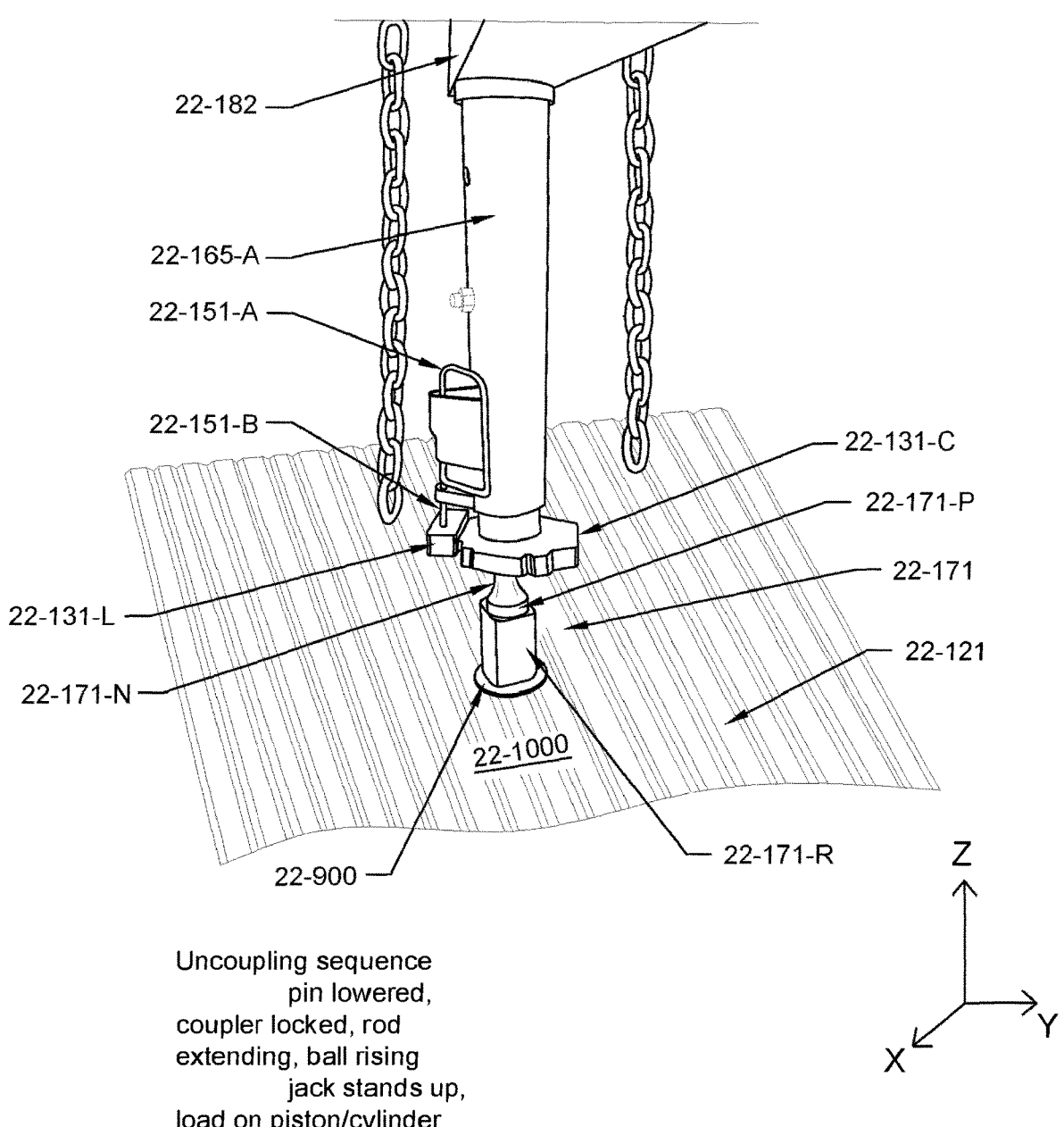

Referring to FIG. 22D, rod continues to extend in this load bearing uncoupling phase. The jack stands, not shown, are still raised. FIG. 22D shows top surface 22-174 of the ball hitch 22-171 further above, +Z, the truck bed 22-1000 as compared to FIG. 22C. In turn, the rod 960-T is further extended from the hydraulic cylinder 400, shown for example in FIGS. 17 and 4C, respectively. Referring again to FIG. 22D, the coupler 22-131-C remains locked. The insertion end of the pin 22-151-B remains in locking dock 22-131-L, keeping the coupler 22-131-C locked about the ball of the ball hitch 22-171. The ball is not visible as it is seated within the coupler 22-171-C. Beneath, −Z, the coupler 22-131-C the neck 22-171-N, post 22-171-P and the square base 22-171-R can be seen. Top surface 22-174 is well above, +Z, truck plate 22-900. As in previous views, truck plate 22-900 is mounted on the truck bed 22-1000. The rod is nearing full extension in this view and the neck of the trailer is rising 22-182. The gooseneck 22-182 and outer pipe 22-165-A are shown.

Figure 22E:
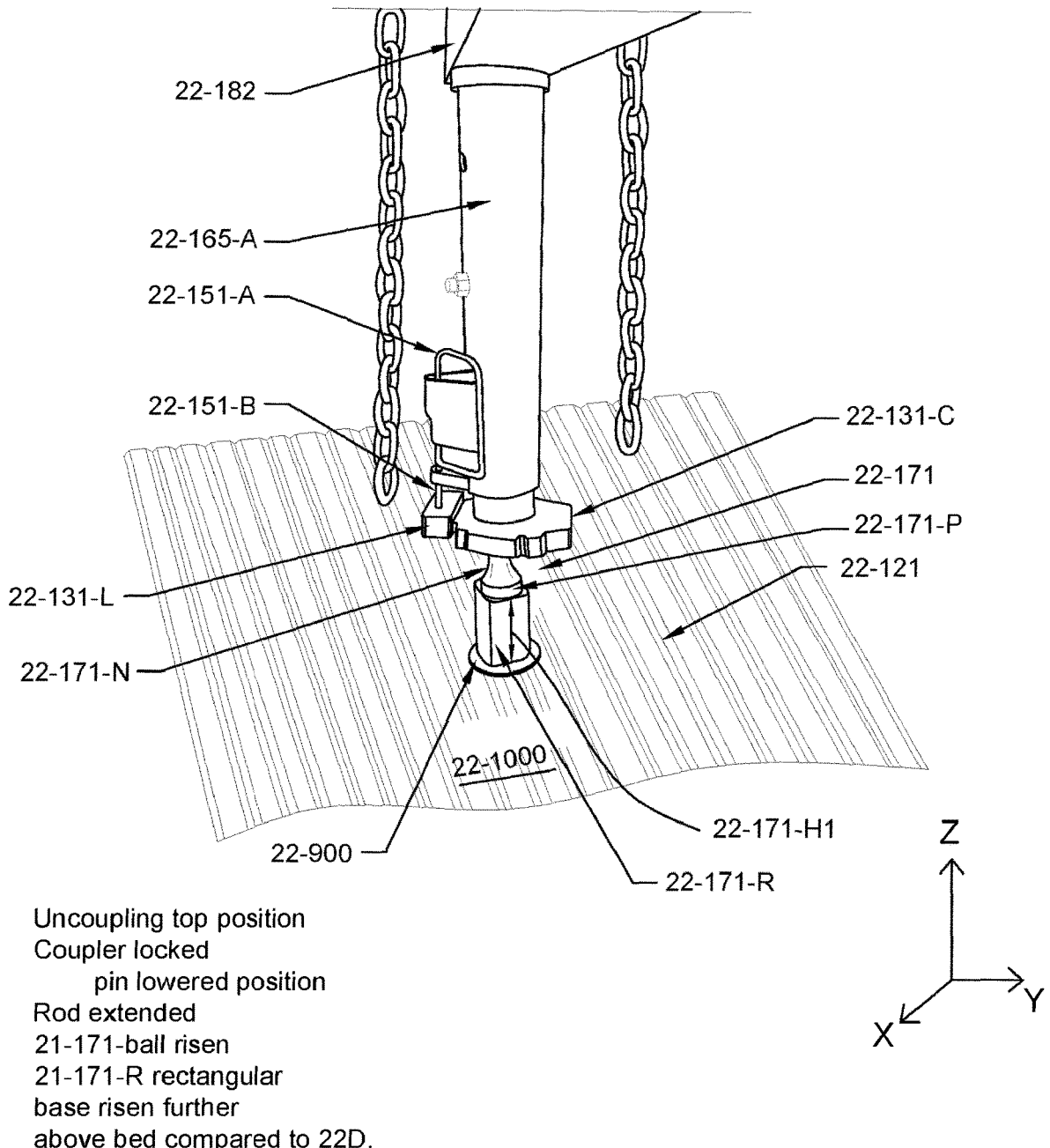

FIG. 22E shows the uncoupling series continuing. The rod 900, 960-T, shown for example in FIGS. 1B and 17, is near fully extended. The jack stands, shown for example in FIG. 21A, are lowered at this point but load remains on the ball hitch and coupler. The coupler 22-131-C is still locked with insertion end 22-151-B secured in locking dock 22-131-L. The square base 22-171-R is extended up, +Z, beyond the truck bed 22-1000 with top face 22-174 displaced a height 22-171-H1 from truck plate 22-900. In accordance with an exemplary embodiment, this height is 3.5 inches. The neck 22-171-N and post 22-171-P are shown, while the ball is seated within the coupler 22-131-C and is not visible in the present view. The gooseneck 22-182 and outer pipe 22-165-A are shown.

Figure 22F:
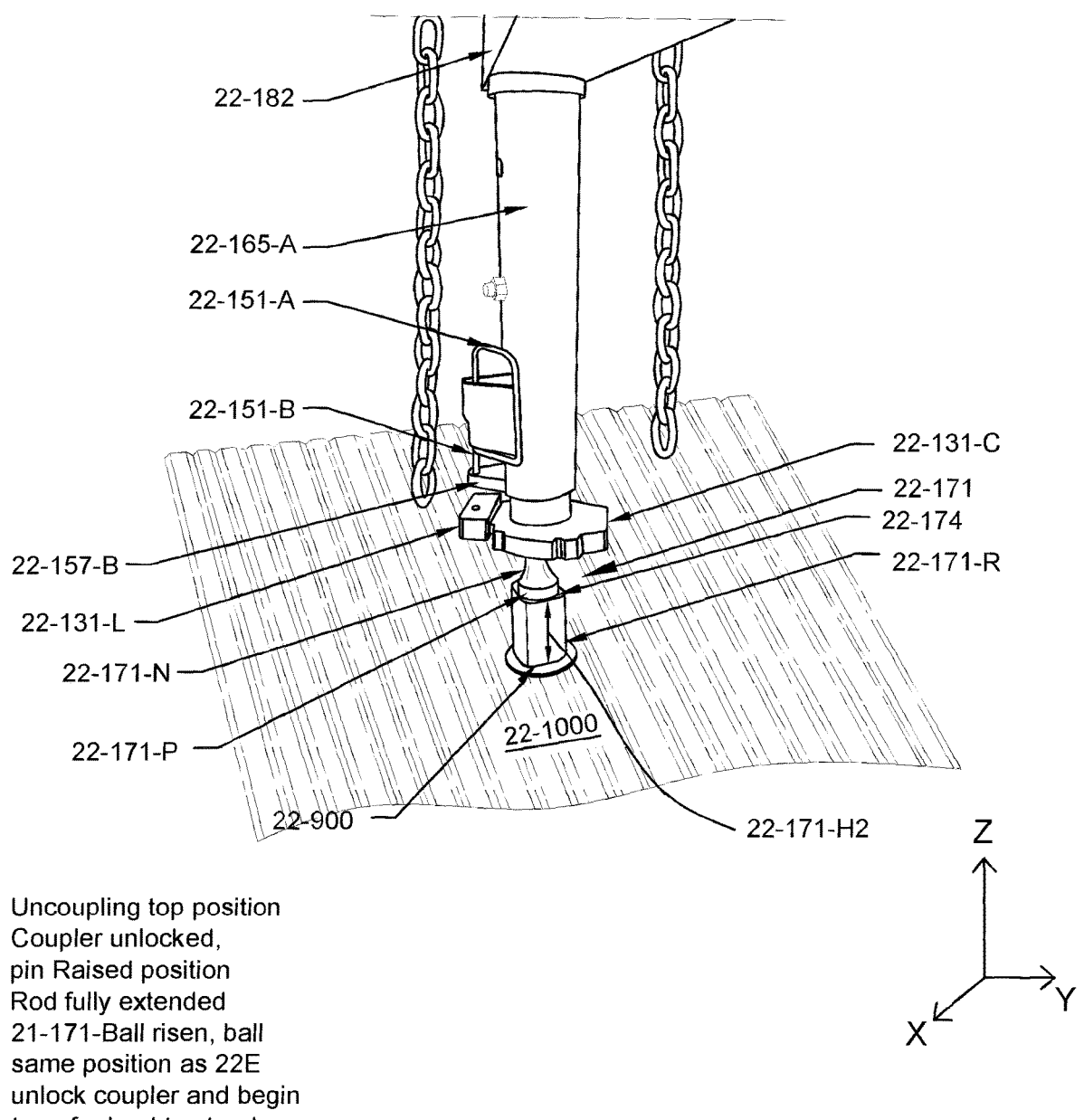

Referring to FIG. 22F, the coupler 22-131-C is unlocked with insertion end 22-151-B of the pin above, +Z, the locking dock 22-131-L. Retraction of the rod begins and the load settles on the lowered jack stands. Turning to FIGS. 4C and 17, hydraulic fluid is pumped into ports 195, 190 to afford retraction of the rod 960-T into the cylinder 400 just enough to permit the settling of the trailer load on the jack stands. The cylinder assembly 400 is mounted beneath the truck and is not visible in the above, +Z, truck bed views of FIGS. 22A-22J. Referring again to FIG. 22F, the outer pipe 22-165-A is shown connected into the gooseneck trailer 22-182. A top bend of the locking pin 22-151-A is shown. A top surface 22-174 is displaced a height 22-171-H2 above the truck bed 22-1000, which is lower, −Z, than height 22-171-H1 in FIG. 2E. The square base 22-121-R, the post 22-171-P, and the neck 22-171-N of the ball hitch 22-171 are seen in this view.

Figure 22G:
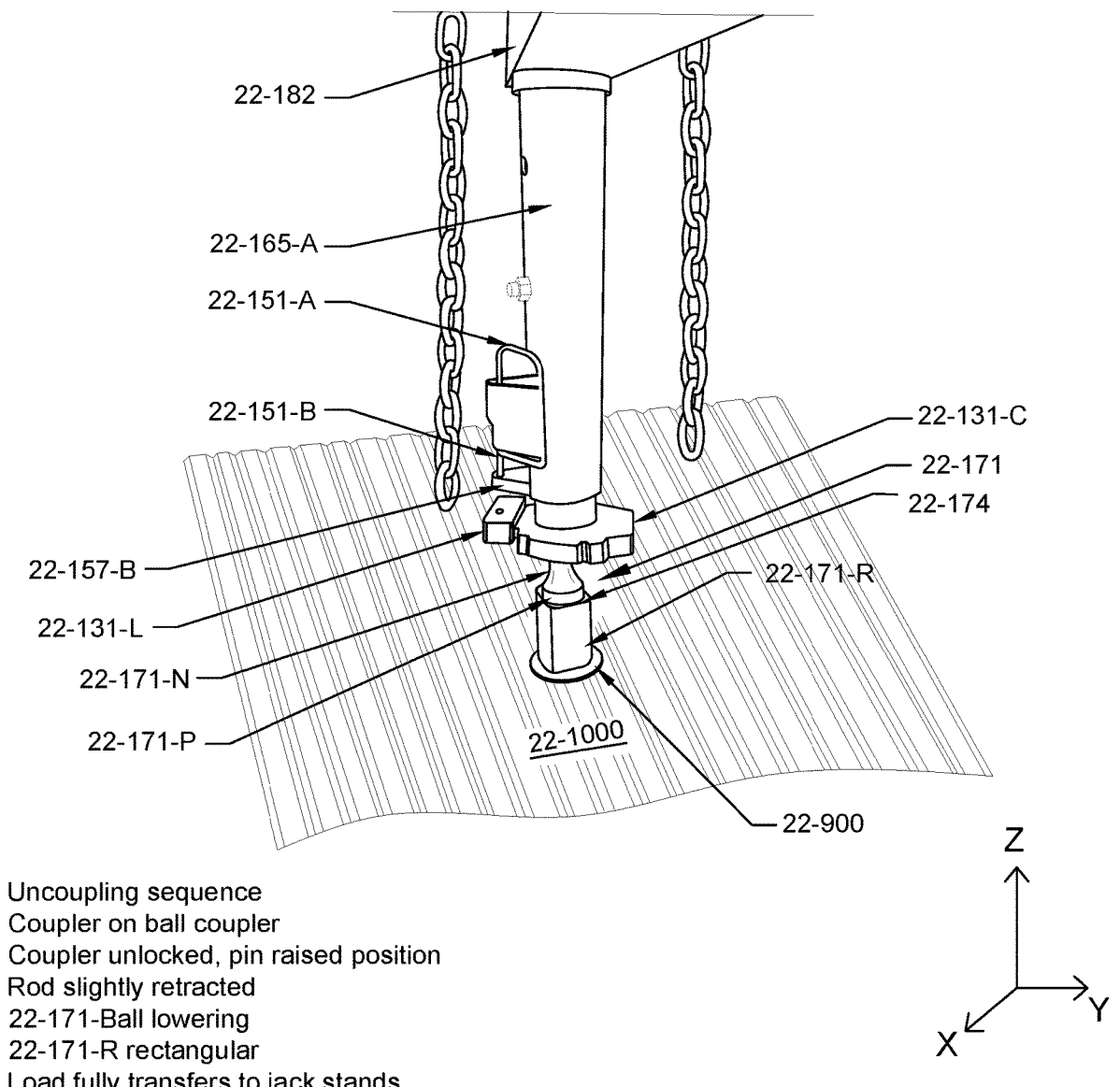

Continuing with the unloaded retraction phase of the uncoupling series and referring to FIG. 22G, the coupler 22-131-C remains unlocked with insertion end 22-151-B removed from the locking dock 22-131-L and resting in guide 22-157-B. The outer pipe 22-165-A is shown connected into the gooseneck trailer 22-182. A top bend of the locking pin 22-151-A is shown. As in FIG. 22F, hydraulic fluid is pumped hydraulic fluid is pumped into port 195 to retract the rod 960-T into the cylinder 400, shown for example in FIGS. 17 and 4C. Top surface 22-174 lowers, −Z, toward the truck bed 22-1000 as compared with FIG. 22F.

Figure 22H:
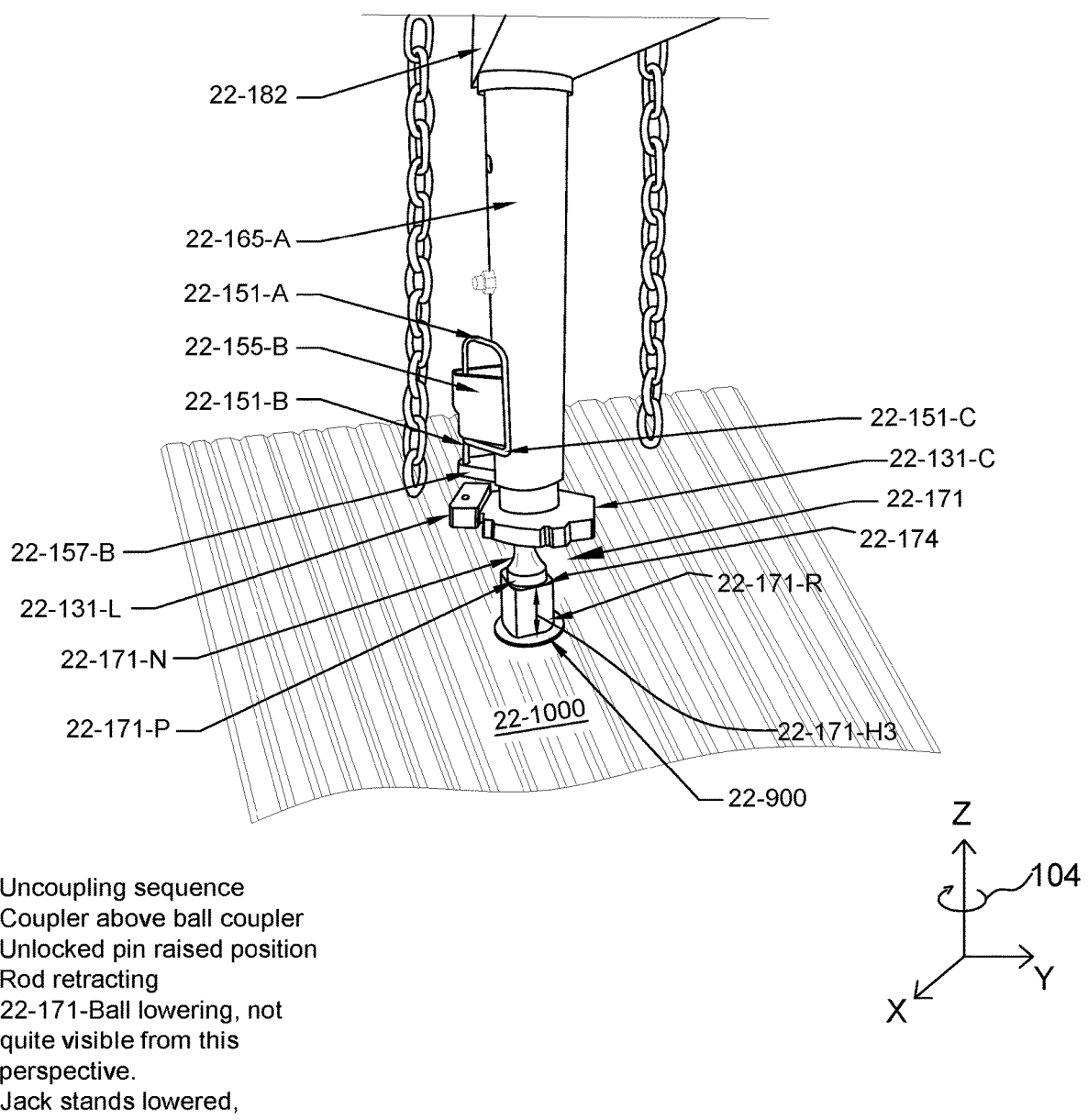

Referring to FIG. 22H, the uncoupling series continues with further unloaded lowering of the ball hitch 22-171. Top surface 22-174 is now lowered to a distance height 22-171-H3 from the truck plate 22-900. In accordance with an exemplary embodiment of the present invention, the height 22-171-H3 may be 2.5 inches. A bottom of the ball of the ball hitch 22-171 is not quite visible in this front top perspective view but freely lowers from its seated position within the coupler 22-131-C. The neck 22-171-N, the post 22-171-P, and the square base 22-171-R are shown. The insertion end 22-151-B of the locking pin remains up, +Z, in its unlock position, removed from the locking dock 22-131-L. The gooseneck 22-182 and outer pipe 22-165-A are shown. In accordance with an alternate embodiment, upper bend 22-151-A and lower bend 22-151-C may be rotated clockwise 104 about the insertion end 22-151-B axis from the position shown in FIG. 22H when in the unlocked position. Rod retraction continues via pumping hydraulic fluid into the rod retraction port, 195, shown for example in FIG. 17.

Figure 22I:
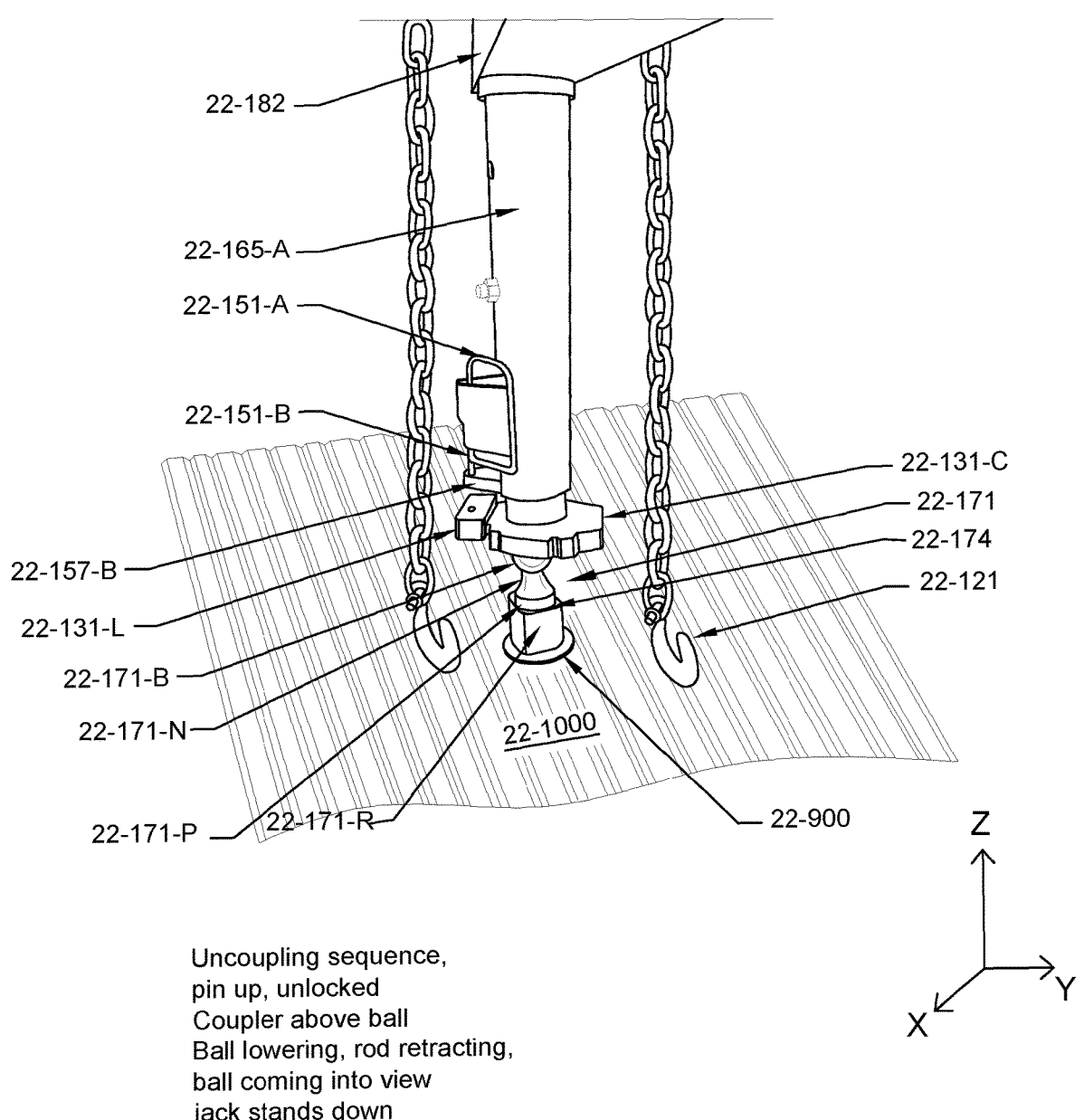

FIG. 22i shows a lowering of the unloaded hydraulic ball hitch in a near final stage. Turning to FIG. 22i, the ball 22-171-B comes into view beneath, −Z, coupler 22-131-C as the rod continues to retract. The ball hitch 22-171 is unloaded. Top surface 22-174 is closer to truck plate 22-900 as compared to FIG. 22H. Referring again to FIG. 22I, the ball 22-171-B is now partially visible. The post 22-171-P, the neck 22-171-N and square base 22-171-R are shown in this view. The coupler 22-131-C remains unlocked as the retraction of the unloaded rod continues. The insertion end 22-151-B of the locking pin is above, +Z, the locking dock 22-131-L is unlocked. The chains 22-121 are shown in this view. The gooseneck 22-182 and outer pipe 22-165-A. The locking arm hole 171-A, shown for example in FIG. 16, is not shown in FIGS. 22C-22H. In accordance with an exemplary embodiment the gooseneck and outer pipe are off the shelf parts. The upper bend 22-151-A of the locking pin is shown forward, +Y, but may be rotated to afford an unlocking position of the insertion end 22-151-B.

Figure 22J:
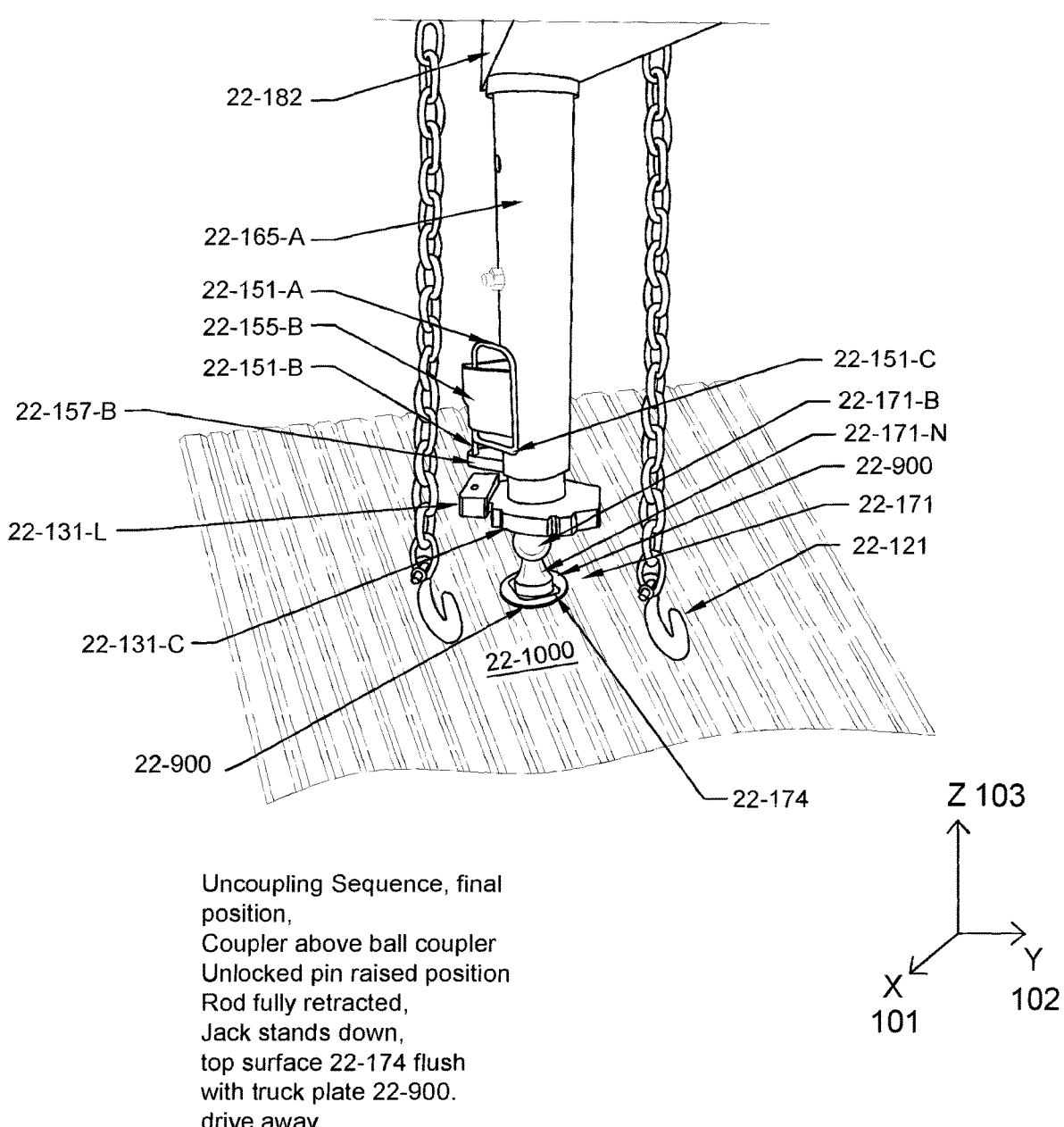

FIG. 22J shows the final phase of the uncoupling series. Full chains 22-121 are shown in this view. The gooseneck 22-182 and outer pipe 22-165-A are shown. The insertion end 22-151-B of the locking pin remains up, +Z, remains in its unlock position, removed from the locking dock 22-131-L such that coupler 22-131-C is unlocked. Top surface 22-174 is fully lowered and flush in the XY plane with truck plate 22-900. The ball 22-171-B is now visible beneath coupler 22-131-C. The post 22-171-P and neck 22-171-N of the ball hitch 22-171 are shown. The bottom of the coupler 22-131-C is above +Z a top of the ball 22-171-B. The rod 901, shown for example in FIG. 1B, is fully retracted into cylinder 400. The ball hitch and coupler are fully uncoupled and the user can now drive the truck away from the gooseneck trailer.

FIG. 23 shows a bottom perspective view of a coupler in its locked position, in accordance with an exemplary embodiment of the present invention. Turning to FIG. 23, 23-131-C, in accordance with an exemplary embodiment, is shown for coupling to a ball hitch 171 mounted in a piston rod's ball connecting end 910, 980, shown for example in FIGS. 16 and 20C. Turning again to FIG. 23, the locking pin, pin not shown, extends into locking pin hole 23-131-L when the coupler 23-131-C is locked. The coupler 23-131-C is shown in the locked position with locking coupler arm 23-131-L-A visible in the ball accommodating cavity 23-131-C-B. In accordance with an exemplary embodiment, the locking mechanism secures the coupler 23-131-C to the ball hitch, ball not shown, via the locking coupler arm 23-131-L-A operates in conventional fashion and is unmodified.

In accordance with an exemplary embodiment, as shown in FIG. 1B, the piston assembly comprises a guide pin off axial center which secures to the cylinder cap, passes through the piston head and extends into a piston rod's guide cavity. The guide rod prevents rotation of the rod and in turn, rotation of the free end ball. Embodiments of the present invention may provide a lift of near eight inches of the ball hitch.

In accordance with embodiments of the present invention, the ball, flatbed, turnover or other, is positioned at a same height, vertical displacement, relative to the truck bed as in a respective conventional ball hitch mounting when the rod is in its fulling retracted position. Embodiments of the present invention can be used in conventional, non-hydraulic lifting, mode.

A user interface provides push and hold buttons for rod extension, lifting of the ball hitch, and rod retraction, lowering of the ball hitch, in accordance with an exemplary embodiment. In alternate embodiments, the user interface may use different activation devices.

A hydraulic piston assembly, shown for example FIG. 1B, is mounted underneath an off the shelf B&W gooseneck hitch, shown unmounted in FIG. 17, in accordance with yet another embodiment of the present invention. In alternate embodiments, an off-the-shelf, or a notch modified, turnover ball is secured to a piston rod end, while the B&W gooseneck hitch frame is modified for placement forward of the rear axle, in contrast to the conventional in truck mounting location above or near above the rear axle.

While specific alternatives to aspects of the invention have been described herein, additional alternatives not specifically disclosed but known in the art are intended to fall within the scope of the invention. Thus, it is understood that other applications of the present invention will be apparent to those skilled in the art upon reading the described embodiments and after consideration of the appended provisional claims and drawings.

What is claimed is:

1. A hydraulic flatbed ball hitch lift device, the device comprising:
   a cylinder mounting ring;
   a hydraulic cylinder secured to the cylinder mounting ring;
   a dual direction piston head housed in a cavity of the hydraulic cylinder;
   a piston rod connected to the head;
   a ball hitch directly connected to an exit end of the rod; and
   a hydraulic pump connected via pump lines to a top and a bottom of the cylinder.

2. The device according to claim 1, further comprising:
   a top cap welded to a top of the cylinder closing the top of the cylinder cavity; and
   the top cap comprising:
   a hydraulic fluid input port.

3. The device according to claim 1, further comprising:
   a top cap welded to a top of the cylinder closing the top of the cylinder cavity; and
   a guide rod anchor disposed in the top cap off of a cylinder axial center.

4. The device according to claim 3, wherein:
   the guide rod anchor has internal threads.

5. The device according to claim 4, further comprising:
   a guide rod with external threads at a first end mated with the internal threads of the guide rod anchor in the top cap.

6. The device according to claim 3, further comprising:
   a guide rod anchored into the guide rod anchor extending downwards into the cylinder cavity.

7. The device according to claim 6, further comprising:
   a guide rod through hole disposed off center in the piston head.

8. The device according to claim 7, further comprising:
   a guide rod extended cavity disposed off center in the piston rod.

9. The device according to claim 8, further comprising:
   a guide rod passing through the hole in the piston head and into the cavity of the piston rod.

10. The device according to claim 7, further comprising:
    a cylinder retaining nut secured to an exit end of the cylinder.

11. The device according to claim 10, further comprising:
    external threads on an outer circumference of the cylinder retaining nut;
    a wiping ring mounted in a center opening of the cylinder retaining nut.

12. The device according to claim 1, further comprising:
    a piston rod ball connecting end exiting the hydraulic cylinder.

13. The device according to claim 12, further comprising:
    the piston rod ball connecting end comprising:
    a smooth bore near ½ inch deep; and
    internal threads butting up against the smooth bore.

14. The device according to claim 13, further comprising:
    a flatbed ball hitch secured to the piston rod ball connecting end; and
    external threads on the flatbed ball hitch mated with the internal threads of the piston rod ball connecting end.

15. The device according to claim 14, further comprising:
    a weld at a lip of the flatbed ball hitch and the external circumferential face of the rod exit end.

16. The device according to claim 1, further comprising:
    a first direction ring seated on the piston head;
    a second direction ring seated on the piston head; and a center washer seated between the first and second respective direction rings.

17. The device according to claim 1, further comprising: six cylinder mounting holes at a same radius and equally angularly spaced disposed in the cylinder mounting ring;

a top mounting ring secured to the cylinder mounting ring;

six top mounting ring holes angularly evenly separated holes; and six bolts passing through the six cylinder mounting holes and passing through the six top mounting ring holes.

18. The device according to claim 17, further comprising: an inner diameter of the top mounting ring is greater than an outer diameter of a ball connecting end of the rod.

19. The device according to claim 18, further comprising: an inner diameter of the cylinder mounting ring is press fit to an outer diameter of the hydraulic cylinder.

20. The device according to claim 19, further comprising: a male lip on the cylinder mounting ring; and a female step in the top mounting ring.

21. A hydraulic turnover ball hitch lift device, the device comprising:

a cylinder mounting ring;

a hydraulic cylinder secured to the cylinder mounting ring;

a dual direction piston head housed in a cavity of the hydraulic cylinder;

a piston rod connected to the head;

a ball hitch directly connected to an exit end of the rod; and a hydraulic pump connected via pump lines to a top and a bottom of the cylinder.

22. The device according to claim 21, further comprising: a top cap welded to a top of the cylinder closing the top of the cylinder cavity; and the top cap comprising:

a hydraulic fluid input port.

23. The device according to claim 21, further comprising: a top cap welded to a top of the cylinder closing the top of the cylinder cavity; and a guide rod anchor disposed in the top cap off of a cylinder axial center.

24. The device according to claim 23, wherein: the guide rod anchor is internal threads.

25. The device according to claim 24, wherein: a guide rod with external threads at a first end mated with the internal threads of the guide rod anchor in the top cap.

26. The device according to claim 23, further comprising: a guide rod anchored into the guide rod anchor extending downwards into the cylinder cavity.

27. The device according to claim 26, further comprising: a guide rod through hole disposed off axial center in the piston head.

28. The device according to claim 27, further comprising: a guide rod extended cavity disposed off center in the piston rod.

29. The device according to claim 28, further comprising: a guide rod passing through the hole in the piston head and into the cavity of the piston rod.

30. The device according to claim 27, further comprising: a cylinder nut secured to an exit end of the cylinder.

31. The device according to claim 30, further comprising: external threads on an outer circumference of the cylinder retaining nut;

a wiping ring mounted in a center opening of the cylinder retaining nut.

32. The device according to claim 31, further comprising: the rod ball connecting end comprising:

a first outer diameter;

a step down outer diameter positioned outside the hydraulic cylinder on a fully retracted rod; and a second diameter less than the first outer diameter.

33. The device according to claim 21, further comprising: a piston rod ball connecting end exiting the hydraulic cylinder.

34. The device according to claim 33, further comprising: a bore through the second diameter; and a bore diameter size near a turnover ball locking arm.

35. The device according to claim 33, further comprising: a turnover ball hitch seated upon the ball connecting end; and a locking arm passing through a turnover ball base and the ball connecting end.

36. The device according to claim 21, further comprising: a first direction ring seated on the piston head;

a second direction ring seated on the piston head; and a center washer seated between the first and second respective direction rings.

37. The device according to claim 21, further comprising: six mounting ring holes at a same radius and equally angularly spaced disposed in the cylinder mounting ring.

38. The device according to claim 37, further comprising: an inner diameter of the cylinder mounting ring is press-fit-equal to an outer diameter of the cylinder.

39. The device according to claim 38, further comprising: a male lip on the cylinder mounting ring on a front face of the cylinder mounting ring.

40. A hydraulic gooseneck ball lift device, the device comprising:

a hydraulic cylinder mounted underneath a flatbed;

a hydraulic piston head connected to a piston rod and fitted in the hydraulic cylinder;

a ball hitch directly connected to a piston rod;

a user interface connected to a hydraulic pump; and wherein, the user interface provides extending and retracting of the piston.

41. The device according to claim 40, further comprising: a dedicated device battery.

* * * * *